(12) United States Patent
Chen et al.

(10) Patent No.: US 10,795,119 B2
(45) Date of Patent: Oct. 6, 2020

(54) IMAGING OPTICAL LENS ASSEMBLY, IMAGING APPARATUS AND ELECTRONIC DEVICE

(71) Applicant: LARGAN PRECISION CO., LTD., Taichung (TW)

(72) Inventors: Chun-Yen Chen, Taichung (TW); Po-Lun Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 156 days.

(21) Appl. No.: 16/030,988

(22) Filed: Jul. 10, 2018

(65) Prior Publication Data

US 2019/0243102 A1 Aug. 8, 2019

(30) Foreign Application Priority Data

Feb. 2, 2018 (TW) .............................. 107103881 A

(51) Int. Cl.
*G02B 9/62* (2006.01)
*G02B 13/00* (2006.01)
*G02B 27/64* (2006.01)

(52) U.S. Cl.
CPC ............ *G02B 9/62* (2013.01); *G02B 13/0045* (2013.01); *G02B 27/646* (2013.01)

(58) Field of Classification Search
CPC ......... G02B 9/62; G02B 9/64; G02B 13/0045
USPC ................................ 359/713, 754–756, 761
See application file for complete search history.

(56) References Cited

U.S. PATENT DOCUMENTS

| 2015/0098135 A1 | 4/2015 | Chung et al. |
| 2015/0116573 A1 | 4/2015 | Liao |
| 2015/0124332 A1 | 5/2015 | Noda et al. |
| 2016/0119519 A1 | 4/2016 | Chen et al. |
| 2016/0139366 A1 | 5/2016 | Jung |
| 2016/0154210 A1 | 6/2016 | Baik et al. |
| 2017/0031133 A1 | 2/2017 | Liu et al. |
| 2018/0307000 A1* | 10/2018 | Lai .......................... G02B 7/028 |
| 2018/0314039 A1* | 11/2018 | Dai .......................... G02B 13/18 |
| 2019/0033559 A1 | 1/2019 | Chang et al. |

(Continued)

FOREIGN PATENT DOCUMENTS

| CN | 105759406 A | 7/2016 |
| CN | 106019535 A | 10/2016 |

(Continued)

*Primary Examiner* — Darryl J Collins
(74) *Attorney, Agent, or Firm* — McClure, Qualey & Rodack, LLP.

(57) ABSTRACT

An imaging optical lens assembly includes six lens elements, the six lens elements being, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has positive refractive power. The fourth lens element has an image-side surface being concave in a paraxial region thereof. The sixth lens element has an object-side surface being convex in a paraxial region thereof and an image-side surface being concave in a paraxial region thereof and including at least one convex critical point in an off-axis region thereof.

22 Claims, 30 Drawing Sheets

(56) References Cited

U.S. PATENT DOCUMENTS

2019/0033562 A1    1/2019   Chang et al.
2019/0179118 A1    6/2019   Kubota et al.

FOREIGN PATENT DOCUMENTS

| CN | 106646835 A | 5/2017 |
|---|---|---|
| JP | 2014-010399 A | 1/2014 |
| JP | 2014-010400 A | 1/2014 |
| JP | 2014-044250 A | 3/2014 |
| TW | 201200931 A1 | 1/2012 |
| WO | 2017-164605 A1 | 9/2017 |
| WO | 2019066251 A1 | 4/2019 |

* cited by examiner

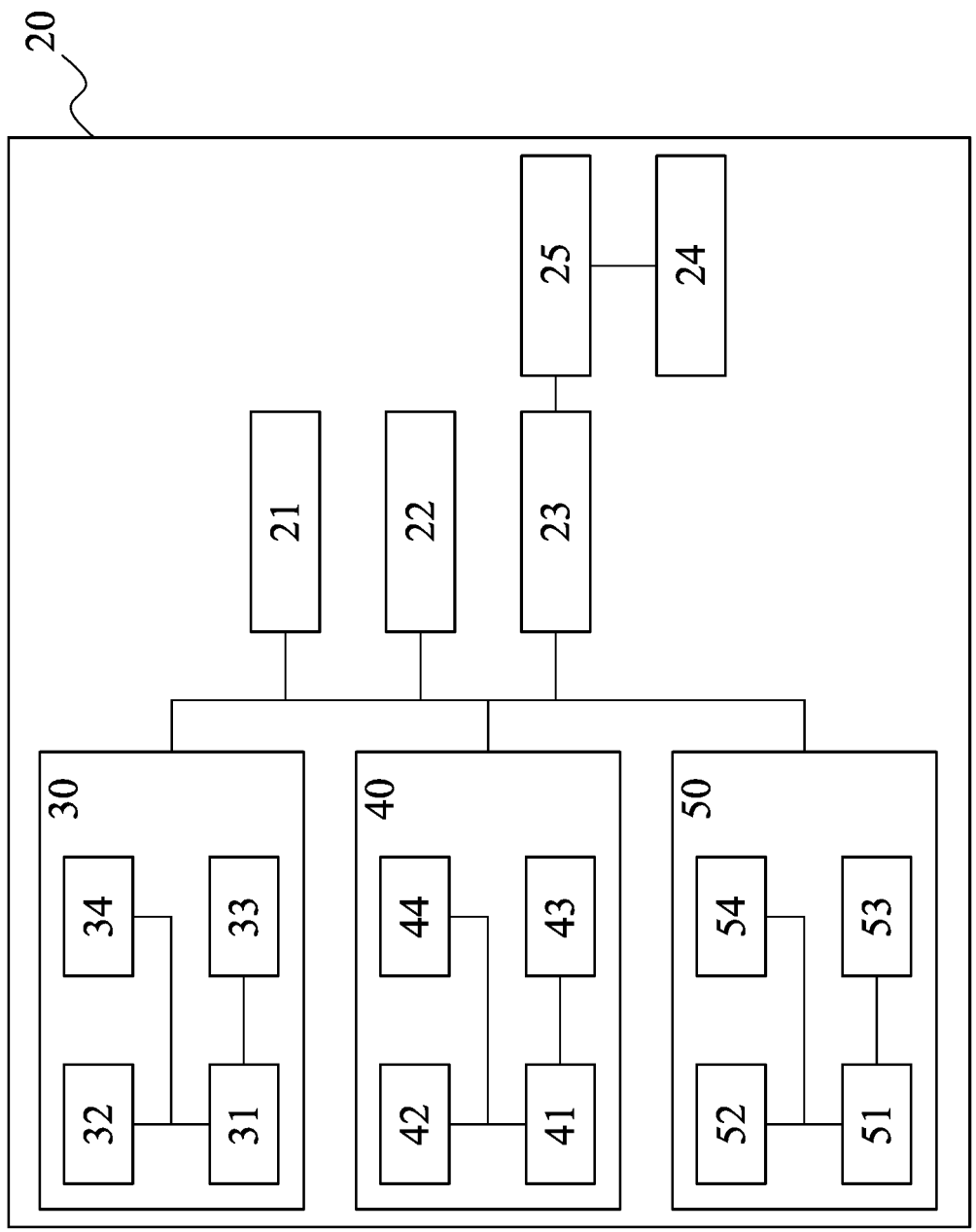
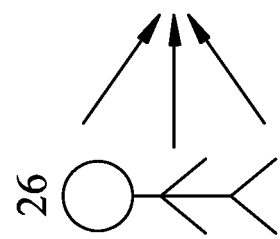
Fig. 29C

IMAGING OPTICAL LENS ASSEMBLY, IMAGING APPARATUS AND ELECTRONIC DEVICE

RELATED APPLICATIONS

This application claims priority to Taiwan Application Serial Number 107103881, filed Feb. 2, 2018, which is herein incorporated by reference.

BACKGROUND

Technical Field

The present disclosure relates to an imaging optical lens assembly and an imaging apparatus. More particularly, the present disclosure relates to an imaging optical lens assembly and an imaging apparatus with a compact size applicable to electronic devices.

Description of Related Art

With the advanced semiconductor manufacturing technologies, the performances of image sensors are enhanced, and the pixel size is minified. Therefore, imaging optical lens assemblies with high image quality become indispensable.

Moreover, with the rapid scientific and technological progress, the application scope of electronic devices equipped with imaging optical lens assemblies becomes wider, and the requirements for imaging optical lens assemblies are more diverse. However, it is hard for balancing the requirements, such as image quality, sensitivity, aperture size, volume and field of view, in conventional imaging optical lens assemblies. Therefore, an imaging optical lens assembly is provided by the present disclosure to satisfy the desired requirement.

SUMMARY

According to one aspect of the present disclosure, an imaging optical lens assembly includes six lens elements, the six lens elements being, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has positive refractive power. The fourth lens element has an image-side surface being concave in a paraxial region thereof. The sixth lens element has an object-side surface being convex in a paraxial region thereof and an image-side surface being concave in a paraxial region thereof and including at least one convex critical point in an off-axis region thereof. When a curvature radius of an object-side surface of the first lens element is R1, a curvature radius of an object-side surface of the fifth lens element is R9, a curvature radius of an image-side surface of the fifth lens element is R10, a focal length of the imaging optical lens assembly is f, a focal length of the second lens element is f2, a focal length of the third lens element is f3, a focal length of the fourth lens element is f4, a sum of axial distances between every adjacent lens elements of the imaging optical lens assembly is ΣAT, and an axial distance between the first lens element and the second lens element is T12, the following conditions are satisfied:

$-0.50 < (R9+R10)/(R9-R10)$;

$|f2/f3|+|f2/f4|<1.75$;

$f/R1<0.55$; and $1.25<\Sigma AT/T12<4.80$.

According to another aspect of the present disclosure, an imaging apparatus includes the imaging optical lens assembly of the aforementioned aspect and an image sensor, wherein the image sensor is disposed on an image surface of the imaging optical lens assembly.

According to another aspect of the present disclosure, an electronic device includes the imaging apparatus of the aforementioned aspect.

According to another aspect of the present disclosure, an imaging optical lens assembly includes six lens elements, the six lens elements being, in order from an object side to an image side, a first lens element, a second lens element, a third lens element, a fourth lens element, a fifth lens element and a sixth lens element. The first lens element with negative refractive power has an image-side surface being concave in a paraxial region thereof. The second lens element has positive refractive power. The third lens element has an image-side surface being concave in a paraxial region thereof. The fifth lens element with positive refractive power has an image-side surface being convex in a paraxial region thereof. The sixth lens element with negative refractive power has an image-side surface being concave in a paraxial region thereof and including at least one convex critical point in an off-axis region thereof. When a curvature radius of an object-side surface of the first lens element is R1, a curvature radius of an object-side surface of the fifth lens element is R9, a curvature radius of the image-side surface of the fifth lens element is R10, a focal length of the imaging optical lens assembly is f, a focal length of the second lens element is f2, a focal length of the third lens element is f3, and a focal length of the fourth lens element is f4, the following conditions are satisfied:

$0\leq(R9+R10)/(R9-R10)\leq1.0$;

$|f2/f3|+|f2/f4|<2.0$; and $f/R1<0.4$.

BRIEF DESCRIPTION OF THE DRAWINGS

The present disclosure can be more fully understood by reading the following detailed description of the embodiment, with reference made to the accompanying drawings as follows:

FIG. 29C is a system schematic view of the electronic device of FIG. 29A.

DETAILED DESCRIPTION

Figure 1:
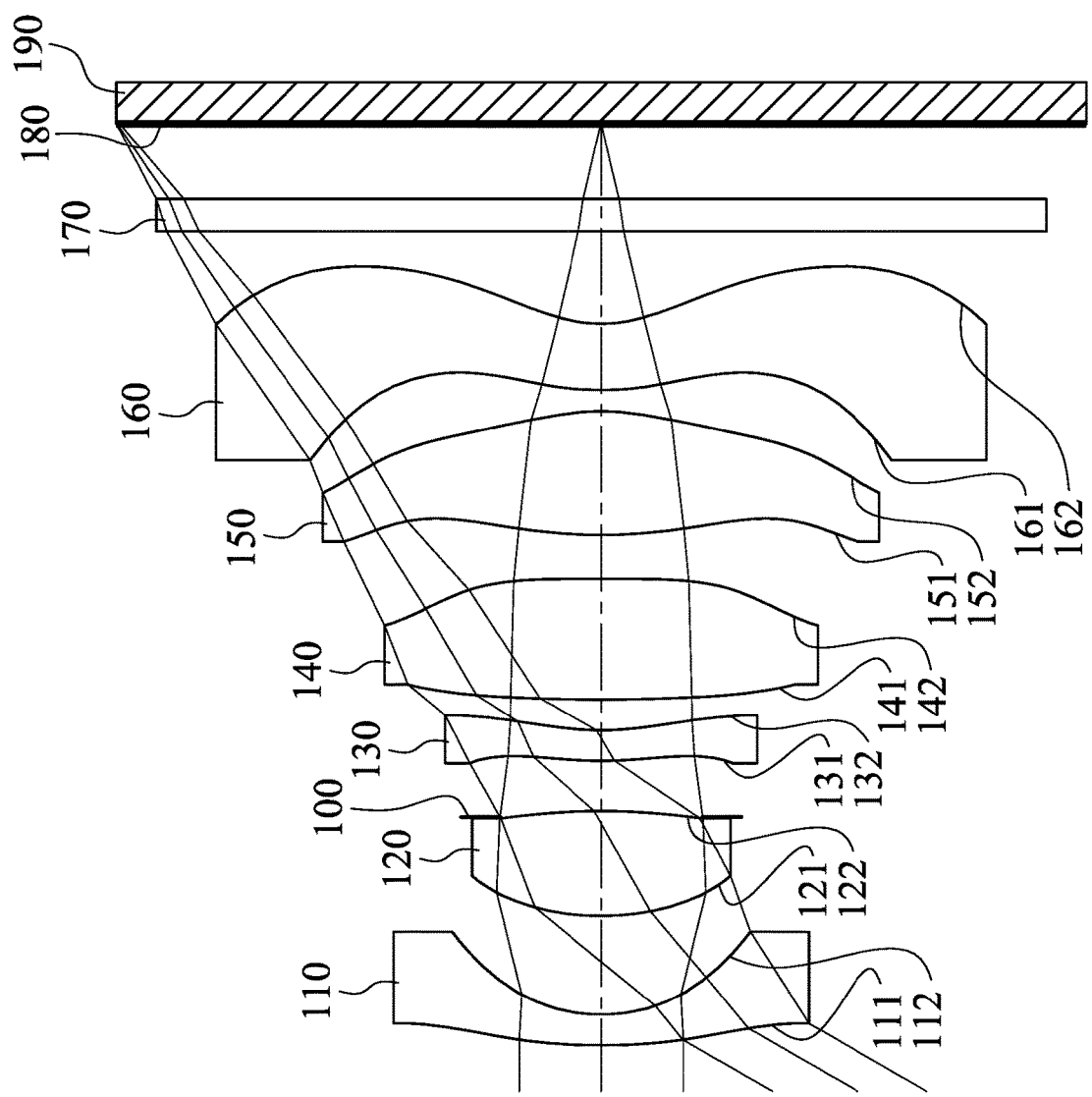
FIG. 1 is a schematic view of an imaging apparatus according to the 1st embodiment of the present disclosure.

An imaging optical lens assembly includes six lens elements, the six lens elements being, in order from an object side to an image side, a first lens element, a second lens element, a third lens element, a fourth lens element, a fifth lens element and a sixth lens element.

The first lens element with negative refractive power has an image-side surface being concave in a paraxial region thereof. Therefore, it is favorable for providing a sufficient field of view of the imaging optical lens assembly. An object-side surface of the first lens element can include at least one convex shape in an off-axis region thereof. Therefore, it is favorable for the incident light projecting through the periphery of the field of view of the imaging optical lens assembly.

The second lens element has positive refractive power. Therefore, the combination of the first lens element with negative refractive power and the second lens element with positive refractive power is favorable for reducing the total track length and aberrations caused by the first lens element with negative refractive power so as to enhance the image quality.

The third lens element can have an object-side surface being convex in a paraxial region thereof and including at least one concave critical point in an off-axis region thereof. Therefore, it is favorable for reducing surface reflection and manufacturing problems resulted from an overly curved shape in the periphery of a lens element. The third lens element can have an image-side surface being concave in a paraxial region thereof. Therefore, it is favorable for reducing the back focal length and the total track length of the imaging optical lens assembly.

The fourth lens element can have an image-side surface being concave in a paraxial region thereof. Therefore, it is favorable for further reducing the back focal length and the total track length of the imaging optical lens assembly. The image-side surface of the fourth lens element can include at least one convex critical point in an off-axis region thereof. Therefore, it is favorable for correcting off-axis aberrations.

The fifth lens element can have positive refractive power and can have an image-side surface being convex in a paraxial region thereof. Therefore, the light converging ability on the image side of the imaging optical lens assembly can be provided for effectively controlling the dimension of the imaging optical lens assembly. The fifth lens element can have an object-side surface being convex in a paraxial region thereof and including at least one concave critical point in an off-axis region thereof. Therefore, it is favorable for reducing surface reflection and manufacturing problems resulted from an overly curved shape at the periphery of a lens element.

The sixth lens element can have negative refractive power. Therefore, it is favorable for balancing the refractive power distribution on the image side of the imaging optical lens assembly and moderating the aberrations from the fifth lens element. The sixth lens element can have an object-side surface being convex in a paraxial region thereof, so that the back focal length of the imaging optical lens assembly can be effectively controlled. The sixth lens element has an image-side surface being concave in a paraxial region thereof and including at least one convex critical point in an off-axis region thereof. Therefore, it is favorable for effectively correcting peripheral aberrations so as to enhance the image quality.

According to the imaging optical lens assembly of the present disclosure, a critical point is a non-axial point of the lens surface where its tangent is perpendicular to the optical axis, wherein a convex critical point is a critical point located on a convex shape of the lens surface, and a concave critical point is a critical point located on a concave shape of the lens surface.

When a curvature radius of the object-side surface of the fifth lens element is R9, and a curvature radius of the image-side surface of the fifth lens element is R10, the following condition is satisfied: $-0.50<(R9+R10)/(R9-R10)$. Therefore, it is favorable for strengthening refractive power on the image side of the imaging optical lens assembly so as to reduce the back focal length, correct the image periphery, decrease the total track length and enhance the image quality. Preferably, the following condition can be satisfied: $0\leq(R9+R10)/(R9-R10)<2.0$. More preferably, the following condition can be satisfied: $0\leq(R9+R10)/(R9-R10)\leq1.0$.

When a focal length of the second lens element is f2, a focal length of the third lens element is f3, and a focal length of the fourth lens element is f4, the following condition is satisfied: $|f2/f3|+|f2/f4|<2.0$. Therefore, the second lens element has sufficient positive refractive power to be configured with the first lens element with negative refractive power, so that it is favorable for the incident light projecting into the imaging optical lens assembly, reducing the effective radius of the lens element, and thereby obtaining the compact size of the imaging apparatus and the imaging optical lens assembly thereof. Preferably, the following condition can be satisfied: $|f2/f3|+|f2/f4|<1.75$. More preferably, the following condition can be satisfied: $|f2/f3|+|f2/f4|<1.0$.

When a focal length of the imaging optical lens assembly is f, and a curvature radius of the object-side surface of the first lens element is R1, the following condition is satisfied: $f/R1<0.55$. Therefore, the shape change in the paraxial region of the object-side surface of the first lens element is well controlled so as to avoid the total track length being excessively long resulted from an overly convex shape of the first lens element, and a thickness in the paraxial region of the first lens element can be smaller, thereby the shape change in the paraxial region of the object-side surface of the first lens element can be moderate to increase the manufacturability. Preferably, the following condition can be satisfied: $f/R1<0.4$. More preferably, the following condition can be satisfied: $-0.60<f/R1<0.40$.

When an axial distance between the first lens element and the second lens element is T12, and a sum of axial distances between every adjacent lens elements of the imaging optical lens assembly is $\Sigma AT$, the following condition is satisfied: $1.25<\Sigma AT/T12<4.80$. Therefore, the lens elements of the imaging optical lens assembly can be arranged more evenly so as to avoid difficulties of reducing the dimensions of the lens elements caused by excessively large spaces between the adjacent lens elements (particularly, the space between the first lens element and the second lens element), or to avoid the design or manufacturing difficulties caused by excessively small spaces between the adjacent lens elements. Preferably, the following condition can be satisfied: $1.50<\Sigma AT/T12<3.60$.

When an Abbe number of the third lens element is V3, and an Abbe number of the sixth lens element is V6, the following condition is satisfied: $V3+V6<60$. Therefore, it is favorable for properly balancing corrections of chromatic aberration and astigmatism.

When a central thickness of the fourth lens element is CT4, and an axial distance between the third lens element and the fourth lens element is T34, the following condition is satisfied: $1.5<CT4/T34$. Therefore, the fourth lens element with an apparent aspheric shape can have a sufficient thickness so as to improve the manufacturability of the fourth lens element. Preferably, the following condition can be satisfied: $2.0<CT4/T34<20$.

When the axial distance between the first lens element and the second lens element is T12, and an axial distance between the second lens element and the third lens element is T23, the following condition is satisfied: $T12/T23<6.0$. Therefore, it is favorable for arranging proper space between the second lens element and the adjacent lens elements so as to avoid larger dimensions of the lens elements caused by excessively large space between the adjacent lens elements, or avoid the design or manufacturing difficulties caused by excessively small space between the adjacent lens elements. Preferably, the following condition can be satisfied: $T12/T23<4.0$.

When an axial distance between the object-side surface of the first lens element and an image surface is TL, and a maximum image height of the imaging optical lens assembly is ImgH, the following condition is satisfied: $TL/ImgH<2.40$. Therefore, it is favorable for effectively reducing the total track length of the imaging optical lens assembly so as to further achieve the compact size thereof.

When an f-number of the imaging optical lens assembly is Fno, the following condition is satisfied: $1.0<Fno<2.6$. Therefore, there is sufficient incoming light projecting in the imaging optical lens assembly for applications in the low light conditions such as night photography.

When a vertical distance between a maximum effective diameter position of the object-side surface of the first lens element and an optical axis is Y11, and a vertical distance between a maximum effective diameter position of the image-side surface of the sixth lens element and the optical axis is Y62, the following condition is satisfied: $Y11/Y62<1.0$. Therefore, it is favorable for effectively reducing the total track length of the imaging optical lens assembly so as to achieve the compact size and enhance the image quality.

When a focal length of the first lens element is f1, the focal length of the second lens element is f2, the focal length of the third lens element is f3, the focal length of the fourth lens element is f4, a focal length of the fifth lens element is f5, and a focal length of the sixth lens element is f6, the following conditions are satisfied: $|f1/f4|<1.0$; $|f2/f4|<1.0$; $|f3/f4|<1.0$; $|f5/f4|<1.0$; and $|f6/f4|<1.0$. Therefore, the fourth lens element configured with lower refractive power is favorable for correcting the image periphery of the second lens element and the fifth lens element, which are both with higher refractive power.

When the maximum image height of the imaging optical lens assembly is ImgH, and the focal length of the imaging optical lens assembly is f, the following condition is satisfied: $1.15<ImgH/f$. Therefore, it is favorable for enhancing the feature of wide field of view of the imaging optical lens assembly.

When a curvature radius of an object-side surface of the second lens element is R3, and a curvature radius of an image-side surface of the second lens element is R4, the following condition is satisfied: $(R3+R4)/(R3-R4)<0.30$. Therefore, it is favorable for properly matching the mechanism and optical properties between the first lens element and the second lens element.

When the focal length of the imaging optical lens assembly is f, the focal length of the fifth lens element is f5, and the focal length of the sixth lens element is f6, the following condition is satisfied: $1.70<|f/f5|+|f/f6|$. Therefore, it is favorable for configuring the lens elements with higher refractive power on the image side of the imaging optical lens assembly so as to reduce the back focal length and correct the image periphery.

When a central thickness of the third lens element is CT3, and the central thickness of the fourth lens element is CT4, the following condition is satisfied: $1.75<CT4/CT3<6.0$.

Therefore, the fourth lens element with an apparent aspheric shape can have a sufficient thickness so as to improve the manufacturability of the fourth lens element.

When a vertical distance between a critical point in an off-axis region on the object-side surface of the sixth lens element and the optical axis is Yc61, and the focal length of the imaging optical lens assembly is f, the following condition is satisfied: $0.1 < Yc61/f < 0.9$. Therefore, it is favorable for further enhancing the ability of correcting aberrations at the image periphery.

When the focal length of the second lens element is f2, and the focal length of the fifth lens element is f5, the following condition is satisfied: $f5/f2 < 1.0$. Therefore, it is favorable for configuring the lens elements with higher refractive power on the image side of the imaging optical lens assembly so as to reduce the back focal length.

When the curvature radius of the object-side surface of the fifth lens element is R9, and the curvature radius of the image-side surface of the fifth lens element is R10, the following condition is satisfied: $|R10/R9| < 1.0$. Therefore, it is favorable for reducing the back focal length and correcting the image periphery.

Each of the aforementioned features of the imaging optical lens assembly can be utilized in numerous combinations, so as to achieve the corresponding functionality.

According to the present disclosure, the lens elements of the imaging optical lens assembly can be made of either glass or plastic material. When the lens elements are made of glass material, the refractive power distribution of the imaging optical lens assembly may be more flexible. The glass lens element can either be made by grinding or molding. When the lens elements are made of plastic material, the manufacturing cost can be effectively reduced. Furthermore, surfaces of each lens element can be arranged to be aspheric (ASP), which allows for more controllable variables for eliminating the aberration thereof, the required number of the lens elements can be decreased, and the total track length of the imaging optical lens assembly can be effectively reduced. The aspheric surfaces may be formed by plastic injection molding or glass molding.

According to the imaging optical lens assembly of the present disclosure, when a surface of a lens element is aspheric, it indicates that the complete optical effective area or a partial of the optical effective area of the surface of the lens element can be aspheric.

According to the imaging optical lens assembly of the present disclosure, each of an object-side surface and an image-side surface of a lens element has a paraxial region and an off-axis region. The paraxial region refers to the region of the surface where light rays travel close to the optical axis, and the off-axis region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the imaging optical lens assembly of the present disclosure, the refractive power of a lens element being positive or negative or the focal length of the lens element may refer to the refractive power or the focal length in the paraxial region of the lens element.

According to the imaging optical lens assembly of the present disclosure, the image surface, depending on the corresponding image sensor, can be a planar surface or a curved surface, particularly a curved surface being concave toward the object side. According to the imaging optical lens assembly of the present disclosure, at least one image correcting element (such as a field flattener) can be selectively disposed between a lens element closest to the image surface and the image surface so as to correct image aberrations (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface facing toward the object side and is disposed close to the image surface.

According to the imaging optical lens assembly of the present disclosure, the imaging optical lens assembly can include at least one stop. The stop can be a glare stop, a field stop, etc. Therefore, the stray light can be eliminated, and the image quality can be improved.

According to the imaging optical lens assembly of the present disclosure, an aperture stop can be configured as a front stop or a middle stop. A front stop is disposed between an imaged object and the first lens element, and a middle stop is disposed between the first lens element and the image surface. The front stop can provide a longer distance between an exit pupil of the imaging optical lens assembly and the image surface to enable a telecentric effect, and thereby can improve the image-sensing efficiency of an image sensor. The middle stop is favorable for enlarging the field of view of the imaging optical lens assembly and thereby provides a wider field of view for the same.

According to the imaging optical lens assembly of the present disclosure, the imaging optical lens assembly can be applied to 3D (three-dimensional) image capturing applications, in products such as digital cameras, mobile devices, digital tablets, smart TVs, network monitoring devices, motion sensing input devices, driving recorders, rear view camera systems, wearable devices, unmanned aerial vehicles, and other electronic imaging products.

According to the present disclosure, an imaging apparatus is provided. The imaging apparatus includes the aforementioned imaging optical lens assembly according to the present disclosure and an image sensor, wherein the image sensor is disposed on or near the image surface of the aforementioned imaging optical lens assembly. When specific conditions are satisfied, it is favorable for reducing the total track length and enhancing the image quality. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Besides the aforementioned imaging apparatus, the electronic device can further include a photographing lens set. The field of view of the photographing lens set is smaller than that of the imaging optical lens assembly of the imaging apparatus. The two lens sets (i.e., the photographing lens set and the imaging optical lens assembly of the imaging apparatus) can be connected to a processor to achieve the zoom effect. Preferably, the electronic device can further include, but not limited to, a control unit, a display, a storage unit, a random access memory unit (RAM) or a combination thereof.

According to the above description of the present disclosure, the following 1st-14th specific embodiments are provided for further explanation.

1st Embodiment

FIG. 1 is a schematic view of an imaging apparatus according to the 1st embodiment of the present disclosure.

Figure 2:
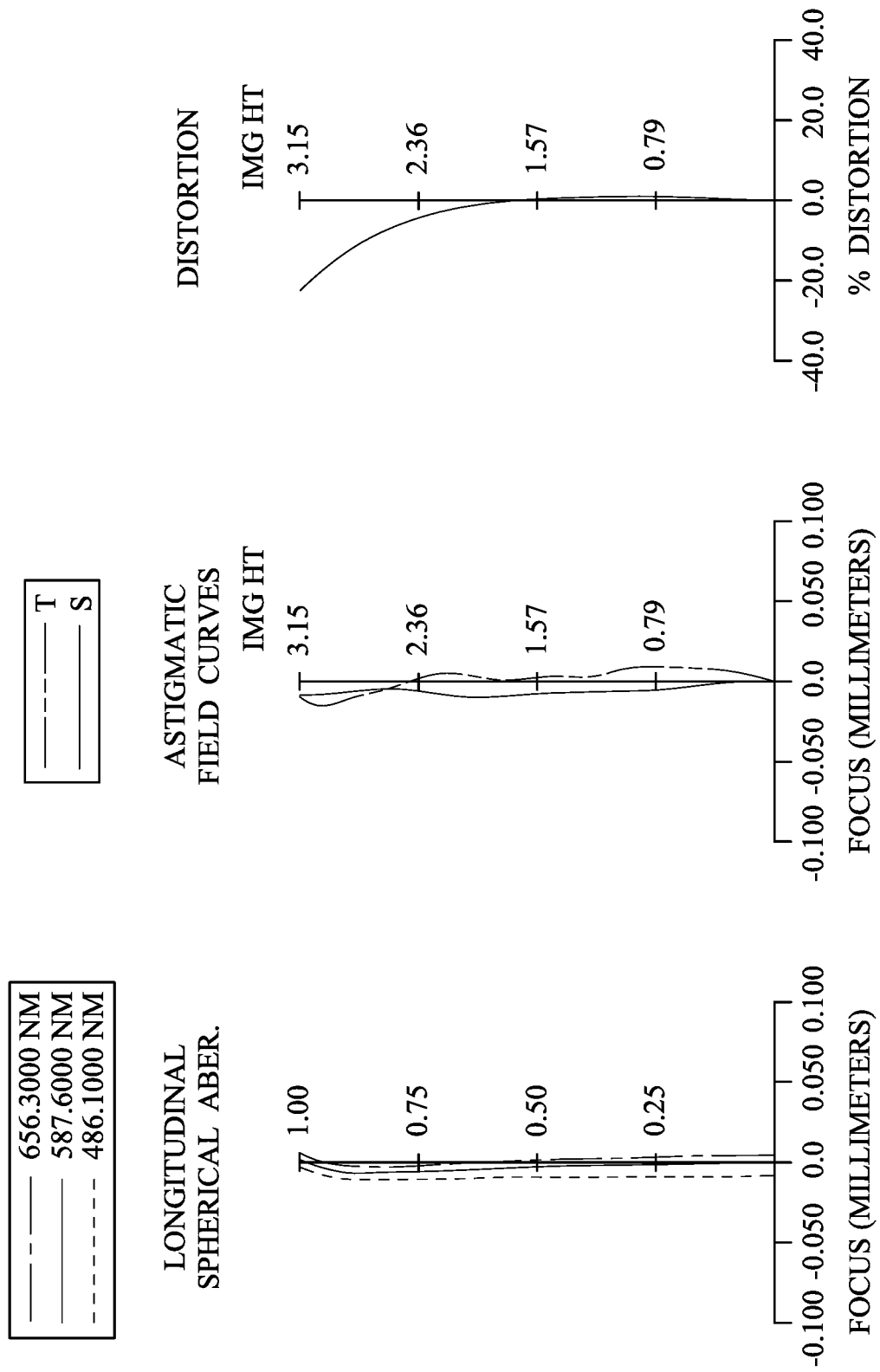
FIG. 2 shows spherical aberration curves, astigmatic field curves and a distortion curve of the imaging apparatus according to the 1st embodiment.

FIG. 2 shows spherical aberration curves, astigmatic field curves and a distortion curve of the imaging apparatus according to the 1st embodiment. In FIG. 1, the imaging apparatus includes an imaging optical lens assembly (its reference numeral is omitted) and an image sensor 190. The imaging optical lens assembly includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180. The image sensor 190 is disposed on the image surface 180 of the imaging optical lens assembly. The imaging optical lens assembly includes six lens elements (110, 120, 130, 140, 150 and 160) without additional one or more lens elements inserted between the first lens element 110 and the sixth lens element 160.

The first lens element 110 with negative refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric. Furthermore, the object-side surface 111 of the first lens element 110 includes at least one convex shape in an off-axis region thereof.

The second lens element 120 with positive refractive power has an object-side surface 121 being convex in a paraxial region thereof and an image-side surface 122 being convex in a paraxial region thereof. The second lens element 120 is made of a plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, the object-side surface 131 of the third lens element 130 includes at least one concave critical point in an off-axis region thereof.

The fourth lens element 140 with positive refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric. Furthermore, the image-side surface 142 of the fourth lens element 140 includes at least one convex critical point in an off-axis region thereof.

The fifth lens element 150 with positive refractive power has an object-side surface 151 being convex in a paraxial region thereof and an image-side surface 152 being convex in a paraxial region thereof. The fifth lens element 150 is made of a plastic material, and has the object-side surface 151 and the image-side surface 152 being both aspheric. Furthermore, the object-side surface 151 of the fifth lens element 150 includes at least one concave critical point in an off-axis region thereof.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex critical point in an off-axis region thereof.

The IR-cut filter 170 is made of a glass material and located between the sixth lens element 160 and the image surface 180, and will not affect the focal length of the imaging optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical lens assembly according to the 1st embodiment, when a focal length of the imaging optical lens assembly is f, an f-number of the imaging optical lens assembly is Fno, and a half of a maximum field of view of the imaging optical lens assembly is HFOV, these parameters have the following values: f=2.35 mm; Fno=2.20; and HFOV=60.0 degrees.

In the imaging optical lens assembly according to the 1st embodiment, when an Abbe number of the third lens element 130 is V3, and an Abbe number of the sixth lens element 160 is V6, the following condition is satisfied: V3+V6=37.4.

In the imaging optical lens assembly according to the 1st embodiment, when an axial distance between the object-side surface 111 of the first lens element 110 and the image surface 180 is TL, a maximum image height of the imaging optical lens assembly is ImgH, and the focal length of the imaging optical lens assembly is f, the following conditions are satisfied: TL/ImgH=1.91; and ImgH/f=1.34.

In the imaging optical lens assembly according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=−0.44.

In the imaging optical lens assembly according to the 1st embodiment, when a curvature radius of the object-side surface 151 of the fifth lens element 150 is R9, and a curvature radius of the image-side surface 152 of the fifth lens element 150 is R10, the following conditions are satisfied: (R9+R10)/(R9−R10)=0.41; and |R10/R9|=0.42.

In the imaging optical lens assembly according to the 1st embodiment, when a central thickness of the third lens element 130 is CT3, a central thickness of the fourth lens element 140 is CT4, and an axial distance between the third lens element 130 and the fourth lens element 140 is T34, the following conditions are satisfied: CT4/CT3=3.93; and CT4/T34=3.93.

In the imaging optical lens assembly according to the 1st embodiment, when an axial distance between the first lens element 110 and the second lens element 120 is T12, and an axial distance between the second lens element 120 and the third lens element 130 is T23, the following condition is satisfied: T12/T23=1.97.

In the imaging optical lens assembly according to the 1st embodiment, when the axial distance between the first lens element 110 and the second lens element 120 is T12, the axial distance between the second lens element 120 and the third lens element 130 is T23, the axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and a sum of axial distances between every adjacent lens elements of the imaging optical lens assembly is ΣAT (ΣAT=T12+T23+T34+T45+T56), the following condition is satisfied: ΣAT/T12=2.48.

Figure 26:
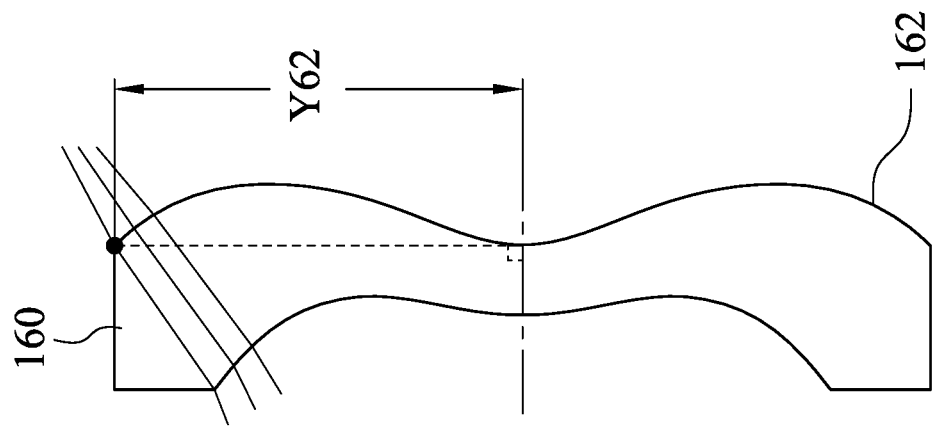
FIG. 26 shows a schematic view of the parameter Y62 according to the 1st embodiment of FIG. 1.
Figure 25:
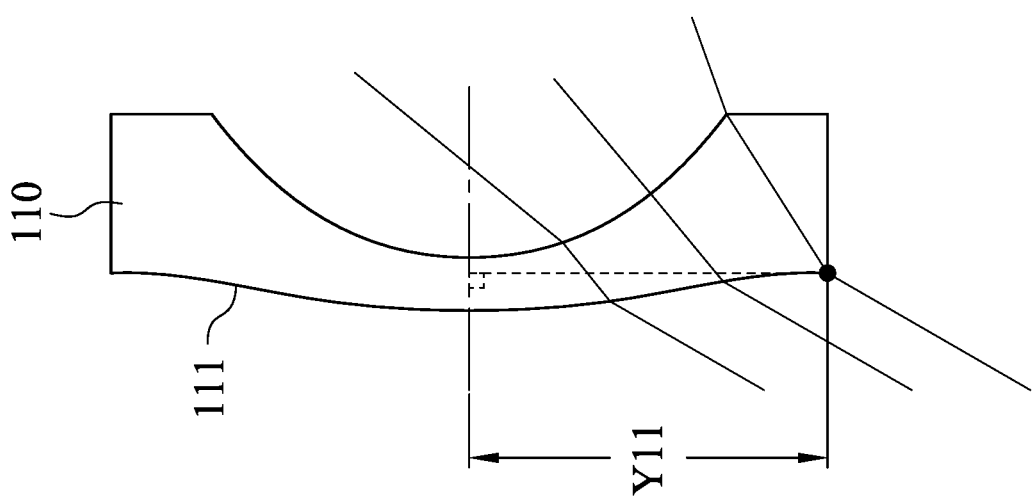
FIG. 25 shows a schematic view of the parameter Y11 according to the 1st embodiment of FIG. 1.

FIG. 25 shows a schematic view of the parameter Y11 according to the 1st embodiment of FIG. 1, and FIG. 26 shows a schematic view of the parameter Y62 according to the 1st embodiment of FIG. 1. In FIG. 25 and FIG. 26, when a vertical distance between a maximum effective diameter position of the object-side surface 111 of the first lens element 110 and the optical axis is Y11, and a vertical distance between a maximum effective diameter position of the image-side surface 162 of the sixth lens element 160 and the optical axis is Y62, the following condition is satisfied: Y11/Y62=0.54.

In the imaging optical lens assembly according to the 1st embodiment, when the focal length of the imaging optical lens assembly is f, and a curvature radius of the object-side surface 111 of the first lens element 110 is R1, the following condition is satisfied: f/R1=0.49.

In the imaging optical lens assembly according to the 1st embodiment, when the focal length of the imaging optical lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: |f1/f4|=0.15; |f2/f3|+|f2/f4|=0.35; |f2/f4|=0.12; |f3/f4|=0.56; f5/f2=0.85; |f5/f4|=0.11; |f6/f4|=0.15; and |f/f5|+|f/f6|=1.92.

Figure 27:
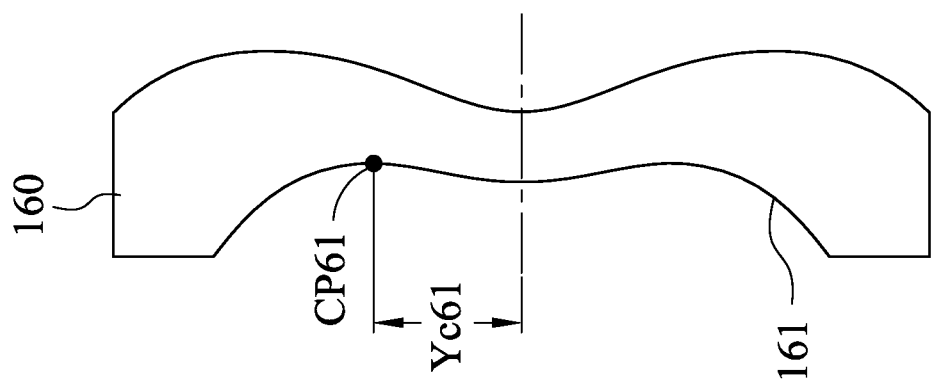
FIG. 27 shows a schematic view of the parameter Yc61 according to the 1st embodiment of FIG. 1.

FIG. 27 shows a schematic view of the parameter Yc61 according to the 1st embodiment of FIG. 1. In FIG. 27, when a vertical distance between a critical point in an off-axis region on the object-side surface 161 of the sixth lens element 160 and the optical axis is Yc61, and the focal length of the imaging optical lens assembly is f, the following condition is satisfied: Yc61/f=0.39.

The detailed optical data of the 1st embodiment are shown in TABLE 1 and the aspheric surface data are shown in TABLE 2 below.

TABLE 1

1st Embodiment
f = 2.35 mm, Fno = 2.20, HFOV = 60.0 deg.

| Surface # | | Curvature Radius | | Thickness | Material | Index | Abbe # | Length |
|---|---|---|---|---|---|---|---|---|
| 0 | Object | Plano | | Infinity | | | | |
| 1 | Lens 1 | 4.838 | ASP | 0.200 | Plastic | 1.544 | 56.0 | −2.94 |
| 2 | | 1.186 | ASP | 0.643 | | | | |
| 3 | Lens 2 | 1.781 | ASP | 0.682 | Plastic | 1.544 | 56.0 | 2.44 |
| 4 | | −4.535 | ASP | −0.040 | | | | |
| 5 | Ape. Stop | Plano | | 0.366 | | | | |
| 6 | Lens 3 | 2.708 | ASP | 0.200 | Plastic | 1.688 | 18.7 | −10.96 |
| 7 | | 1.932 | ASP | 0.200 | | | | |
| 8 | Lens 4 | 8.828 | ASP | 0.785 | Plastic | 1.544 | 56.0 | 19.72 |
| 9 | | 48.281 | ASP | 0.287 | | | | |
| 10 | Lens 5 | 3.628 | ASP | 0.805 | Plastic | 1.544 | 56.0 | 2.09 |
| 11 | | −1.523 | ASP | 0.139 | | | | |
| 12 | Lens 6 | 1.914 | ASP | 0.431 | Plastic | 1.688 | 18.7 | −2.96 |
| 13 | | 0.897 | ASP | 0.600 | | | | |
| 14 | IR-cut filter | Plano | | 0.210 | Glass | 1.517 | 64.2 | — |
| 15 | | Plano | | 0.491 | | | | |
| 16 | Image | Plano | | — | | | | |

Reference wavelength is 587.6 nm (d-line).
Effective radius of Surface 3 is 0.840 mm.

TABLE 2

Aspheric Coefficients

| | Surface # | | | | | |
|---|---|---|---|---|---|---|
| | 1 | 2 | 3 | 4 | 6 | 7 |
| k = | −2.4086E+01 | −6.8338E+00 | 2.2613E+00 | 2.6844E+01 | −2.7335E+01 | −6.1160E−01 |
| A4 = | 1.4449E−01 | 6.7536E−01 | 4.7689E−03 | −1.8074E−02 | −1.4469E−01 | −2.7264E−01 |
| A6 = | −2.0392E−01 | −8.0818E−01 | 6.8477E−03 | 1.7573E−01 | −1.4968E−01 | 2.1358E−01 |
| A8 = | 1.3503E−01 | 9.1061E−01 | −9.4145E−02 | −4.0508E−01 | 3.0039E−01 | −2.6876E−01 |
| A10 = | −5.7442E−02 | −7.8255E−01 | 2.7276E−01 | 1.5588E+00 | −6.6491E−01 | 2.9168E−01 |
| A12 = | 1.4335E−02 | 4.1580E−01 | −4.1266E−01 | −2.6606E+00 | 9.0807E−01 | −1.7269E−01 |

TABLE 2-continued

| Aspheric Coefficients | | | | | | |
|---|---|---|---|---|---|---|
| A14 = | −1.5763E−03 | −8.6688E−02 | 2.6682E−01 | 2.1193E+00 | −5.2800E−01 | 4.1267E−02 |

| Surface # | | | | | |
|---|---|---|---|---|---|
| 8 | 9 | 10 | 11 | 12 | 13 |
| k = −1.6113E+01 | −1.0000E+00 | −6.1043E+01 | −4.6335E−01 | −1.4890E+00 | −1.0516E+00 |
| A4 = −7.1535E−02 | −1.5803E−01 | 1.5665E−01 | 3.7328E−01 | −4.5827E−02 | −4.0458E−01 |
| A6 = 1.3312E−01 | −1.3666E−02 | −2.4627E−01 | −3.6752E−01 | −2.7907E−01 | −2.1144E−01 |
| A8 = −1.0579E−01 | 6.0327E−02 | 1.8322E−01 | 2.9387E−01 | 3.0054E−01 | −7.8184E−02 |
| A10 = 5.0955E−02 | −4.1497E−02 | −1.0171E−01 | −1.8336E−01 | −1.5704E−01 | −2.0457E−02 |
| A12 = −1.4136E−02 | 2.2254E−02 | 3.6309E−02 | 8.4550E−02 | 4.6734E−02 | −3.8573E−03 |
| A14 = 2.1392E−03 | −6.2546E−03 | −6.7847E−03 | −2.8114E−02 | −8.1814E−03 | −5.1815E−04 |
| A16 = −1.7605E−04 | 6.0830E−04 | 4.9477E−04 | 6.4081E−03 | 8.2542E−04 | −4.7074E−05 |
| A18 = | | | −81278E−04 | −4.4083E−05 | −2.5737E−06 |
| A20 = | | | 5.2089E−05 | 9.5952E−07 | −6.3353E−08 |

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
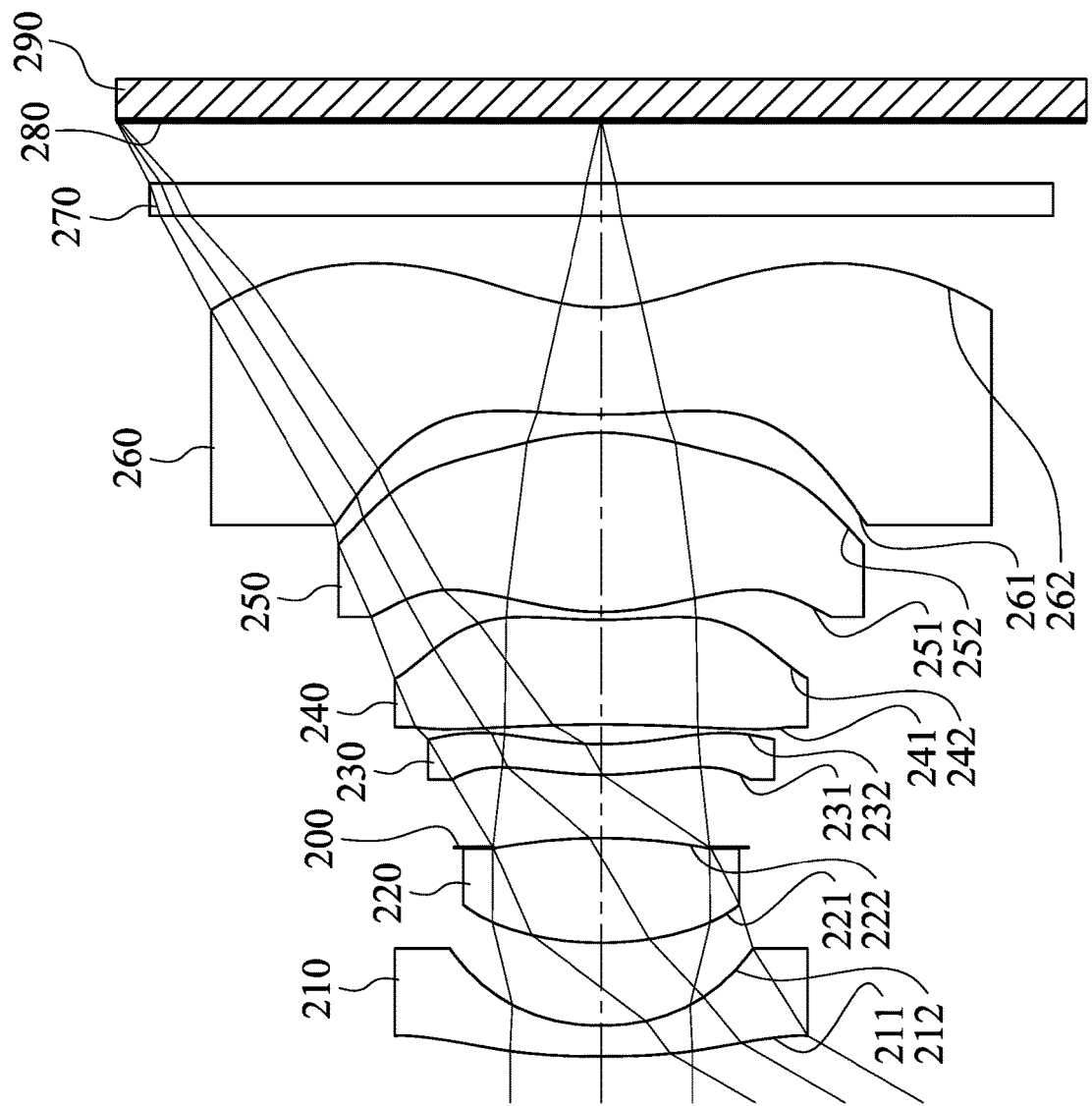
FIG. 3 is a schematic view of an imaging apparatus according to the 2nd embodiment of the present disclosure.
Figure 4:
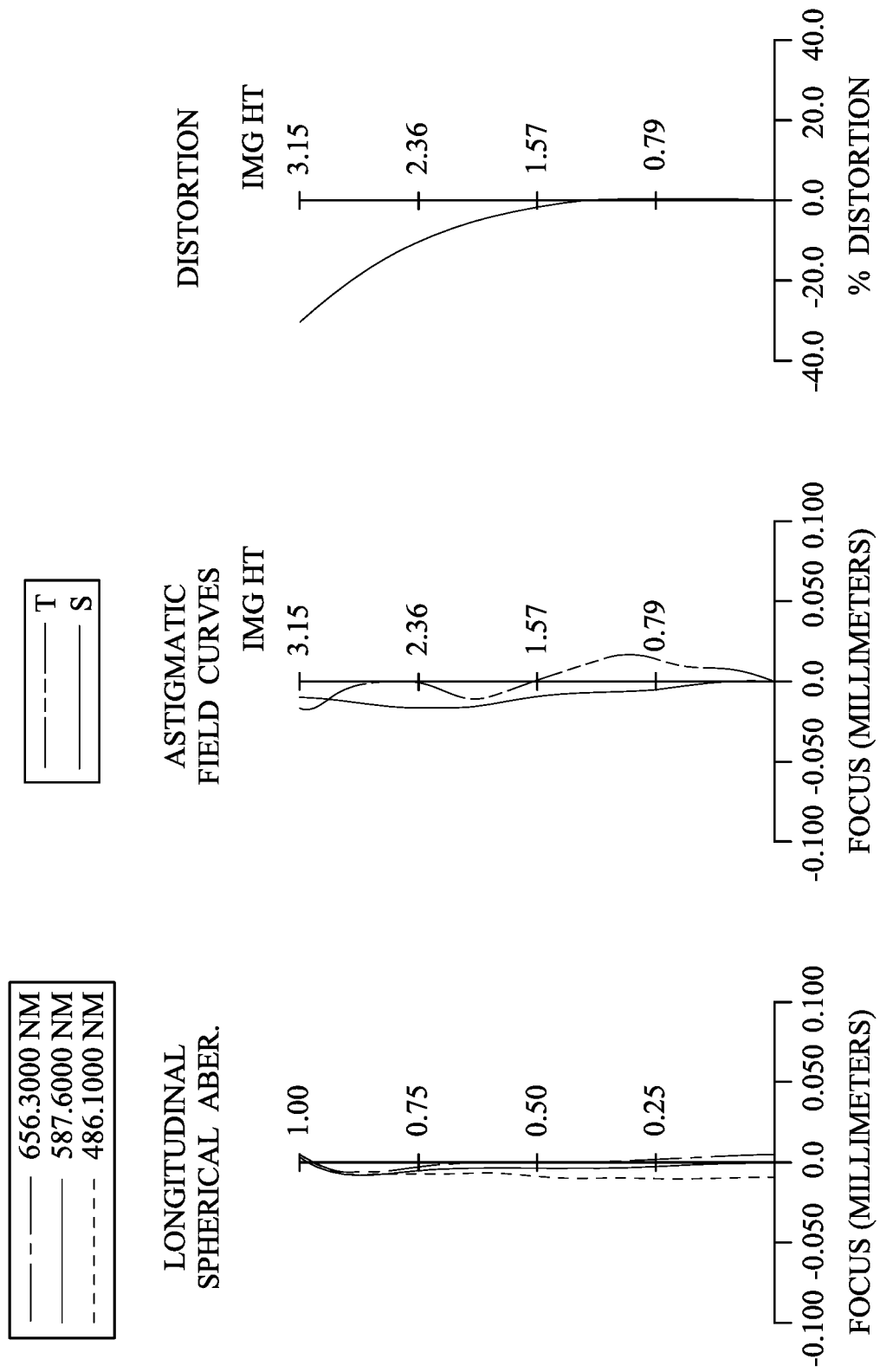
FIG. 4 shows spherical aberration curves, astigmatic field curves and a distortion curve of the imaging apparatus according to the 2nd embodiment.

FIG. 3 is a schematic view of an imaging apparatus according to the 2nd embodiment of the present disclosure. FIG. 4 shows spherical aberration curves, astigmatic field curves and a distortion curve of the imaging apparatus according to the 2nd embodiment. In FIG. 3, the imaging apparatus includes an imaging optical lens assembly (its reference numeral is omitted) and an image sensor 290. The imaging optical lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280. The image sensor 290 is disposed on the image surface 280 of the imaging optical lens assembly. The imaging optical lens assembly includes six lens elements (210, 220, 230, 240, 250 and 260) without additional one or more lens elements inserted between the first lens element 210 and the sixth lens element 260.

The first lens element 210 with negative refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric. Furthermore, the object-side surface 211 of the first lens element 210 includes at least one convex shape in an off-axis region thereof.

The second lens element 220 with positive refractive power has an object-side surface 221 being convex in a paraxial region thereof and an image-side surface 222 being convex in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, the object-side surface 231 of the third lens element 230 includes at least one concave critical point in an off-axis region thereof.

The fourth lens element 240 with negative refractive power has an object-side surface 241 being concave in a paraxial region thereof and an image-side surface 242 being concave in a paraxial region thereof. The fourth lens element 240 is made of a plastic material, and has the object-side surface 241 and the image-side surface 242 being both aspheric. Furthermore, the image-side surface 242 of the fourth lens element 240 includes at least one convex critical point in an off-axis region thereof.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric. Furthermore, the object-side surface 251 of the fifth lens element 250 includes at least one concave critical point in an off-axis region thereof.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex critical point in an off-axis region thereof.

The IR-cut filter 270 is made of a glass material and located between the sixth lens element 260 and the image surface 280, and will not affect the focal length of the imaging optical lens assembly.

The detailed optical data of the 2nd embodiment are shown in TABLE 3 and the aspheric surface data are shown in TABLE 4 below.

TABLE 3

2nd Embodiment
f = 2.61 mm, Fno = 2.20, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.450 | ASP | 0.200 | Plastic | 1.559 | 40.4 | −3.51 |
| 2 | | 1.537 | ASP | 0.538 | | | | |
| 3 | Lens 2 | 2.164 | ASP | 0.684 | Plastic | 1.530 | 55.8 | 2.78 |
| 4 | | −4.096 | ASP | −0.062 | | | | |
| 5 | Ape. Stop | Plano | | 0.474 | | | | |
| 6 | Lens 3 | 2.470 | ASP | 0.200 | Plastic | 1.669 | 19.5 | 88.08 |
| 7 | | 2.495 | ASP | 0.127 | | | | |
| 8 | Lens 4 | −8.996 | ASP | 0.679 | Plastic | 1.515 | 56.5 | −4.65 |
| 9 | | 3.343 | ASP | 0.052 | | | | |
| 10 | Lens 5 | 1.690 | ASP | 1.169 | Plastic | 1.544 | 56.0 | 1.67 |
| 11 | | −1.490 | ASP | 0.117 | | | | |
| 12 | Lens 6 | 5.100 | ASP | 0.695 | Plastic | 1.688 | 18.7 | −2.38 |
| 13 | | 1.172 | ASP | 0.600 | | | | |
| 14 | IR-cut filter | Plano | | 0.210 | Glass | 1.517 | 64.2 | — |
| 15 | | Plano | | 0.407 | | | | |
| 16 | Image | Plano | | — | | | | |

Reference wavelength is 587.6 nm (d-line).

TABLE 4

Aspheric Coefficients

| | Surface # | | | | | |
|---|---|---|---|---|---|---|
| | 1 | 2 | 3 | 4 | 6 | 7 |
| k = | −2.4750E+01 | −1.1788E+01 | 3.6063E+00 | 2.2411E+01 | −3.4083E+01 | −7.8058E−02 |
| A4 = | 1.5408E−01 | 6.1419E−01 | −8.4279E−03 | −2.0866E−02 | 1.1695E−01 | −5.3808E−02 |
| A6 = | −1.9841E−01 | −7.4719E−01 | 1.2197E−02 | 1.1742E−01 | −8.5949E−01 | −3.5563E−01 |
| A8 = | 1.3091E−01 | 8.8941E−01 | −1.1869E−01 | −2.7411E−01 | 1.6820E+00 | 6.1788E−01 |
| A10 = | −5.5575E−02 | −7.3811E−01 | 2.8716E−01 | 1.1399E+00 | −2.2876E+00 | −6.7695E−01 |
| A12 = | 1.3148E−02 | 3.9618E−01 | −3.2989E−01 | −1.8972E+00 | 1.6319E+00 | 4.0804E−01 |
| A14 = | −1.3478E−03 | −8.5225E−02 | 1.6260E−01 | 1.4651E+00 | −4.4904E−01 | −9.5128E−02 |

| | Surface # | | | | | |
|---|---|---|---|---|---|---|
| | 8 | 9 | 10 | 11 | 12 | 13 |
| k = | 1.5442E+01 | −4.2557E+01 | −6.6841E+00 | −4.0915E−01 | −5.1227E−01 | −1.0082E+00 |
| A4 = | 4.6995E−02 | −2.0055E−01 | −3.9550E−02 | 3.4136E−01 | −1.8986E−02 | −2.9489E−01 |
| A6 = | −4.5714E−02 | −8.0056E−02 | −1.7403E−02 | −4.3001E−01 | −2.8473E−01 | 1.4730E−01 |
| A8 = | −7.9018E−03 | 1.1904E−01 | −3.8054E−02 | 5.9570E−01 | 3.0498E−01 | −5.8146E−02 |
| A10 = | 6.7329E−02 | −1.1628E−01 | 4.2761E−02 | −6.4453E−01 | −1.8179E−01 | 1.7003E−02 |
| A12 = | −4.5562E−02 | 8.3507E−02 | −3.7345E−02 | 4.5249E−01 | 6.5258E−02 | −3.5746E−03 |
| A14 = | 1.2005E−02 | −2.6254E−02 | 2.0410E−02 | −2.0147E−01 | −1.3893E−02 | 5.2167E−04 |
| A16 = | −1.2327E−03 | 2.7820E−03 | −3.8896E−03 | 5.5100E−02 | 1.6858E−03 | −4.9989E−05 |
| A18 = | | | −3.4693E−04 | −8.3980E−03 | −1.0668E−04 | 2.8226E−06 |
| A20 = | | | 1.2826E−04 | 5.4309E−04 | 2.7140E−06 | −7.1051E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 2.61 | ΣAT/T12 | 2.32 |
| Fno | 2.20 | Y11/Y62 | 0.53 |
| HFOV (deg.) | 60.0 | f/R1 | 0.35 |
| V3 + V6 | 38.2 | \|f1/f4\| | 0.75 |
| TL/ImgH | 1.93 | \|f2/f3\| + \|f2/f4\| | 0.63 |
| ImgH/f | 1.21 | \|f2/f4\| | 0.60 |
| (R3 + R4)/(R3 − R4) | −0.31 | \|f3/f4\| | 18.95 |
| (R9 + R10)/(R9 − R10) | 0.06 | f5/f2 | 0.60 |
| \|R10/R9\| | 0.88 | \|f5/f4\| | 0.36 |
| CT4/CT3 | 3.40 | \|f6/f4\| | 0.51 |
| CT4/T34 | 5.35 | \|f/f5\| + \|f/f6\| | 2.66 |
| T12/T23 | 1.31 | Yc61/f | 0.25 |

3rd Embodiment

Figure 5:
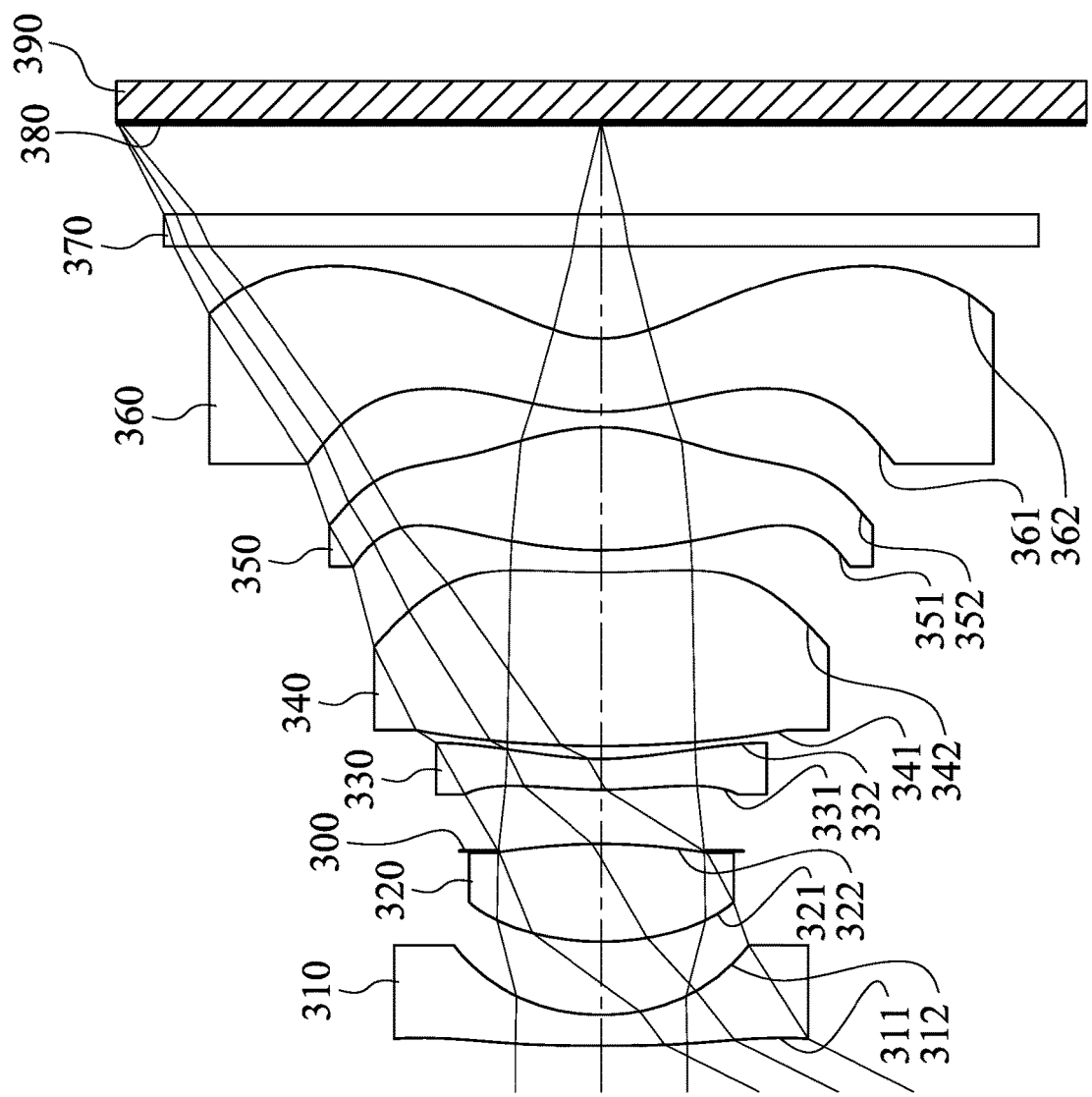
FIG. 5 is a schematic view of an imaging apparatus according to the 3rd embodiment of the present disclosure.
Figure 6:
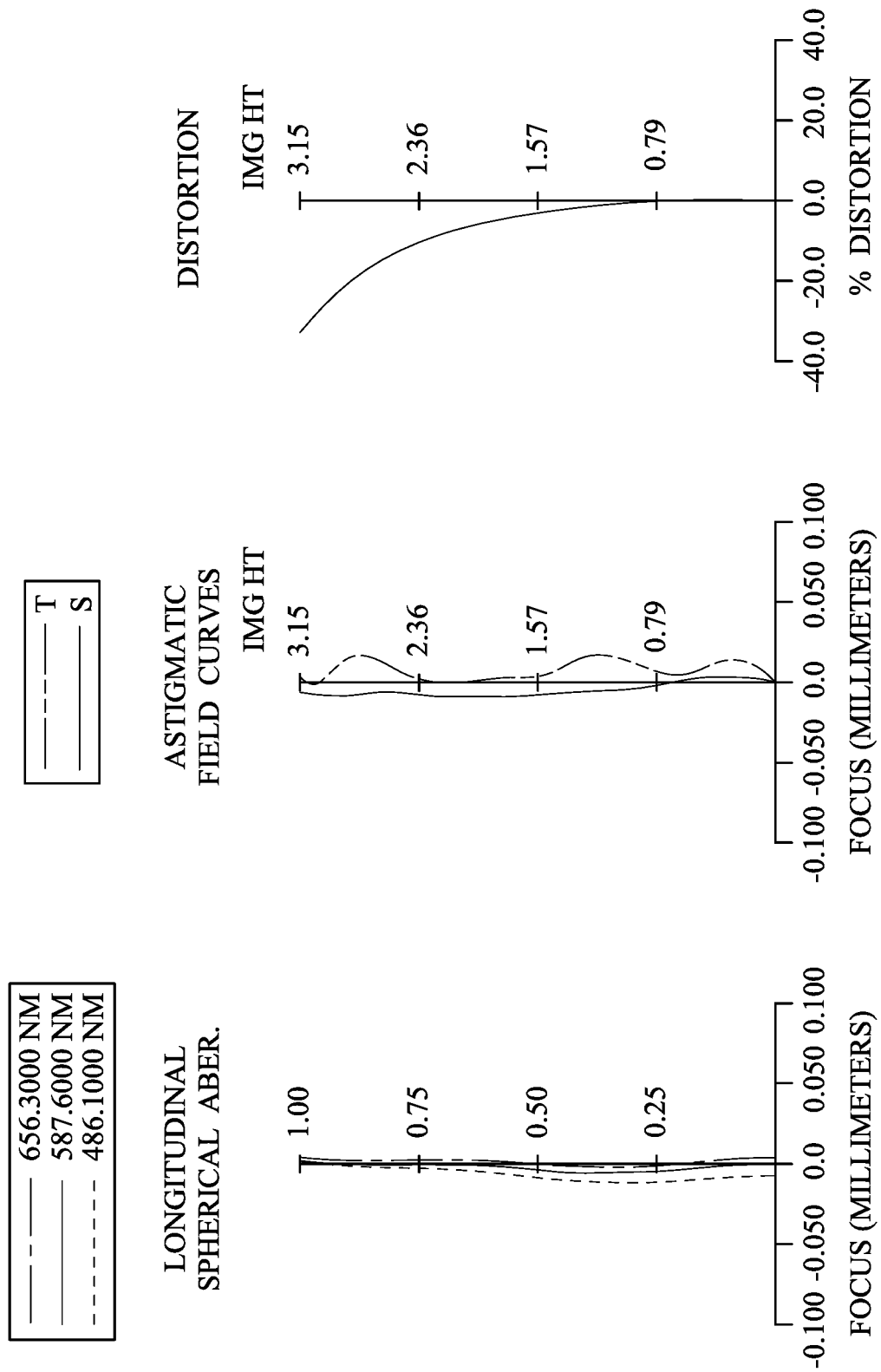
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes an imaging optical lens assembly (its reference numeral is omitted) and an image sensor 390. The imaging optical lens assembly includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image surface 380. The image sensor 390 is disposed on the image surface 380 of the imaging optical lens assembly. The imaging optical lens assembly includes six lens elements (310, 320, 330, 340, 350 and 360) without additional one or more lens elements inserted between the first lens element 310 and the sixth lens element 360.

The first lens element 310 with negative refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric. Furthermore, the object-side surface 311 of the first lens element 310 includes at least one convex shape in an off-axis region thereof.

The second lens element 320 with positive refractive power has an object-side surface 321 being convex in a paraxial region thereof and an image-side surface 322 being convex in a paraxial region thereof. The second lens element 320 is made of a plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of a plastic material, and has the object-side surface 331 and the image-side surface 332 being both aspheric. Furthermore, the object-side surface 331 of the third lens element 330 includes at least one concave critical point in an off-axis region thereof.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric. Furthermore, the image-side surface 342 of the fourth lens element 340 includes at least one convex critical point in an off-axis region thereof.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric. Furthermore, the object-side surface 351 of the fifth lens element 350 includes at least one concave critical point in an off-axis region thereof.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex critical point in an off-axis region thereof.

The IR-cut filter 370 is made of a glass material and located between the sixth lens element 360 and the image surface 380, and will not affect the focal length of the imaging optical lens assembly.

The detailed optical data of the 3rd embodiment are shown in TABLE 5 and the aspheric surface data are shown in TABLE 6 below.

TABLE 5

3rd Embodiment
f = 2.35 mm, Fno = 2.10, HFOV = 63.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 30.902 | ASP | 0.200 | Plastic | 1.544 | 56.1 | −2.93 |
| 2 | | 1.515 | ASP | 0.475 | | | | |
| 3 | Lens 2 | 1.913 | ASP | 0.639 | Plastic | 1.544 | 56.0 | 2.51 |
| 4 | | −4.218 | ASP | −0.048 | | | | |
| 5 | Ape. Stop | Plano | | 0.399 | | | | |
| 6 | Lens 3 | 3.359 | ASP | 0.200 | Plastic | 1.688 | 18.7 | −9.34 |
| 7 | | 2.152 | ASP | 0.084 | | | | |
| 8 | Lens 4 | 6.105 | ASP | 1.128 | Plastic | 1.514 | 56.8 | −43.18 |
| 9 | | 4.488 | ASP | 0.148 | | | | |
| 10 | Lens 5 | 2.767 | ASP | 0.797 | Plastic | 1.544 | 56.0 | 1.79 |
| 11 | | −1.347 | ASP | 0.100 | | | | |
| 12 | Lens 6 | 1.558 | ASP | 0.477 | Plastic | 1.688 | 18.7 | −3.17 |
| 13 | | 0.795 | ASP | 0.600 | | | | |
| 14 | IR-cut filter | Plano | | 0.210 | Glass | 1.517 | 64.2 | — |
| 15 | | Plano | | 0.594 | | | | |
| 16 | Image | Plano | | — | | | | |

Reference wavelength is 587.6 nm (d-line).

TABLE 6

Aspheric Coefficients

| Surface # | | | | | | |
|---|---|---|---|---|---|---|
| | 1 | 2 | 3 | 4 | 6 | 7 |
| k = | −2.1588E+01 | −1.4680E+01 | 1.7138E+00 | 1.5239E+01 | −5.3433E+01 | 2.0562E−01 |
| A4 = | 1.3775E−01 | 7.0004E−01 | 1.5497E−02 | −1.4712E−02 | −5.2725E−02 | −2.3794E−01 |
| A6 = | −2.0573E−01 | −1.0629E+00 | 6.9164E−02 | 1.2257E−01 | −3.4078E−01 | 2.1614E−01 |
| A8 = | 1.4813E−01 | 1.5146E+00 | −3.3887E−01 | −3.8165E−01 | 8.1428E−01 | −2.6656E−01 |
| A10 = | −6.5198E−02 | −1.5561E+00 | 8.7699E−01 | 1.2056E+00 | −1.5454E+00 | 2.2453E−01 |
| A12 = | 1.6233E−02 | 9.5826E−01 | −1.0874E+00 | −1.7464E+00 | 1.6380E+00 | −1.0241E−01 |
| A14 = | −1.7425E−03 | −2.2163E−01 | 6.0873E−01 | 1.1542E+00 | −7.5058E−01 | 1.9245E−02 |

| Surface # | | | | | | |
|---|---|---|---|---|---|---|
| | 8 | 9 | 10 | 11 | 12 | 13 |
| k = | −2.1215E+01 | −7.8231E+01 | −1.2347E+00 | −6.1481E−01 | −8.0341E−01 | −2.9933E+00 |
| A4 = | −9.3162E−02 | −1.3680E−01 | −5.7629E−02 | 2.2547E−01 | −2.5022E−01 | −1.2453E−01 |
| A6 = | 2.4396E−01 | 3.4611E−02 | 1.0687E−01 | −1.2223E−01 | 1.3503E−01 | 6.5715E−02 |
| A8 = | −2.8503E−01 | −1.2983E−01 | −1.7530E−01 | 2.4506E−01 | −1.1152E−01 | −3.0600E−02 |
| A10 = | 1.8675E−01 | 1.3753E−01 | 1.7089E−01 | −2.9856E−01 | 7.5367E−02 | 1.1967E−02 |
| A12 = | −6.9619E−02 | −6.4410E−02 | −1.3336E−01 | 1.8658E−01 | −3.2188E−02 | −3.5205E−03 |
| A14 = | 1.4031E−02 | 1.4578E−02 | 7.2857E−02 | −6.5938E−02 | 7.9817E−03 | 6.9682E−04 |
| A16 = | −1.2613E−03 | −1.2738E−03 | −2.4694E−02 | 1.3131E−02 | −1.1011E−03 | −8.5627E−05 |
| A18 = | | | 4.5695E−03 | −1.3287E−03 | 7.7837E−05 | 5.8568E−06 |
| A20 = | | | −3.4773E−04 | 5.0044E−05 | −2.1894E−06 | −1.6973E−07 | in the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 2.35 | ΣAT/T12 | 2.44 |
| Fno | 2.10 | Y11/Y62 | 0.53 |
| HFOV (deg.) | 63.4 | f/R1 | 0.08 |
| V3 + V6 | 37.4 | |f1/f4| | 0.07 |
| TL/ImgH | 1.91 | |f2/f3| + |f2/f4| | 0.33 |
| ImgH/f | 1.34 | |f2/f4| | 0.06 |
| (R3 + R4)/(R3 − R4) | −0.38 | |f3/f4| | 0.22 |
| (R9 + R10)/(R9 − R10) | 0.35 | f5/f2 | 0.71 |
| |R10/R9| | 0.49 | |f5/f4| | 0.04 |
| CT4/CT3 | 5.64 | |f6/f4| | 0.07 |
| CT4/T34 | 13.43 | |f/f5| + |f/f6| | 2.05 |
| T12/T23 | 1.35 | Yc61/f | 0.45 |

4th Embodiment

Figure 7:
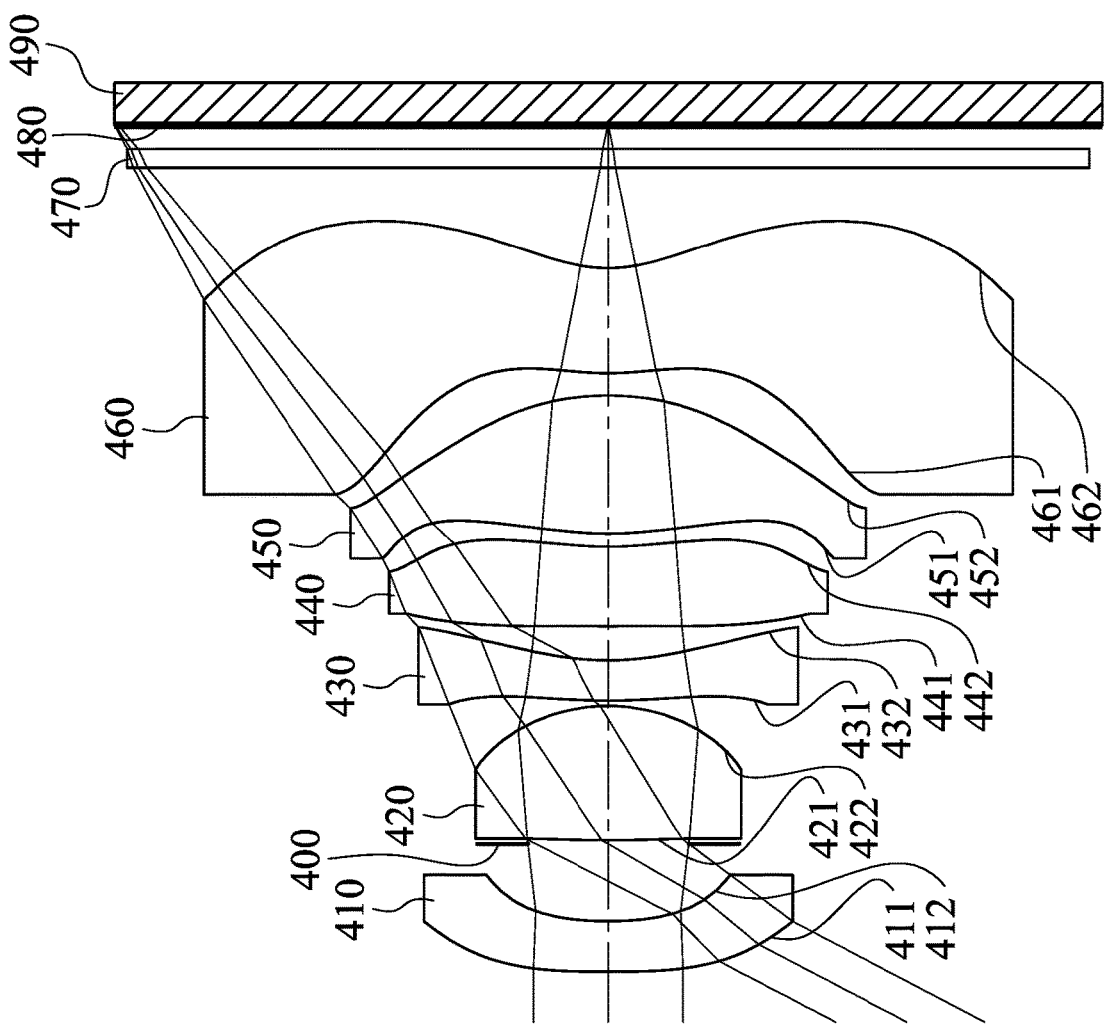
FIG. 7 is a schematic view of an imaging apparatus according to the 4th embodiment of the present disclosure.
Figure 8:
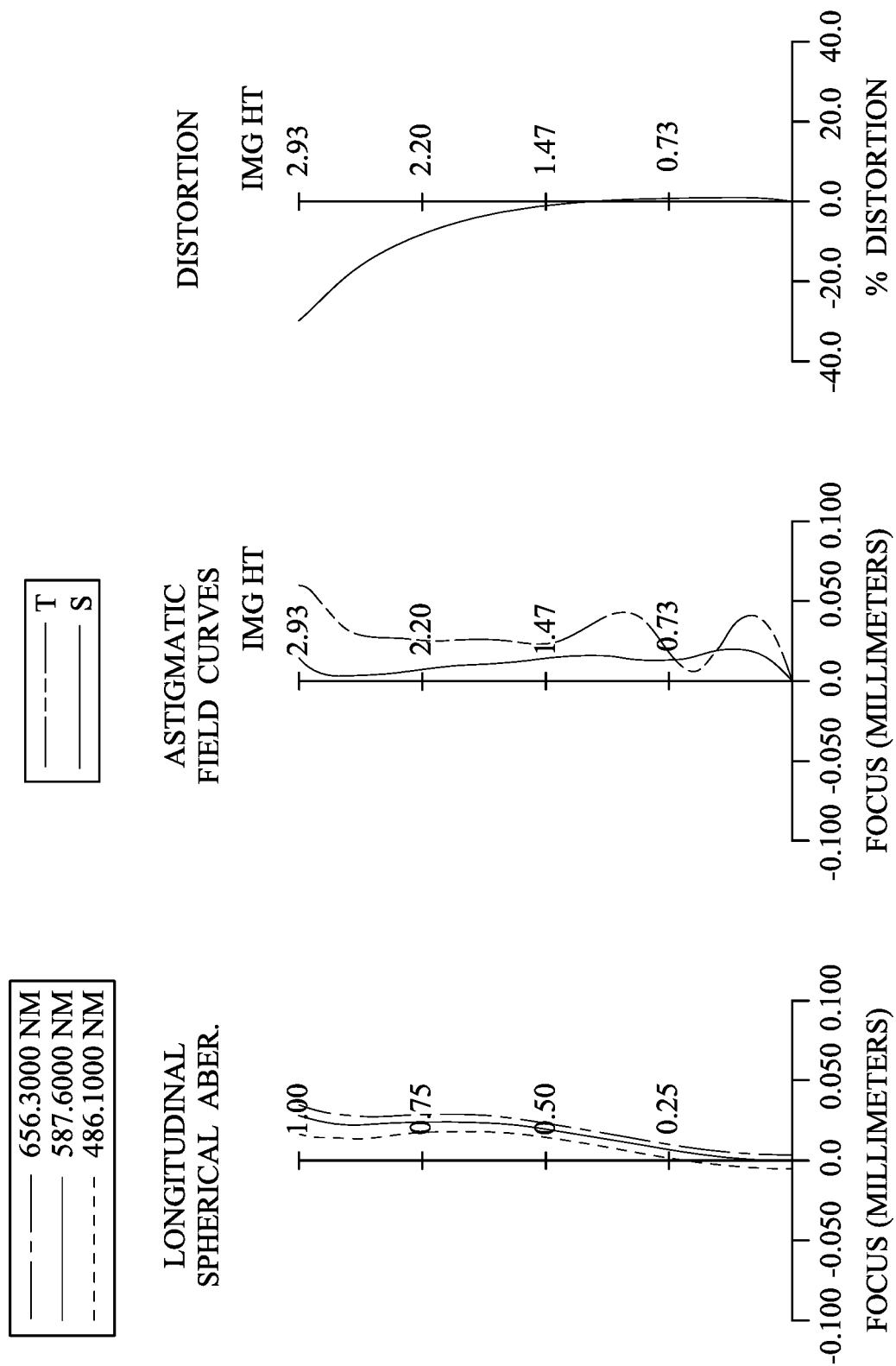
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes an imaging optical lens assembly (its reference numeral is omitted) and an image sensor 490. The imaging optical lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480. The image sensor 490 is disposed on the image surface 480 of the imaging optical lens assembly. The imaging optical lens assembly includes six lens elements (410, 420, 430, 440, 450 and 460) without additional one or more lens elements inserted between the first lens element 410 and the sixth lens element 460.

The first lens element 410 with negative refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric. Furthermore, the object-side surface 411 of the first lens element 410 includes at least one convex shape in an off-axis region thereof.

The second lens element 420 with positive refractive power has an object-side surface 421 being convex in a paraxial region thereof and an image-side surface 422 being convex in a paraxial region thereof. The second lens element 420 is made of a plastic material, and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of a plastic material, and has the object-side surface 431 and the image-side surface 432 being both aspheric. Furthermore, the object-side surface 431 of the third lens element 430 includes at least one concave critical point in an off-axis region thereof.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, the image-side surface 442 of the fourth lens element 440 includes at least one convex critical point in an off-axis region thereof.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric. Furthermore, the object-side surface 451 of the fifth lens element 450 includes at least one concave critical point in an off-axis region thereof.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex critical point in an off-axis region thereof.

The IR-cut filter 470 is made of a glass material and located between the sixth lens element 460 arid the image surface 480, and will not affect the focal length of the imaging optical lens assembly.

The detailed optical data of the 4th embodiment are shown in TABLE 7 and the aspheric surface data are shown in TABLE 8 below.

TABLE 7

4th Embodiment
f = 2.19 mm, Fno = 2.45, HFOV = 62.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.404 | ASP | 0.300 | Plastic | 1.515 | 56.8 | −5.60 |
| 2 | | 2.282 | ASP | 0.460 | | | | |
| 3 | Ape. Stop | Plano | | 0.022 | | | | |
| 4 | Lens 2 | 7.528 | ASP | 0.802 | Plastic | 1.550 | 50.9 | 1.75 |
| 5 | | −1.064 | ASP | 0.030 | | | | |
| 6 | Lens 3 | 3.698 | ASP | 0.240 | Plastic | 1.666 | 20.3 | −4.64 |
| 7 | | 1.639 | ASP | 0.202 | | | | |
| 8 | Lens 4 | 31.642 | ASP | 0.474 | Plastic | 1.515 | 56.8 | −4.64 |
| 9 | | 2.210 | ASP | 0.080 | | | | |
| 10 | Lens 5 | 2.248 | ASP | 0.821 | Plastic | 1.544 | 55.9 | 2.01 |
| 11 | | −1.859 | ASP | 0.135 | | | | |
| 12 | Lens 6 | 1.816 | ASP | 0.624 | Plastic | 1.610 | 27.0 | −3.55 |
| 13 | | 0.859 | ASP | 0.600 | | | | |
| 14 | IR-cut filter | Plano | | 0.110 | Glass | 1.517 | 64.2 | — |
| 15 | | Plano | | 0.142 | | | | |
| 16 | Image | Plano | | — | | | | |

Reference wavelength is 587.6 nm (d-line).
Effective radius of Surface 5 is 0.790 mm.

TABLE 8

Aspheric Coefficients

| Surface # | 1 | 2 | 4 | 5 | 6 | 7 |
|---|---|---|---|---|---|---|
| k = | 9.0000E+01 | −1.1048E+01 | 0.0000E+00 | 5.1716E−02 | 6.8361E+00 | −1.9435E−01 |
| A4 = | 2.8857E−01 | 6.4135E−01 | −5.8262E−02 | 7.5595E−02 | −2.6024E−01 | −3.1534E−01 |
| A6 = | −2.5156E−01 | −4.4667E−01 | −2.8345E−01 | −1.5815E−01 | 3.2666E−01 | 4.4222E−01 |
| A8 = | 2.5589E−01 | 1.1619E+00 | 7.3691E−01 | 2.0673E−01 | −6.8092E−01 | −5.7649E−01 |
| A10 = | −1.6707E−01 | −1.0596E+00 | −2.6381E+00 | −1.2762E+00 | 7.0127E−01 | 4.6026E−01 |
| A12 = | 5.9598E−02 | 1.6549E+00 | | 2.7830E+00 | −3.5681E−01 | −1.9944E−01 |
| A14 = | −1.4365E−02 | −1.2356E+00 | | −2.4200E+00 | 6.1712E−02 | |

| Surface # | 8 | 9 | 10 | 11 | 12 | 13 |
|---|---|---|---|---|---|---|
| k = | −8.9596E+01 | −2.5439E+01 | −7.2794E+00 | −6.2218E−02 | −3.2141E+01 | −3.7701E+00 |
| A4 = | −1.6459E−02 | −2.3271E−01 | −2.0697E−01 | −3.2904E−01 | −3.4369E−01 | −2.0896E−01 |
| A6 = | −3.3139E−04 | 5.0367E−01 | 3.6749E−01 | 7.3571E−01 | −1.1615E−01 | 1.3585E−01 |
| A8 = | 1.6228E−01 | −1.2534E+00 | −6.2432E−01 | −9.6767E−01 | 4.4359E−01 | −5.6926E−02 |
| A10 = | −2.2820E−01 | 1.7733E+00 | 6.0871E−01 | 8.4053E−01 | −4.0582E−01 | 1.4656E−02 |
| A12 = | 1.3345E−01 | −1.4411E+00 | −3.1540E−01 | −4.3468E−01 | 1.7932E−01 | −2.2576E−03 |
| A14 = | −3.0100E−02 | 6.1329E−01 | 6.3228E−02 | 1.1858E−01 | −3.7793E−02 | 1.8848E−04 |
| A16 = | | −1.0364E−01 | | −1.2969E−02 | 3.0227E−03 | −6.4662E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 2.19 | ΣAT/T12 | 1.93 |
| Fno | 2.45 | Y11/Y62 | 0.43 |
| HFOV (deg.) | 62.3 | f/R1 | 0.19 |
| V3 + V6 | 47.3 | \|f1/f4\| | 1.21 |
| TL/ImgH | 1.72 | \|f2/f3\| + \|f2/f4\| | 0.76 |
| ImgH/f | 1.34 | \|f2/f4\| | 0.38 |
| (R3 + R4)/(R3 − R4) | 0.75 | \|f3/f4\| | 1.00 |
| (R9 + R10)/(R9 − R10) | 0.09 | f5/f2 | 1.15 |
| \|R10/R9\| | 0.83 | \|f5/f4\| | 0.43 |
| CT4/CT3 | 1.98 | \|f6/f4\| | 0.76 |
| CT4/T34 | 2.35 | \|f/f5\| + \|f/f6\| | 1.70 |
| T12/T23 | 16.07 | Yc61/f | 0.22 |

5th Embodiment

Figure 9:
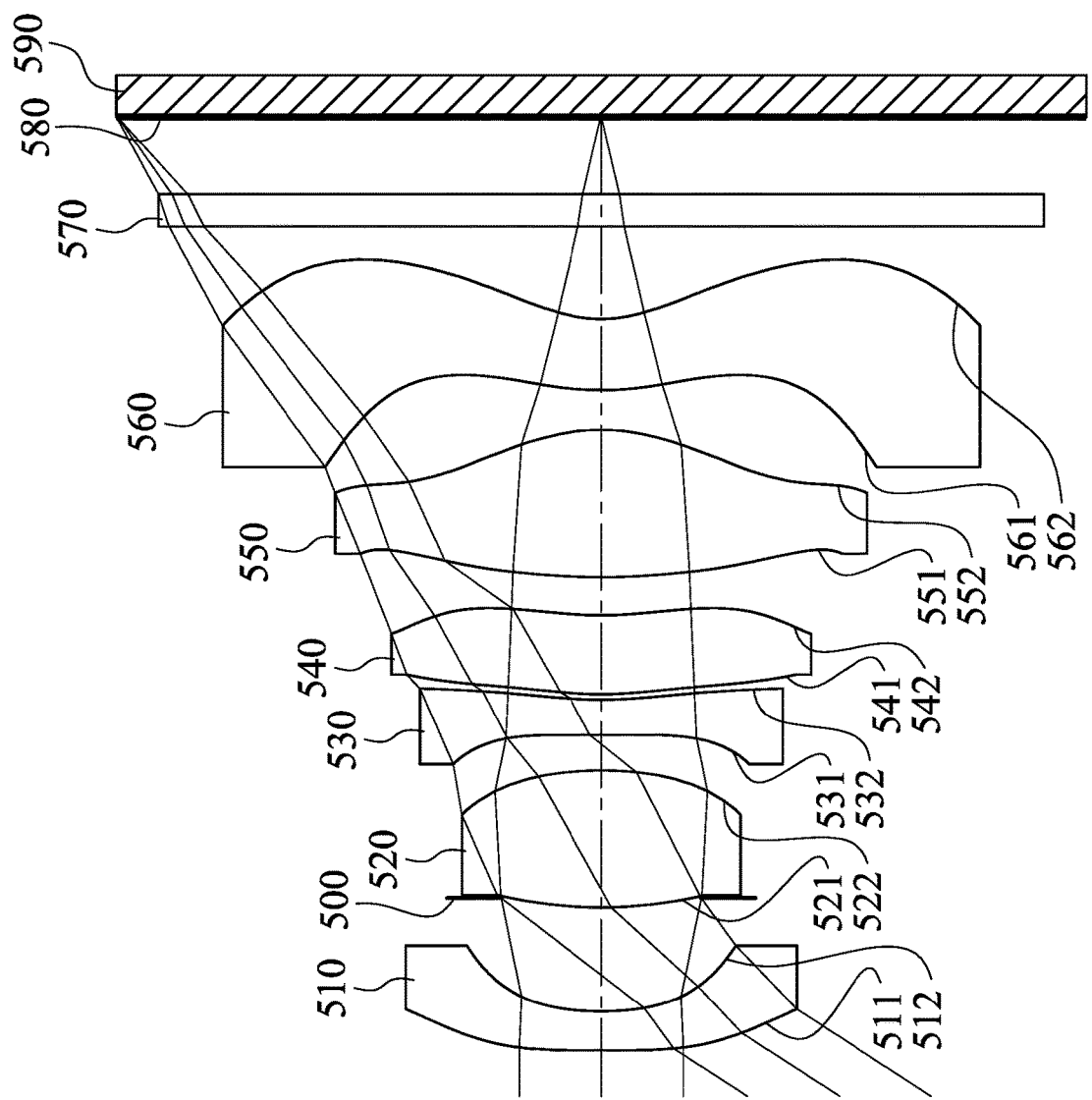
FIG. 9 is a schematic view of an imaging apparatus according to the 5th embodiment of the present disclosure.
Figure 10:
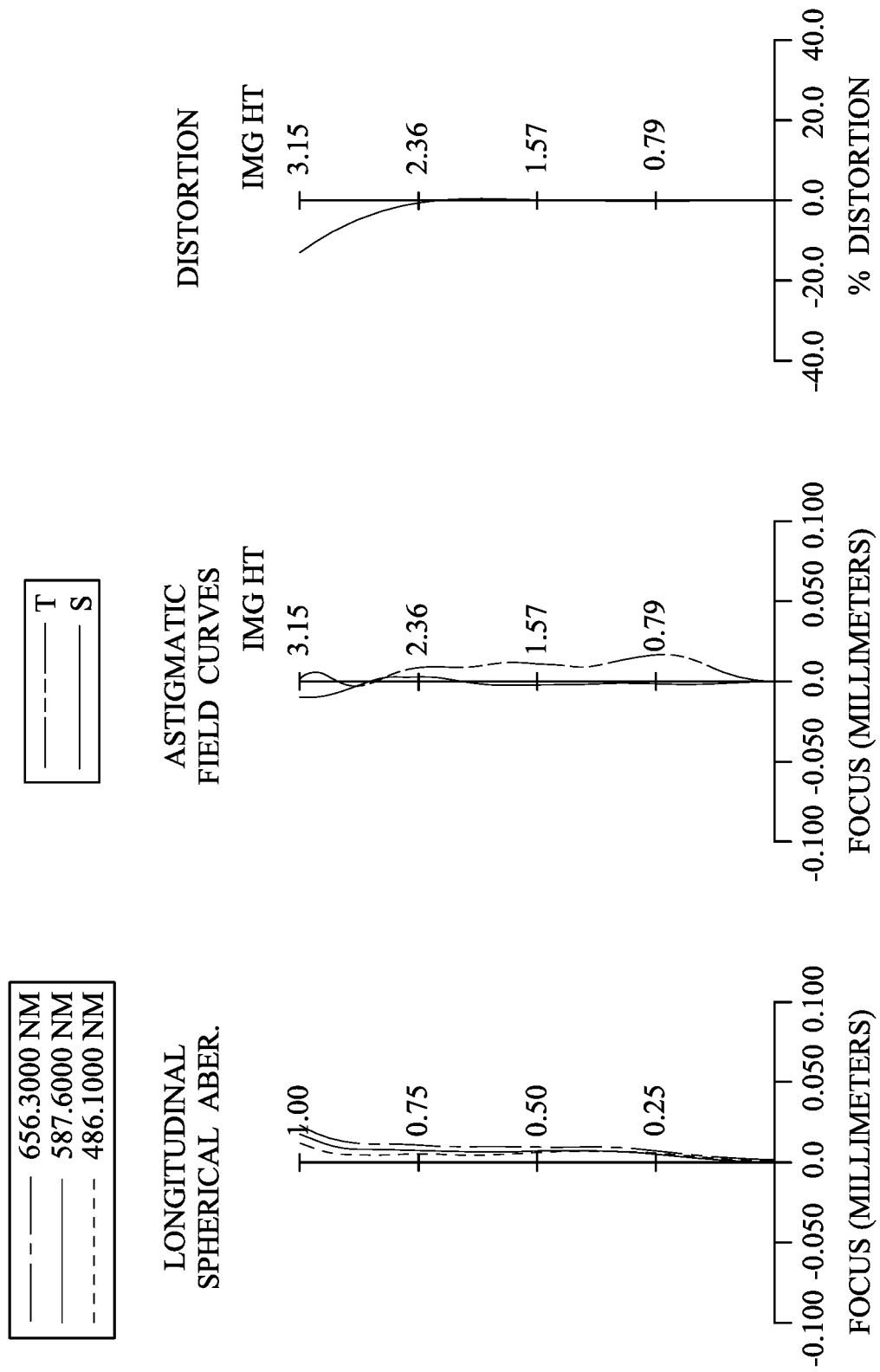
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes an imaging optical lens assembly (its reference numeral is omitted) and an image sensor 590. The imaging optical lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580. The image sensor 590 is disposed on the image surface 580 of the imaging optical lens assembly. The imaging optical lens assembly includes six lens elements (510, 520, 530, 540, 550 and 560) without additional one or more lens elements inserted between the first lens element 510 and the sixth lens element 560.

The first lens element 510 with negative refractive power has an object-side surface 511 being concave in a paraxial region thereof and an image-side surface 512 being concave in a paraxial region thereof. The first lens element 510 is made of a plastic material, and has the object-side surface 511 and the image-side surface 512 being both aspheric. Furthermore, the object-side surface 511 of the first lens element 510 includes at least one convex shape in an off-axis region thereof.

The second lens element 520 with positive refractive power has an object-side surface 521 being convex in a paraxial region thereof and an image-side surface 522 being convex in a paraxial region thereof. The second lens element 520 is made of a plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of a plastic material, and has the object-side surface 531 and the image-side surface 532 being both aspheric. Furthermore, the object-side surface 531 of the third lens element 530 includes at least one concave critical point in an off-axis region thereof.

The fourth lens element 540 with positive refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, the image-side surface 542 of the fourth lens element 540 includes at least one convex critical point in an off-axis region thereof.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric. Furthermore, the object-side surface 551 of the fifth lens element 550 includes at least one concave critical point in an off-axis region thereof.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex critical point in an off-axis region thereof.

The IR-cut filter 570 is made of a glass material and located between the sixth lens element 560 and the image surface 580, and will not affect the focal length of the imaging optical lens assembly.

The detailed optical data of the 5th embodiment are shown in TABLE 9 and the aspheric surface data are shown in TABLE 10 below.

TABLE 9

5th Embodiment
f = 2.35 mm, Fno = 2.20, HFOV = 57.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −50.000 ASP | 0.254 | Plastic | 1.545 | 56.1 | −3.76 |
| 2 | | 2.140 ASP | 0.738 | | | | |
| 3 | Ape. Stop | Plano | −0.062 | | | | |
| 4 | Lens 2 | 2.794 ASP | 0.891 | Plastic | 1.545 | 56.1 | 2.56 |
| 5 | | −2.481 ASP | 0.233 | | | | |
| 6 | Lens 3 | 22.002 ASP | 0.230 | Plastic | 1.639 | 23.5 | −5.09 |
| 7 | | 2.820 ASP | 0.035 | | | | |

TABLE 9-continued

5th Embodiment
f = 2.35 mm, Fno = 2.20, HFOV = 57.0 deg.

| Surface # | | Curvature Radius | Thickness | Material | Index | Abbe # | Focal Length |
|---|---|---|---|---|---|---|---|
| 8 | Lens 4 | 2.278 ASP | 0.515 | Plastic | 1.544 | 56.0 | 25.41 |
| 9 | | 2.510 ASP | 0.247 | | | | |
| 10 | Lens 5 | 4.761 ASP | 0.959 | Plastic | 1.544 | 56.0 | 1.90 |
| 11 | | −1.227 ASP | 0.262 | | | | |
| 12 | Lens 6 | 2.030 ASP | 0.461 | Plastic | 1.660 | 20.4 | −2.89 |
| 13 | | 0.894 ASP | 0.600 | | | | |
| 14 | IR-cut filter | Plano | 0.210 | Glass | 1.517 | 64.2 | — |
| 15 | | Plano | 0.507 | | | | |
| 16 | Image | Plano | — | | | | |

Reference wavelength is 587.6 nm (d-line).

TABLE 10

Aspheric Coefficients

| | Surface # | | | | | |
|---|---|---|---|---|---|---|
| | 1 | 2 | 4 | 5 | 6 | 7 |
| k = | −1.0000E+00 | −2.8392E+01 | 3.7888E+00 | 3.7670E+00 | −1.6362E−14 | −1.0000E+00 |
| A4 = | 3.3675E−01 | 8.2834E−01 | −1.7205E−02 | −1.2924E−01 | −1.7503E−01 | −2.3161E−01 |
| A6 = | −3.7536E−01 | −1.0824E+00 | 5.9292E−02 | −1.5937E−02 | −3.0365E−01 | 1.4948E−01 |
| A8 = | 3.7413E−01 | 1.8488E+00 | −4.8209E−01 | 3.2048E−01 | 8.2927E−01 | 6.8567E−02 |
| A10 = | −2.7205E−01 | −1.7967E+00 | 1.0399E+00 | −8.1146E−01 | −1.1806E+00 | −1.9308E−01 |
| A12 = | 1.1971E−01 | 9.5837E−01 | −1.1188E+00 | 8.7790E−01 | 7.6868E−01 | 1.2092E−01 |
| A14 = | −2.9104E−02 | −2.0887E−01 | 2.3467E−01 | −3.9033E−01 | −1.9015E−01 | −2.5303E−02 |
| A16 = | 3.0227E−03 | | | | | |

| | Surface # | | | | | |
|---|---|---|---|---|---|---|
| | 8 | 9 | 10 | 11 | 12 | 13 |
| k = | −2.9412E+01 | −2.5968E+01 | 4.3273E−01 | −1.6647E+00 | −7.0646E−01 | −1.0482E+00 |
| A4 = | −1.4168E−01 | −1.2541E−01 | −4.8543E−03 | 1.8379E−01 | −1.0587E−01 | −4.2095E−01 |
| A6 = | 1.5313E−01 | 4.2548E−02 | −1.7713E−02 | −2.5959E−01 | −2.0649E−01 | 2.4885E−01 |
| A8 = | −3.4442E−02 | −2.3825E−02 | 5.1686E−02 | 2.9012E−01 | 2.8280E−01 | −1.0696E−01 |
| A10 = | −3.8875E−02 | −1.5638E−02 | −5.2077E−02 | −1.6165E−01 | −1.8072E−01 | 3.1806E−02 |
| A12 = | 2.7216E−02 | 2.1124E−02 | 2.5132E−02 | 4.2553E−02 | 6.3599E−02 | −6.5201E−03 |
| A14 = | −4.0929E−03 | −5.9484E−03 | −6.2753E−03 | −1.8063E−03 | −1.2784E−02 | 9.0248E−04 |
| A16 = | −4.7871E−04 | 4.5696E−04 | 6.1594E−04 | −1.9464E−03 | 1.4469E−03 | −8.0281E−05 |
| A18 = | | | | 4.9371E−04 | −8.5224E−05 | 4.1244E−06 |
| A20 = | | | | −3.9391E−05 | 2.0214E−06 | −9.2402E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 2.35 | ΣAT/T12 | 2.15 |
| Fno | 2.20 | Y11/Y62 | 0.52 |
| HFOV (deg.) | 57.0 | f/R1 | −0.05 |
| V3 + V6 | 43.9 | |f1/f4| | 0.15 |
| TL/ImgH | 1.93 | |f2/f3| + |f2/f4| | 0.60 |
| ImgH/f | 1.34 | |f2/f4| | 0.10 |
| (R3 + R4)/(R3 − R4) | 0.06 | |f3/f4| | 0.20 |
| (R9 + R10)/(R9 − R10) | 0.59 | f5/f2 | 0.74 |

| 5th Embodiment | | | |
|---|---|---|---|
| |R10/R9| | 0.26 | |f5/f4| | 0.07 |
| CT4/CT3 | 2.24 | |f6/f4| | 0.11 |
| CT4/T34 | 14.71 | |f/f5| + |f/f6| | 2.05 |
| T12/T23 | 2.90 | Yc61/f | 0.38 |

6th Embodiment

Figure 11:
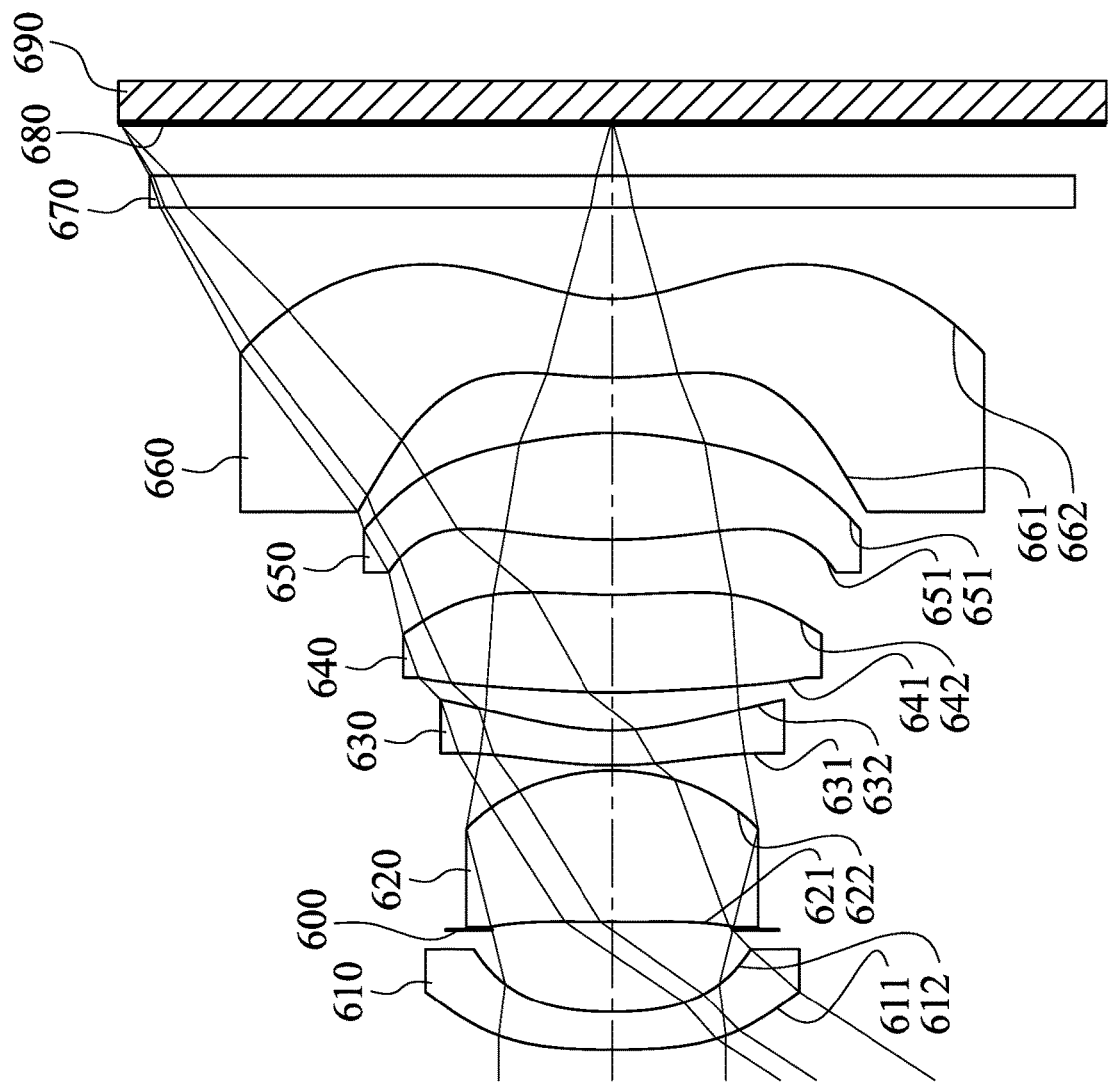
FIG. 11 is a schematic view of an imaging apparatus according to the 6th embodiment of the present disclosure.
Figure 12:
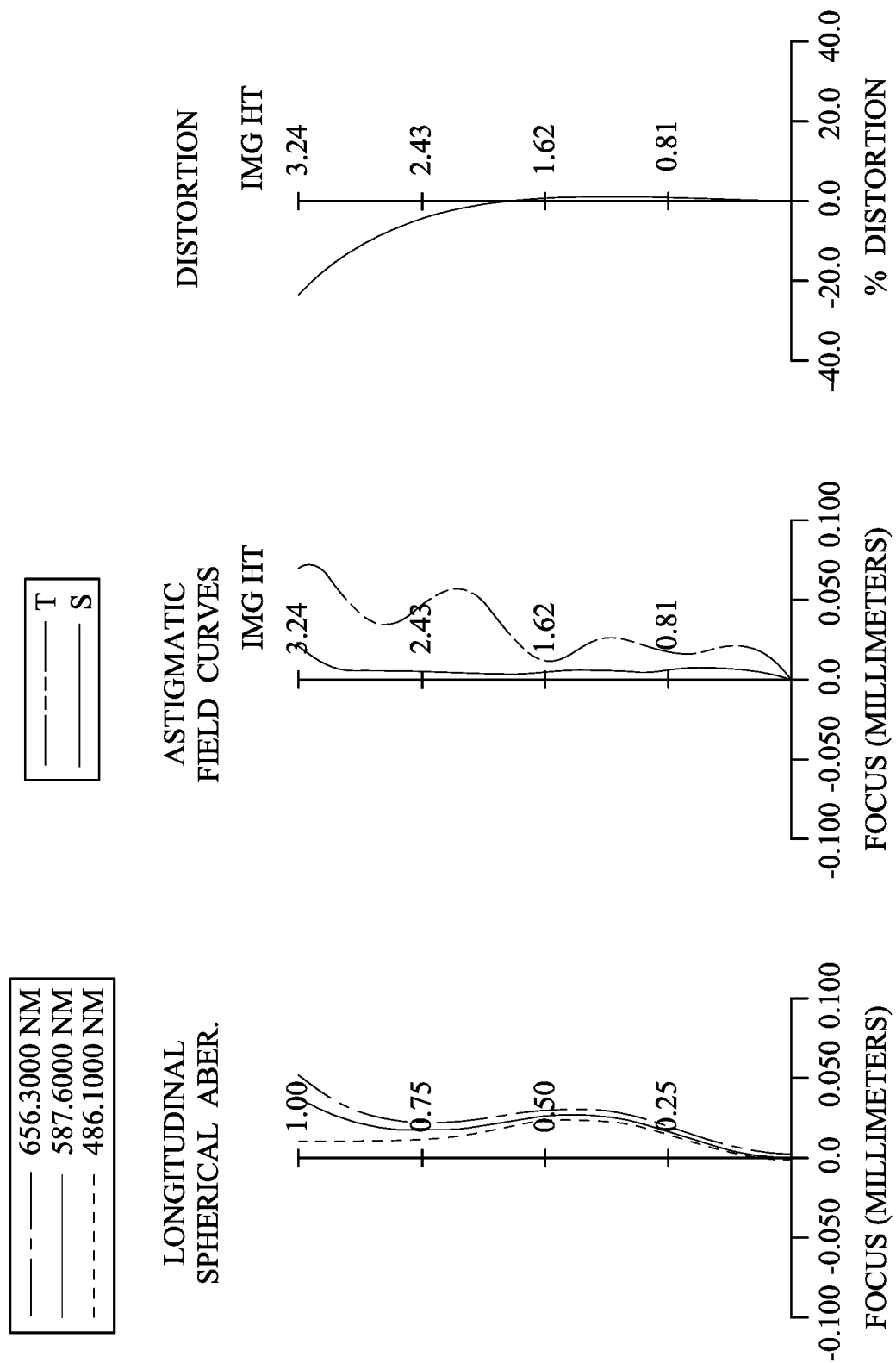
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes an imaging optical lens assembly (its reference numeral is omitted) and an image sensor 690. The imaging optical lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680. The image sensor 690 is disposed on the image surface 680 of the imaging optical lens assembly. The imaging optical lens assembly includes six lens elements (610, 620, 630, 640, 650 and 660) without additional one or more lens elements inserted between the first lens element 610 and the sixth lens element 660.

The first lens element 610 with negative refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric. Furthermore, the object-side surface 611 of the first lens element 610 includes at least one convex shape in an off-axis region thereof.

The second lens element 620 with positive refractive power has an object-side surface 621 being concave in a paraxial region thereof and an image-side surface 622 being convex in a paraxial region thereof. The second lens element 620 is made of a plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of a plastic material, and has the object-side surface 631 and the image-side surface 632 being both aspheric. Furthermore, the object-side surface 631 of the third lens element 630 includes at least one concave critical point in an off-axis region thereof.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the image-side surface 642 of the fourth lens element 640 includes at least one convex critical point in an off-axis region thereof.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric. Furthermore, the object-side surface 651 of the fifth lens element 650 includes at least one concave critical point in an off-axis region thereof.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex critical point in an off-axis region thereof.

The IR-cut filter 670 is made of a glass material and located between the sixth lens element 660 and the image surface 680, and will not affect the focal length of the imaging optical lens assembly.

The detailed optical data of the 6th embodiment are shown in TABLE 11 and the aspheric surface data are shown in TABLE 12 below.

TABLE 11

6th Embodiment
f = 2.75 mm, Fno = 1.84, HFOV = 57.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.681 | ASP | 0.250 | Plastic | 1.566 | 37.4 | −6.96 |
| 2 | | 2.573 | ASP | 0.540 | | | | |
| 3 | Ape. Stop | Plano | | 0.054 | | | | |
| 4 | Lens 2 | −200.000 | ASP | 0.993 | Plastic | 1.545 | 56.1 | 2.75 |
| 5 | | −1.489 | ASP | 0.035 | | | | |
| 6 | Lens 3 | 2.940 | ASP | 0.230 | Plastic | 1.660 | 20.4 | −8.79 |
| 7 | | 1.890 | ASP | 0.252 | | | | |
| 8 | Lens 4 | 4.953 | ASP | 0.643 | Plastic | 1.544 | 56.0 | −132.82 |
| 9 | | 4.424 | ASP | 0.361 | | | | |
| 10 | Lens 5 | 3.887 | ASP | 0.700 | Plastic | 1.544 | 56.0 | 2.85 |
| 11 | | −2.421 | ASP | 0.369 | | | | |
| 12 | Lens 6 | 2.662 | ASP | 0.516 | Plastic | 1.639 | 23.5 | −3.37 |
| 13 | | 1.101 | ASP | 0.600 | | | | |
| 14 | IR-cut filter | Plano | | 0.210 | Glass | 1.517 | 64.2 | — |
| 15 | | Plano | | 0.347 | | | | |
| 16 | Image | Plano | | — | | | | |

Reference wavelength is 587.6 nm (d-line).
Effective radius of Surface 6 is 1.010 mm.

TABLE 12

Aspheric Coefficients

| Surface # | | | | | |
|---|---|---|---|---|---|
| 1 | 2 | 4 | 5 | 6 | 7 |
| k = −3.4062E+01 | −3.9503E−02 | 2.0000E+01 | 6.5167E−01 | −6.0505E−05 | −1.0000E+00 |
| A4 = 2.5833E−01 | 3.7111E−01 | −3.1863E−02 | 3.7836E−02 | −8.8558E−02 | −1.4754E−01 |

TABLE 12-continued

Aspheric Coefficients

| | | | | | | |
|---|---|---|---|---|---|---|
| A6 = | −1.8459E−01 | −1.9388E−01 | −1.8932E−02 | −1.2755E−01 | −3.4671E−02 | 1.9647E−01 |
| A8 = | 1.5129E−01 | 2.6613E−01 | −1.4217E−01 | 2.4061E−01 | −9.6663E−03 | −3.7001E−01 |
| A10 = | −7.3643E−02 | −2.0933E−02 | 2.2527E−01 | −2.0748E−01 | 1.0474E−01 | 3.9852E−01 |
| A12 = | 1.1437E−02 | −4.8299E−02 | −2.1949E−01 | 7.1658E−02 | −9.3762E−02 | −2.0804E−01 |
| A14 = | | | | | 2.4939E−02 | 4.1553E−02 |

| | Surface # | | | | | |
|---|---|---|---|---|---|---|
| | 8 | 9 | 10 | 11 | 12 | 13 |
| k = | −2.4808E+01 | −6.3538E+00 | −7.8878E+01 | −7.7514E+00 | −9.5148E+00 | −2.8417E+00 |
| A4 = | −1.2209E−01 | −2.1919E−01 | 1.5813E−01 | 5.0102E−02 | −2.2009E−01 | −2.4158E−01 |
| A6 = | 2.0380E−01 | 8.7787E−02 | −3.5013E−01 | −7.6912E−02 | −3.9501E−02 | 1.5786E−01 |
| A8 = | −1.3123E−01 | −3.7370E−02 | 3.7078E−01 | 4.6251E−02 | 1.0065E−01 | −7.9329E−02 |
| A10 = | −4.7192E−02 | 1.8529E−02 | −2.8484E−01 | −3.2769E−02 | −7.4797E−02 | 2.9082E−02 |
| A12 = | 1.2148E−01 | −1.4037E−02 | 1.3233E−01 | 1.5162E−02 | 3.0141E−02 | −7.5557E−03 |
| A14 = | −6.3957E−02 | 6.6752E−03 | −3.3168E−02 | −3.5036E−03 | −6.7546E−03 | 1.3368E−03 |
| A16 = | 1.1262E−02 | −1.0210E−03 | 3.3941E−03 | 3.1975E−04 | 8.3854E−04 | −1.5173E−04 |
| A18 = | | | | | −5.3887E−05 | 9.8942E−06 |
| A20 = | | | | | 1.3952E−06 | −2.8058E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 2.75 | ΣAT/T12 | 2.71 |
| Fno | 1.84 | Y11/Y62 | 0.50 |
| HFOV (deg.) | 57.0 | f/R1 | 0.36 |
| V3 + V6 | 43.9 | \|f1/f4\| | 0.05 |
| TL/ImgH | 1.88 | \|f2/f3\| + \|f2/f4\| | 0.33 |
| ImgH/f | 1.18 | \|f2/f4\| | 0.02 |
| (R3 + R4)/(R3 − R4) | 1.01 | \|f3/f4\| | 0.07 |
| (R9 + R10)/(R9 − R10) | 0.23 | f5/f2 | 1.04 |
| \|R10/R9\| | 0.62 | \|f5/f4\| | 0.02 |
| CT4/CT3 | 2.80 | \|f6/f4\| | 0.03 |
| CT4/T34 | 2.55 | \|f/f5\| + \|f/f6\| | 1.78 |
| T12/T23 | 16.97 | Yc61/f | 0.22 |

7th Embodiment

Figure 13:
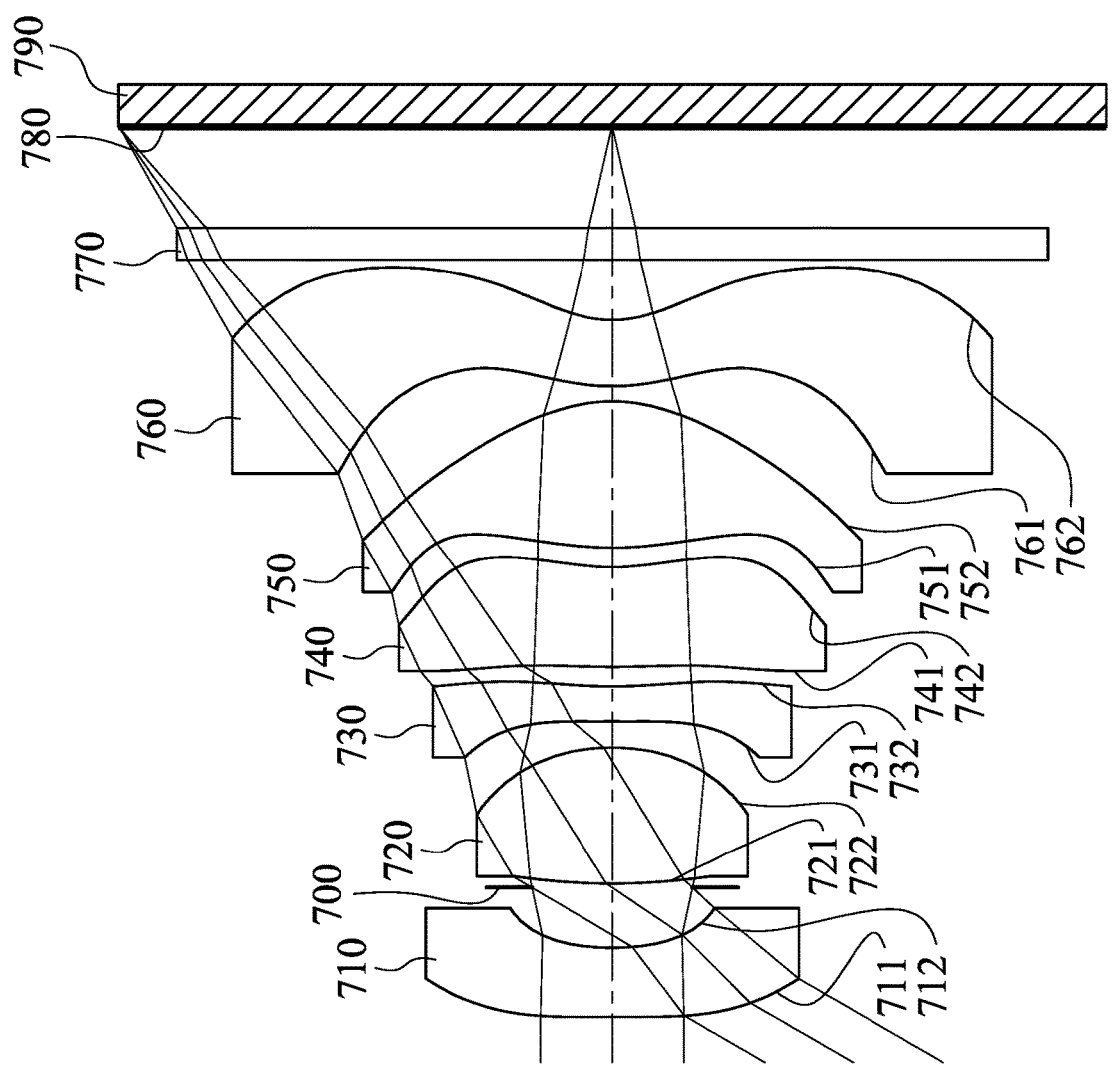
FIG. 13 is a schematic view of an imaging apparatus according to the 7th embodiment of the present disclosure.
Figure 14:
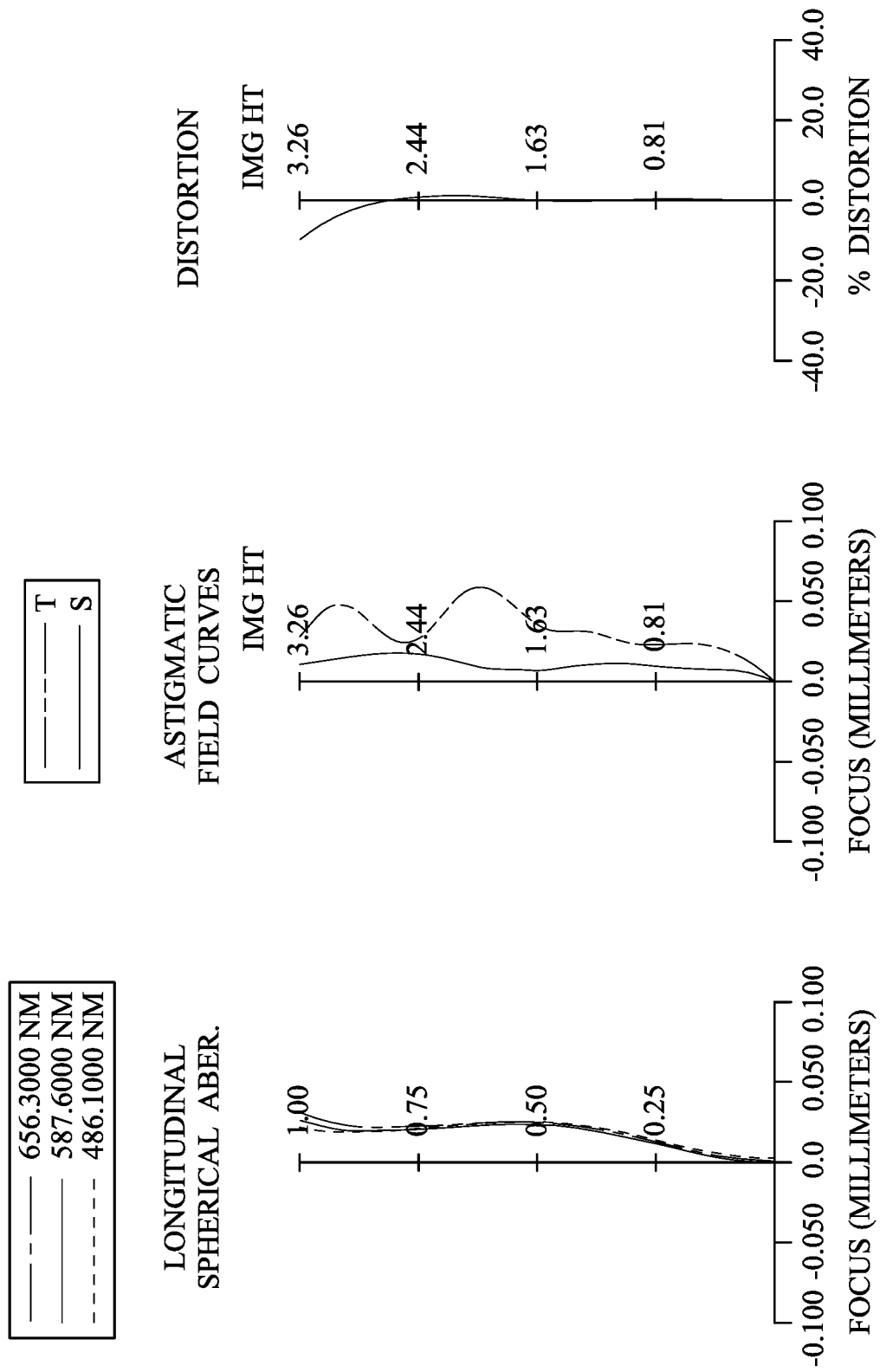
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes an imaging optical lens assembly (its reference numeral is omitted) and an image sensor 790. The imaging optical lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image surface 780. The image sensor 790 is disposed on the image surface 780 of the imaging optical lens assembly. The imaging optical lens assembly includes six lens elements (710, 720, 730, 740, 750 and 760) without additional one or more lens elements inserted between the first lens element 710 and the sixth lens element 760.

The first lens element 710 with negative refractive power has an object-side surface 711 being concave in a paraxial region thereof and an image-side surface 712 being concave in a paraxial region thereof. The first lens element 710 is made of a plastic material, and has the object-side surface 711 and the image-side surface 712 being both aspheric. Furthermore, the object-side surface 711 of the first lens element 710 includes at least one convex shape in an off-axis region thereof.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric. Furthermore, the object-side surface 731 of the third lens element 730 includes at least one concave critical point in an off-axis region thereof.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, the image-side surface 742 of the fourth lens element 740 includes at least one convex critical point in an off-axis region thereof.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric. Furthermore, the object-side surface 751 of the fifth lens element 750 includes at least one concave critical point in an off-axis region thereof.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex critical point in an off-axis region thereof.

The IR-cut filter 770 is made of a glass material and located between the sixth lens element 760 and the image surface 780, and will not affect the focal length of the imaging optical lens assembly.

The detailed optical data of the 7th embodiment are shown in TABLE 13 and the aspheric surface data are shown in TABLE 14 below.

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

TABLE 13

7th Embodiment
f = 2.08 mm, Fno = 2.20, HFOV = 59.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −50.000 | ASP | 0.458 | Plastic | 1.515 | 56.4 | −3.48 |
| 2 | | 1.868 | ASP | 0.397 | | | | |
| 3 | Ape. Stop | Plano | | 0.026 | | | | |
| 4 | Lens 2 | 4.121 | ASP | 0.901 | Plastic | 1.545 | 56.1 | 1.99 |
| 5 | | −1.354 | ASP | 0.172 | | | | |
| 6 | Lens 3 | 170.279 | ASP | 0.230 | Plastic | 1.660 | 20.4 | −5.04 |
| 7 | | 3.260 | ASP | 0.129 | | | | |
| 8 | Lens 4 | 4.558 | ASP | 0.660 | Plastic | 1.544 | 56.0 | −4.26 |
| 9 | | 1.458 | ASP | 0.130 | | | | |
| 10 | Lens 5 | 2.083 | ASP | 0.967 | Plastic | 1.544 | 56.0 | 1.44 |
| 11 | | −1.047 | ASP | 0.100 | | | | |
| 12 | Lens 6 | 1.490 | ASP | 0.437 | Plastic | 1.669 | 19.5 | −2.99 |
| 13 | | 0.754 | ASP | 0.400 | | | | |
| 14 | IR-cut filter | Plano | | 0.210 | Glass | 1.517 | 64.2 | — |
| 15 | | Plano | | 0.667 | | | | |
| 16 | Image | Plano | | — | | | | |

Reference wavelength is 587.6 nm (d-line).

TABLE 14

Aspheric Coefficients

| Surface # | | | | | |
|---|---|---|---|---|---|
| 1 | 2 | 4 | 5 | 6 | 7 |
| k = −1.0000E+00 | 4.4718E+00 | 1.0095E+01 | 8.0542E−01 | 9.0000E+01 | −1.0000E+00 |
| A4 = 2.2832E−01 | 4.0992E−01 | 1.9745E−03 | −4.9152E−02 | −1.4541E−01 | −1.9015E−01 |
| A6 = −1.9085E−01 | −2.3756E−01 | −4.9075E−02 | −4.2212E−01 | −6.6673E−01 | −7.9619E−03 |
| A8 = 1.8493E−01 | 5.3488E−01 | −1.9681E−01 | 1.7633E+00 | 1.5277E+00 | 6.6811E−02 |
| A10 = −1.3671E−01 | 1.2594E+00 | 7.4449E−01 | −3.4291E+00 | −1.6631E+00 | 5.6613E−02 |
| A12 = 7.0115E−02 | −3.4355E+00 | −1.5632E+00 | 3.4209E+00 | 7.1284E−01 | −9.0122E−02 |
| A14 = −2.1805E−02 | 5.2538E+00 | 7.5430E−01 | −1.3738E+00 | −2.7923E−02 | 2.8368E−02 |
| A16 = 2.7566E−03 | | | | | |

| Surface # | | | | | |
|---|---|---|---|---|---|
| 8 | 9 | 10 | 11 | 12 | 13 |
| k = −3.6888E+01 | −2.1011E+01 | −4.6390E+01 | −1.1419E+00 | −4.7404E+00 | −1.0745E+00 |
| A4 = −4.0823E−01 | −1.2159E−01 | 1.0886E−01 | 2.3460E−01 | 3.1337E−03 | −5.7309E−01 |
| A6 = 9.8285E−01 | −5.8808E−02 | −2.7271E−01 | −4.0892E−01 | −4.6098E−01 | 3.3223E−01 |
| A8 = −1.7293E+00 | 1.3630E−01 | 2.5455E−01 | 5.8033E−01 | 5.1408E−01 | −1.2433E−01 |
| A10 = 1.9155E+00 | −1.9918E−01 | −1.5870E−01 | −6.2060E−01 | −2.7775E−01 | 3.1139E−02 |
| A12 = −1.2139E+00 | 1.1771E−01 | 4.0562E−02 | 4.8221E−01 | 8.4208E−02 | −5.3632E−03 |
| A14 = 4.0537E−01 | −2.8356E−02 | −4.0047E−04 | −2.5258E−01 | −1.4889E−02 | 6.3368E−04 |
| A16 = −5.5779E−02 | 2.3648E−03 | −7.6613E−04 | 8.1542E−02 | 1.5103E−03 | −4.9231E−05 |
| A18 = | | | −1.4413E−02 | −8.1048E−05 | 2.2440E−06 |
| A20 = | | | 1.0600E−03 | 1.7777E−06 | −4.4433E−08 |

| 7th Embodiment | | | |
|---|---|---|---|
| f (mm) | 2.08 | ΣAT/T12 | 2.26 |
| Fno | 2.20 | Y11/Y62 | 0.49 |
| HFOV (deg.) | 59.9 | f/R1 | −0.04 |
| V3 + V6 | 39.9 | \|f1/f4\| | 0.82 |
| TL/ImgH | 1.81 | \|f2/f3\| + \|f2/f4\| | 0.86 |
| ImgH/f | 1.57 | \|f2/f4\| | 0.47 |
| (R3 + R4)/(R3 − R4) | 0.51 | \|f3/f4\| | 1.18 |
| (R9 + R10)/(R9 − R10) | 0.33 | f5/f2 | 0.72 |
| \|R10/R9\| | 0.50 | \|f5/f4\| | 0.34 |
| CT4/CT3 | 2.87 | \|f6/f4\| | 0.70 |
| CT4/T34 | 5.12 | \|f/f5\| + \|f/f6\| | 2.14 |
| T12/T23 | 2.46 | Yc61/f | 0.40 |

8th Embodiment

Figure 15:
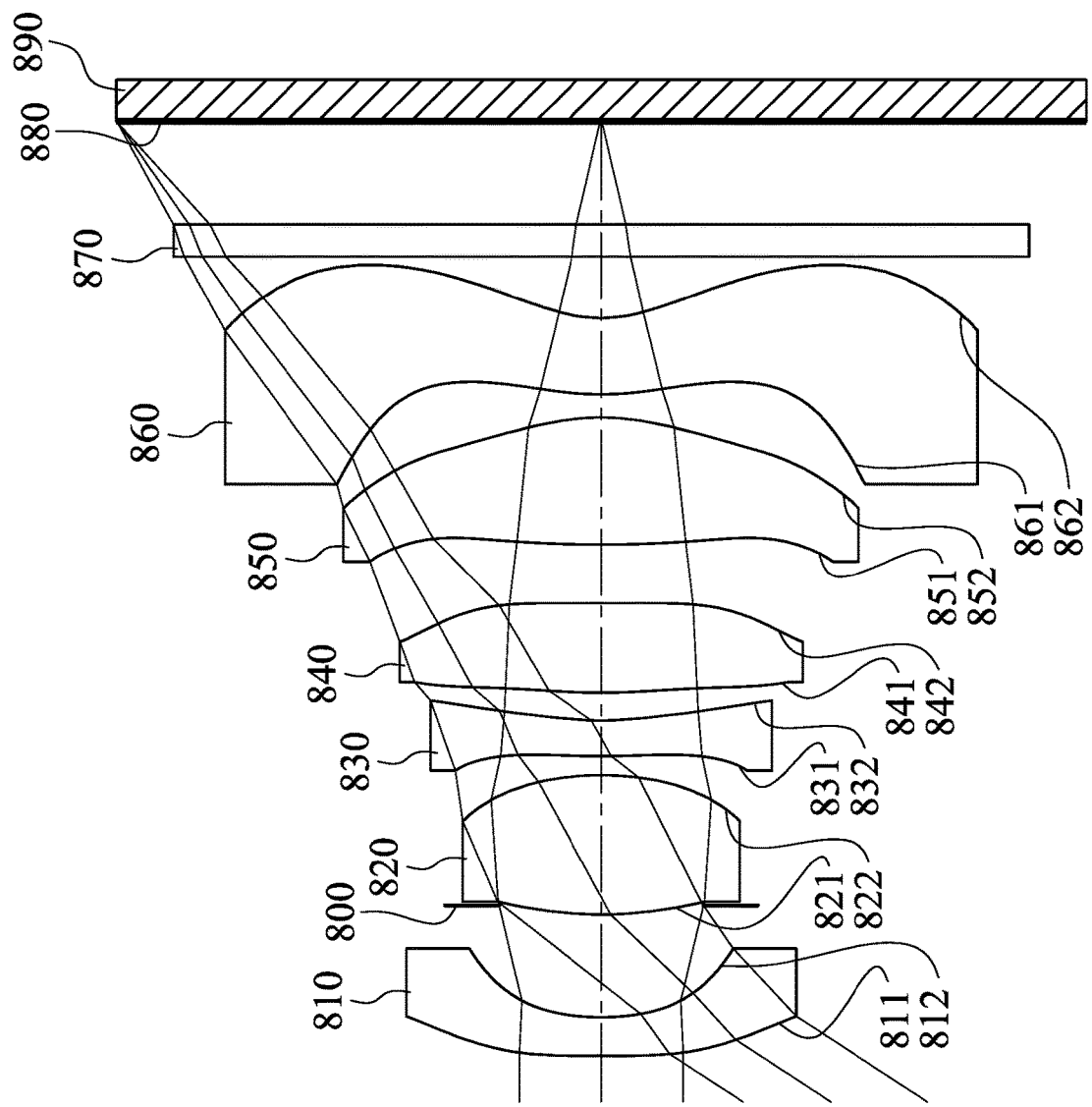
FIG. 15 is a schematic view of an imaging apparatus according to the 8th embodiment of the present disclosure.
Figure 16:
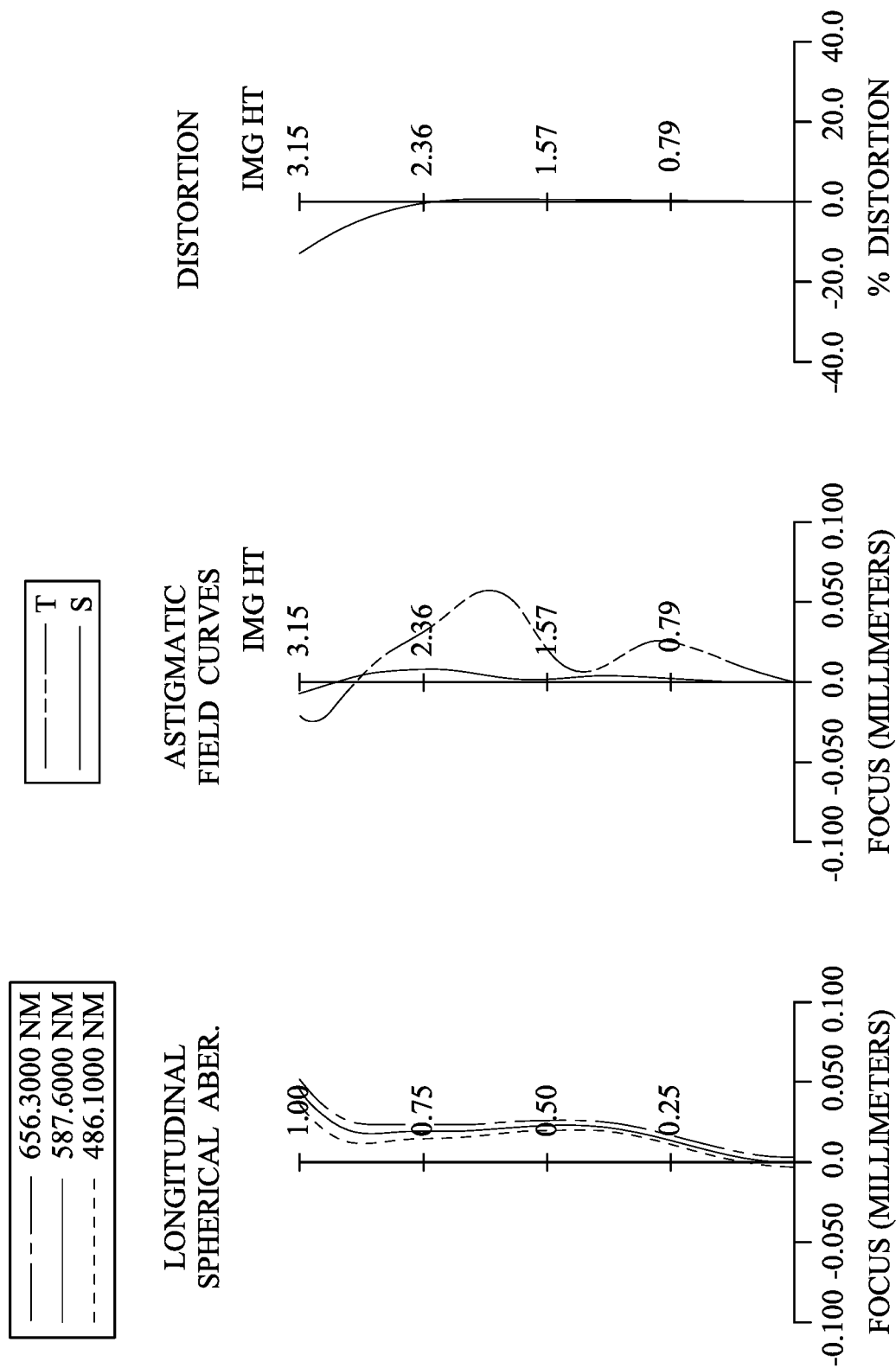
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes an imaging optical lens assembly (its reference numeral is omitted) and an image sensor 890. The imaging optical lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880. The image sensor 890 is disposed on the image surface 880 of the imaging optical lens assembly. The imaging optical lens assembly includes six lens elements (810, 820, 830, 840, 850 and 860) without additional one or more lens elements inserted between the first lens element 810 and the sixth lens element 860.

The first lens element 810 with negative refractive power has an object-side surface 811 being concave in a paraxial region thereof and an image-side surface 812 being concave in a paraxial region thereof. The first lens element 810 is made of a plastic material, and has the object-side surface 811 and the image-side surface 812 being both aspheric. Furthermore, the object-side surface 811 of the first lens element 810 includes at least one convex shape in an off-axis region thereof.

The second lens element 820 with positive refractive power has an object-side surface 821 being convex in a paraxial region thereof and an image-side surface 822 being convex in a paraxial region thereof. The second lens element 820 is made of a plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, the object-side surface 831 of the third lens element 830 includes at least one concave critical point in an off-axis region thereof.

The fourth lens element 840 with positive refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Furthermore, the image-side surface 842 of the fourth lens element 840 includes at least one convex critical point in an off-axis region thereof.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric. Furthermore, the object-side surface 851 of the fifth lens element 850 includes at least one concave critical point in an off-axis region thereof.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex critical point in an off-axis region thereof.

The IR-cut filter 870 is made of a glass material and located between the sixth lens element 860 and the image surface 880, and will not affect the focal length of the imaging optical lens assembly.

The detailed optical data of the 8th embodiment are shown in TABLE 15 and the aspheric surface data are shown in TABLE 16 below.

TABLE 15

8th Embodiment
f = 2.35 mm, Fno = 2.20, HFOV = 56.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −124.522 | ASP | 0.250 | Plastic | 1.545 | 56.1 | −3.32 |
| 2 | | 1.834 | ASP | 0.727 | | | | |
| 3 | Ape. Stop | Plano | | −0.060 | | | | |
| 4 | Lens 2 | 2.670 | ASP | 0.910 | Plastic | 1.545 | 56.1 | 2.29 |
| 5 | | −2.067 | ASP | 0.124 | | | | |
| 6 | Lens 3 | 5.364 | ASP | 0.230 | Plastic | 1.639 | 23.5 | −6.10 |
| 7 | | 2.219 | ASP | 0.182 | | | | |
| 8 | Lens 4 | 4.054 | ASP | 0.580 | Plastic | 1.544 | 56.0 | 9.51 |
| 9 | | 17.811 | ASP | 0.386 | | | | |
| 10 | Lens 5 | 9.901 | ASP | 0.826 | Plastic | 1.544 | 56.0 | 2.45 |
| 11 | | −1.493 | ASP | 0.150 | | | | |
| 12 | Lens 6 | 2.114 | ASP | 0.496 | Plastic | 1.660 | 20.4 | −2.97 |
| 13 | | 0.923 | ASP | 0.400 | | | | |

TABLE 15-continued

8th Embodiment
f = 2.35 mm, Fno = 2.20, HFOV = 56.9 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 0.671 | | | | |
| 16 | Image | Plano | — | | | | |

Reference wavelength is 587.6 nm (d-line).
Effective radius of Surface 5 is 0.900 mm.

TABLE 16

Aspheric Coefficients

| Surface # | | | | | | |
|---|---|---|---|---|---|---|
| | 1 | 2 | 4 | 5 | 6 | 7 |
| k = | −1.0000E+00 | −1.2428E+00 | 3.8169E+00 | 1.4515E+00 | −7.1201E−15 | −1.0000E+00 |
| A4 = | 3.7288E−01 | 5.8438E−01 | −2.5187E−02 | −1.3547E−01 | −3.5104E−01 | −3.2649E−01 |
| A6 = | −4.9515E−01 | −5.9410E−01 | 1.0479E−01 | 2.0324E−01 | 5.5592E−01 | 5.7208E−01 |
| A8 = | 5.4889E−01 | 1.0715E+00 | −5.8606E−01 | −3.7934E−01 | −8.8343E−01 | −7.6217E−01 |
| A10 = | −4.3304E−01 | −9.4593E−01 | 7.3104E−01 | 2.4063E−01 | 6.4140E−01 | 6.4254E−01 |
| A12 = | 2.0605E−01 | 4.1411E−01 | 1.9608E−01 | 1.0876E−01 | −1.0563E−01 | −2.9004E−01 |
| A14 = | −5.2796E−02 | −7.4375E−02 | −9.8731E−01 | −1.9231E−01 | −9.0333E−02 | 5.2182E−02 |
| A16 = | 5.5635E−03 | | | | | |

| Surface # | | | | | | |
|---|---|---|---|---|---|---|
| | 8 | 9 | 10 | 11 | 12 | 13 |
| k = | −1.2304E+01 | −9.0000E+01 | −8.2417E+01 | −1.1718E+00 | −2.1538E+00 | −1.0484E+00 |
| A4 = | −1.6081E−01 | −1.3669E−01 | 5.4433E−02 | 2.4976E−01 | −1.0841E−01 | −4.3841E−01 |
| A6 = | 1.4073E−01 | 1.0455E−02 | −8.7897E−02 | −3.4625E−01 | −2.1360E−01 | 2.7635E−01 |
| A8 = | −7.4070E−02 | −3.6564E−02 | 9.3126E−02 | 4.8474E−01 | 3.3184E−01 | −1.2670E−01 |
| A10 = | 3.2706E−02 | 4.7146E−02 | −1.1445E−01 | −4.4696E−01 | −2.3093E−01 | 4.0098E−02 |
| A12 = | 2.3538E−03 | −1.8596E−02 | 7.1684E−02 | 2.4078E−01 | 8.5765E−02 | −8.6938E−03 |
| A14 = | −8.7807E−03 | 4.2608E−03 | −2.0294E−02 | −7.6706E−02 | −1.7952E−02 | 1.2636E−03 |
| A16 = | 2.0776E−03 | −5.4603E−04 | 2.0851E−03 | 1.4260E−02 | 2.1135E−03 | −1.1725E−04 |
| A18 = | | | | −1.4151E−03 | −1.2997E−04 | 6.2484E−06 |
| A20 = | | | | 5.5380E−05 | 3.2327E−06 | −1.4466E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 2.35 | ΣAT/T12 | 2.26 |
| Fno | 2.20 | Y11/Y62 | 0.52 |
| HFOV (deg.) | 56.9 | f/R1 | −0.02 |
| V3 + V6 | 43.9 | \|f1/f4\| | 0.35 |
| TL/ImgH | 1.93 | \|f2/f3\| + \|f2/f4\| | 0.62 |
| ImgH/f | 1.34 | \|f2/f4\| | 0.24 |
| (R3 + R4)/(R3 − R4) | 0.13 | \|f3/f4\| | 0.64 |
| (R9 + R10)/(R9 − R10) | 0.74 | f5/f2 | 1.07 |
| \|R10/R9\| | 0.15 | \|f5/f4\| | 0.26 |
| CT4/CT3 | 2.52 | \|f6/f4\| | 0.31 |
| CT4/T34 | 3.19 | \|f/f5\| + \|f/f6\| | 1.75 |
| T12/T23 | 5.38 | Yc61/f | 0.36 |

9th Embodiment

Figure 17:
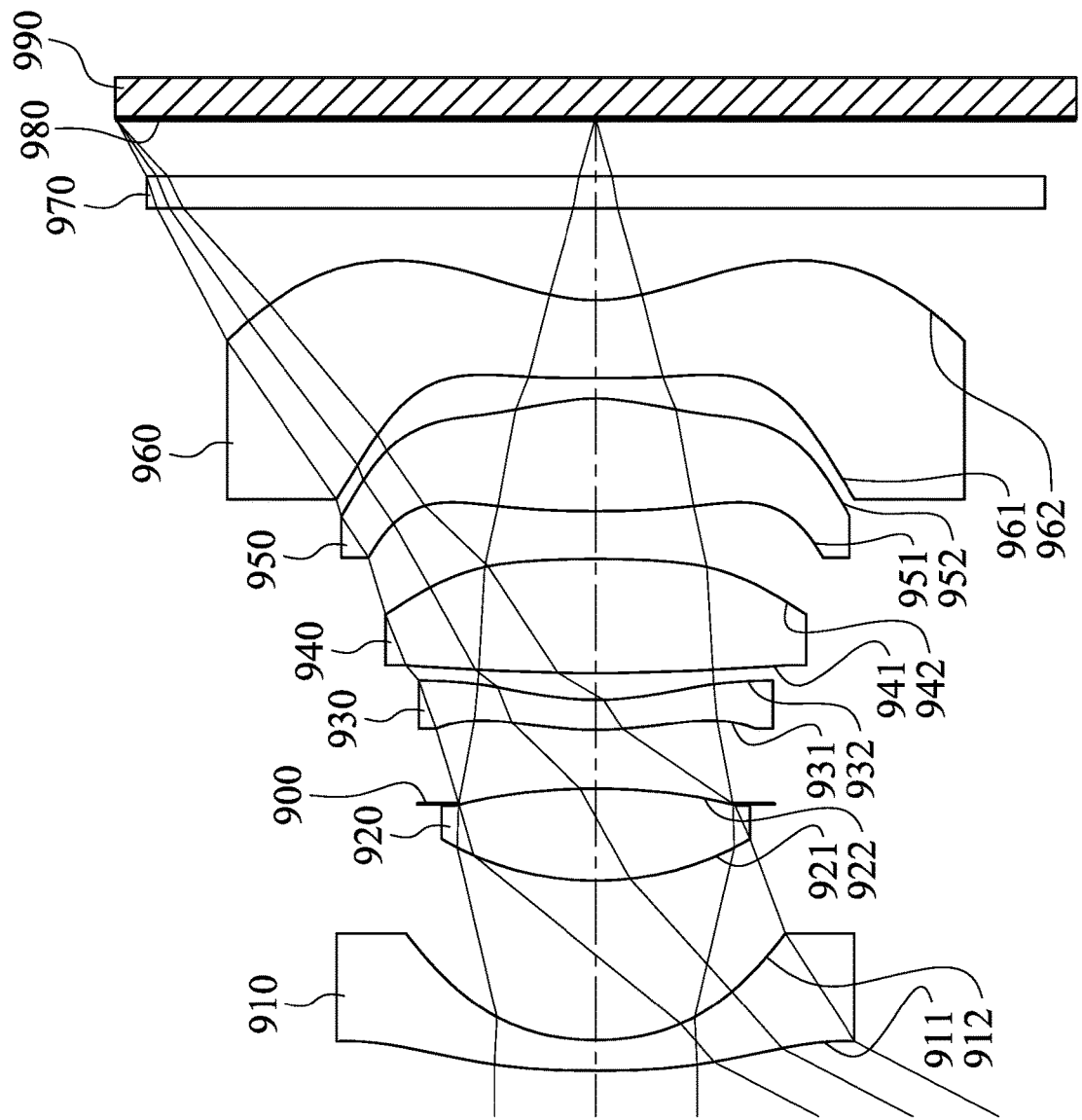
FIG. 17 is a schematic view of an imaging apparatus according to the 9th embodiment of the present disclosure.
Figure 18:
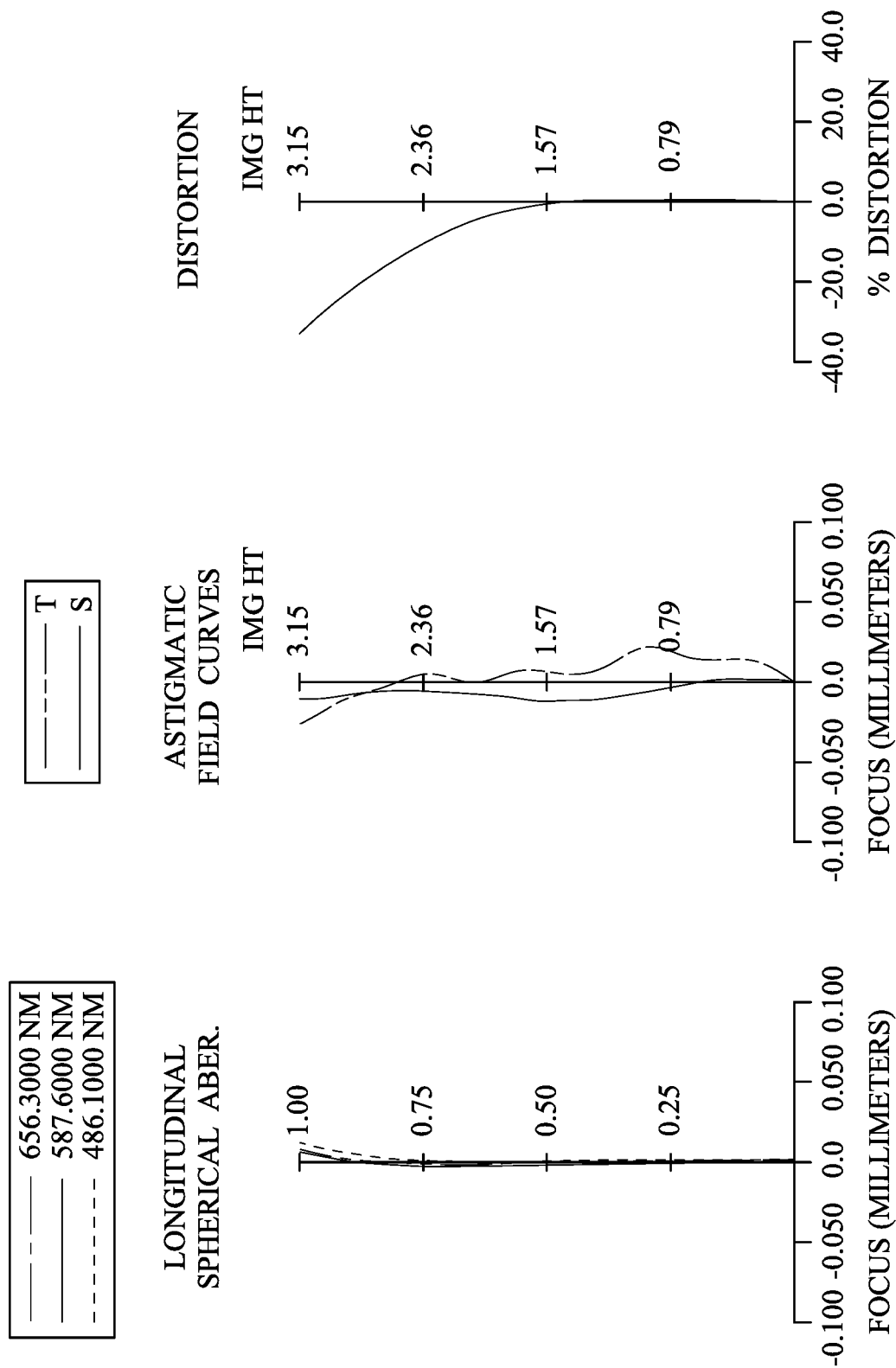
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes an imaging optical lens assembly (its reference numeral is omitted) and an image sensor 990. The imaging optical lens assembly includes, in order from an object side to an image side, a first lens element 910, a second lens element 920, an aperture stop 900, a third lens element 930, a fourth lens element 940, a fifth lens element 950, a sixth lens element 960, an IR-cut filter 970 and an image surface 980. The image sensor 990 is disposed on the image surface 980 of the imaging optical lens assembly. The imaging optical lens assembly includes six lens elements (910, 920, 930, 940, 950 and 960) without additional one or more lens elements inserted between the first lens element 910 and the sixth lens element 960.

The first lens element 910 with negative refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric. Furthermore, the object-side surface 911 of the first lens element 910 includes at least one convex shape in an off-axis region thereof.

The second lens element 920 with positive refractive power has an object-side surface 921 being convex in a paraxial region thereof and an image-side surface 922 being convex in a paraxial region thereof. The second lens element 920 is made of a glass material, and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric. Furthermore, the object-side surface 931 of the third lens element 930 includes at least one concave critical point in an off-axis region thereof.

The fourth lens element 940 with positive refractive power has an object-side surface 941 being convex in a paraxial region thereof and an image-side surface 942 being convex in a paraxial region thereof. The fourth lens element 940 is made of a plastic material, and has the object-side surface 941 and the image-side surface 942 being both aspheric.

The fifth lens element 950 with positive refractive power has an object-side surface 951 being convex in a paraxial region thereof and an image-side surface 952 being convex in a paraxial region thereof. The fifth lens element 950 is made of a plastic material, and has the object-side surface 951 and the image-side surface 952 being both aspheric. Furthermore, the object-side surface 951 of the fifth lens element 950 includes at least one concave critical point in an off-axis region thereof.

The sixth lens element 960 with negative refractive power has an object-side surface 961 being concave in a paraxial region thereof and an image-side surface 962 being concave in a paraxial region thereof. The sixth lens element 960 is made of a plastic material, and has the object-side surface 961 and the image-side surface 962 being both aspheric. Furthermore, the image-side surface 962 of the sixth lens element 960 includes at least one convex critical point in an off-axis region thereof.

The IR-cut filter 970 is made of a glass material and located between the sixth lens element 960 and the image surface 980, and will not affect the focal length of the imaging optical lens assembly.

The detailed optical data of the 9th embodiment are shown in TABLE 17 and the aspheric surface data are shown in TABLE 18 below.

TABLE 17

9th Embodiment
f = 2.45 mm, Fno = 1.84, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.059 | ASP | 0.200 | Plastic | 1.545 | 56.0 | −3.85 |
| 2 | | 1.690 | ASP | 1.048 | | | | |
| 3 | Lens 2 | 2.079 | ASP | 0.604 | Glass | 1.507 | 70.5 | 2.91 |
| 4 | | −4.561 | ASP | −0.100 | | | | |
| 5 | Ape. Stop | Plano | | 0.484 | | | | |
| 6 | Lens 3 | 2.205 | ASP | 0.200 | Plastic | 1.669 | 19.5 | −23.66 |
| 7 | | 1.865 | ASP | 0.175 | | | | |
| 8 | Lens 4 | 9.452 | ASP | 0.749 | Plastic | 1.544 | 55.9 | 8.68 |
| 9 | | −9.157 | ASP | 0.314 | | | | |
| 10 | Lens 5 | 8.985 | ASP | 0.742 | Plastic | 1.544 | 55.9 | 2.00 |
| 11 | | −1.204 | ASP | 0.134 | | | | |
| 12 | Lens 6 | −98.696 | ASP | 0.510 | Plastic | 1.669 | 19.5 | −1.85 |
| 13 | | 1.258 | ASP | 0.600 | | | | |
| 14 | IR-cut filter | Plano | | 0.210 | Glass | 1.517 | 64.2 | — |
| 15 | | Plano | | 0.381 | | | | |
| 16 | Image | Plano | | — | | | | |

Reference wavelength is 587.6 nm (d-line).

TABLE 18

Aspheric Coefficients

| Surface # | | | | | | |
|---|---|---|---|---|---|---|
| | 1 | 2 | 3 | 4 | 6 | 7 |
| k = | −7.0071E+00 | −8.0708E+00 | 2.0188E+00 | 1.7325E+01 | −9.6336E+00 | −3.1097E−01 |
| A4 = | 1.1532E−01 | 3.5644E−01 | −1.7416E−02 | −2.7088E−02 | −1.1847E−01 | −2.0999E−01 |
| A6 = | −1.0601E−01 | −2.2822E−01 | −1.4752E−02 | 7.7022E−02 | 2.0141E−02 | 1.2145E−01 |
| A8 = | 4.9751E−02 | 1.1028E−01 | 1.4575E−02 | −1.1513E−01 | −1.5226E−01 | −1.7280E−01 |
| A10 = | −1.4903E−02 | −2.6442E−02 | −5.4595E−02 | 2.0395E−01 | 1.9237E−01 | 1.5617E−01 |
| A12 = | 2.5551E−03 | −9.7756E−04 | 5.3022E−02 | −1.9252E−01 | −1.1294E−01 | −7.0731E−02 |
| A14 = | −1.9013E−04 | 1.1487E−03 | −2.4480E−02 | 8.1599E−02 | 2.7363E−02 | 1.6336E−02 |

TABLE 18-continued

Aspheric Coefficients

| Surface # | | | | | |
|---|---|---|---|---|---|
| 8 | 9 | 10 | 11 | 12 | 13 |
| k = −7.1115E+01 | −7.3366E+01 | 8.1327E+00 | −6.6538E−01 | −1.2922E+01 | −1.4269E+00 |
| A4 = −3.7468E−02 | −6.6108E−02 | 9.1689E−02 | 7.9182E−01 | 3.6490E−01 | −2.2585E−01 |
| A6 = 4.1425E−02 | −1.0780E−01 | −4.8674E−02 | −1.0906E+00 | −9.2201E−01 | 1.1104E−01 |
| A8 = 1.7156E−02 | 1.2376E−01 | −2.0078E−01 | 1.2271E+00 | 1.0719E+00 | −4.8484E−02 |
| A10 = −8.4240E−02 | −6.1539E−02 | 3.3475E−01 | −1.0972E+00 | −8.1486E−01 | 1.6755E−02 |
| A12 = 7.4653E−02 | 1.4090E−02 | −3.0364E−01 | 6.8224E−01 | 3.8833E−01 | −4.3553E−03 |
| A14 = −2.6125E−02 | −1.3644E−04 | 1.7540E−01 | −2.7774E−01 | −1.1333E−01 | 8.0514E−04 |
| A16 = 3.0944E−03 | −2.8551E−04 | −6.4427E−02 | 7.0065E−02 | 1.9630E−02 | −9.7923E−05 |
| A18 = | | 1.3520E−02 | −9.8768E−03 | −1.8456E−03 | 6.9311E−06 |
| A20 = | | −1.2016E−03 | 5.9373E−04 | 7.2161E−05 | −2.1476E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from TABLE 17 and TABLE 18 as the following values and satisfy the following conditions:

| 9th Embodiment | | | |
|---|---|---|---|
| f (mm) | 2.45 | ΣAT/T12 | 1.96 |
| Fno | 1.84 | Y11/Y62 | 0.70 |
| HFOV (deg.) | 62.5 | f/R1 | 0.27 |
| V3 + V6 | 38.9 | |f1/f4| | 0.44 |
| TL/ImgH | 1.99 | |f2/f3| + |f2/f4| | 0.46 |
| ImgH/f | 1.29 | |f2/f4| | 0.34 |
| (R3 + R4)/(R3 − R4) | −0.37 | |f3/f4| | 2.73 |
| (R9 + R10)/(R9 − R10) | 0.76 | f5/f2 | 0.69 |
| |R10/R9| | 0.13 | |f5/f4| | 0.23 |
| CT4/CT3 | 3.75 | |f6/f4| | 0.21 |
| CT4/T34 | 4.28 | |f/f5| + |f/f6| | 2.54 |
| T12/T23 | 2.73 | Yc61/f | 0.30 |

10th Embodiment

Figure 19:
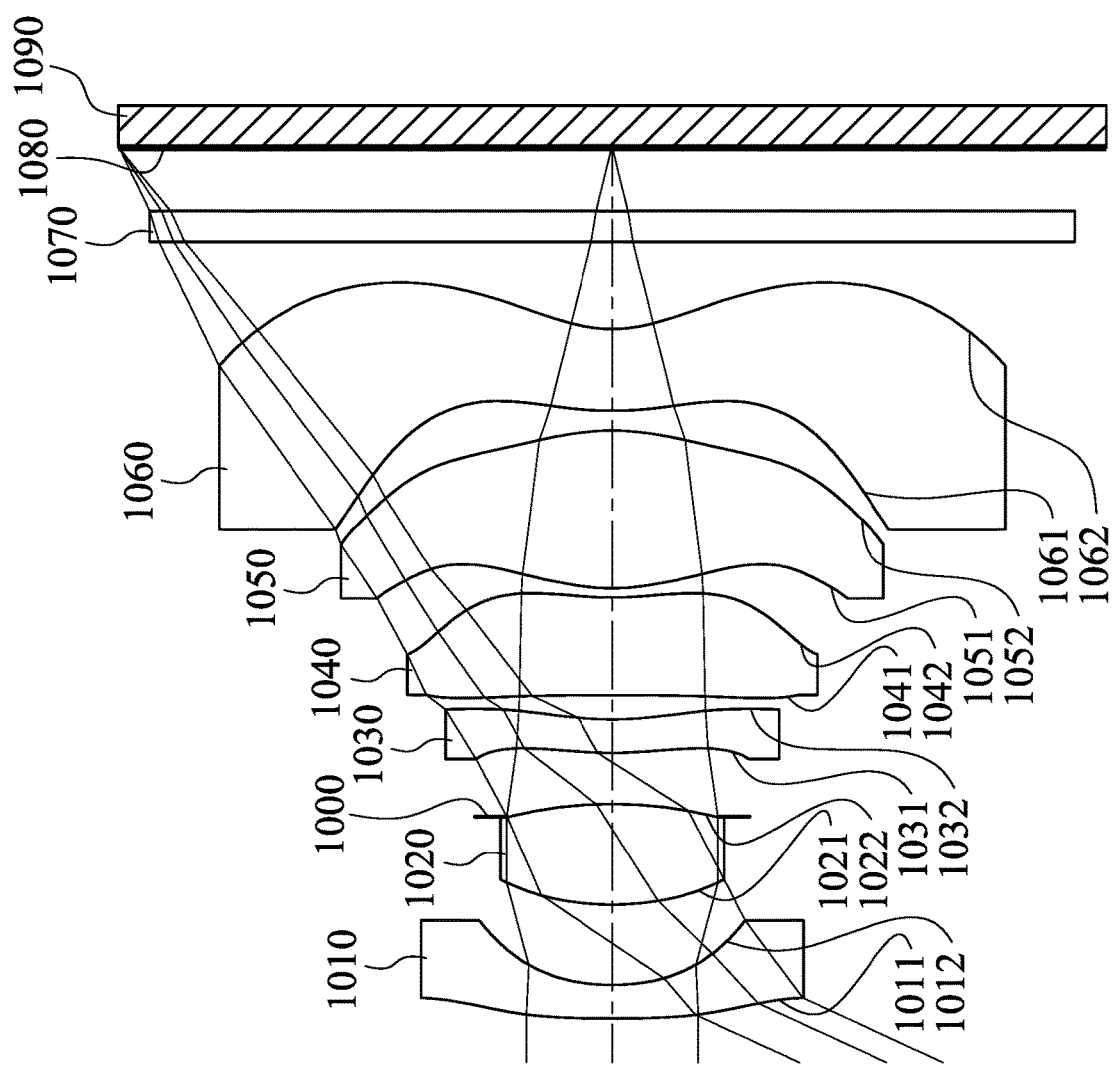
FIG. 19 is a schematic view of an image capturing apparatus according to the 10th embodiment of the present disclosure.
Figure 20:
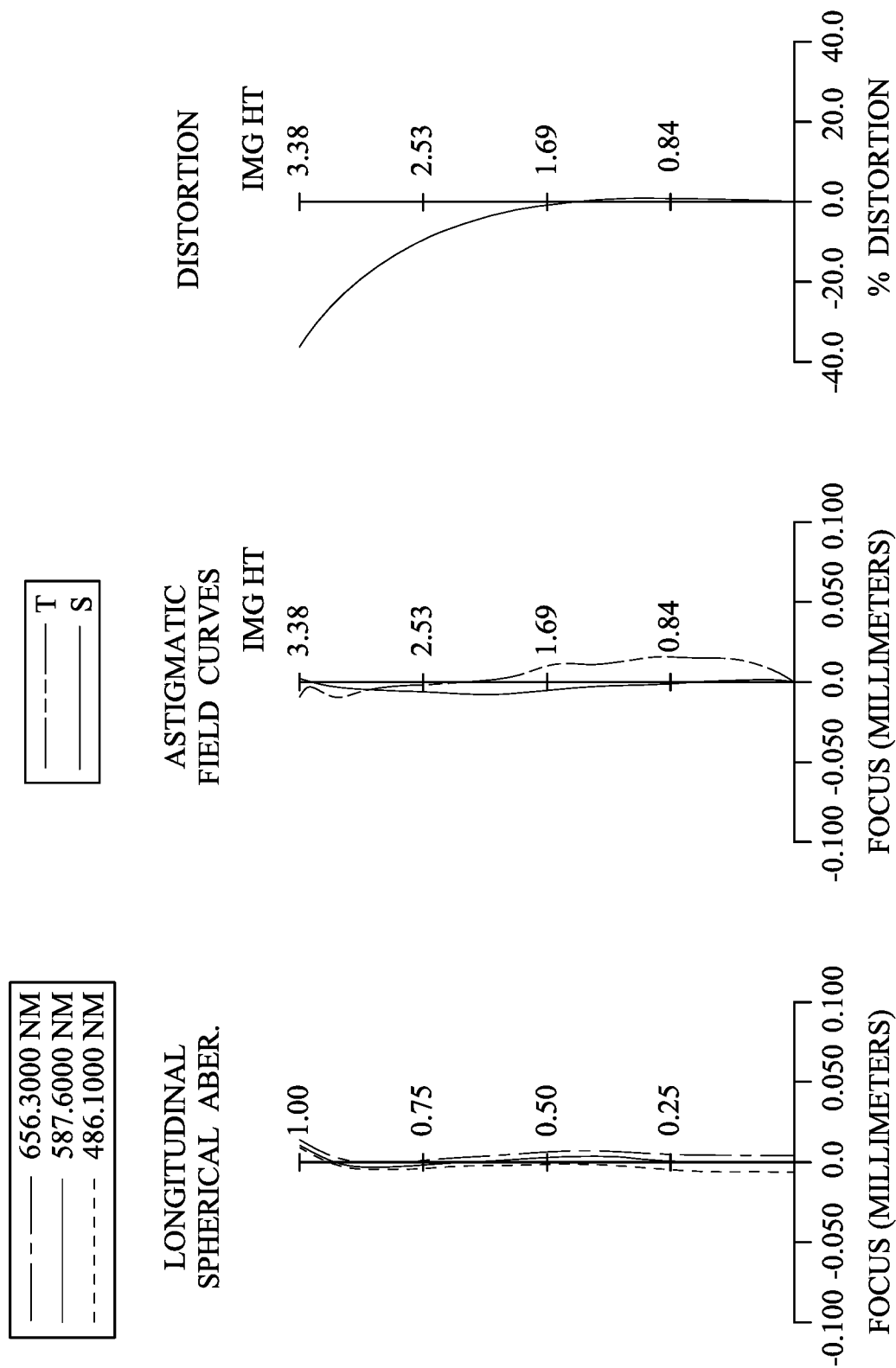
FIG. 20 shows spherical aberration curves, astigmatic field curves and a distortion curve of the image capturing apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes an imaging optical lens assembly (its reference numeral is omitted) and an image sensor 1090. The imaging optical lens assembly includes, in order from an object side to an image side, a first lens element 1010, a second lens element 1020, an aperture stop 1000, a third lens element 1030, a fourth lens element 1040, a fifth lens element 1050, a sixth lens element 1060, an IR-cut filter 1070 and an image surface 1080. The image sensor 1090 is disposed on the image surface 1080 of the imaging optical lens assembly. The imaging optical lens assembly includes six lens elements (1010, 1020, 1030, 1040, 1050 and 1060) without additional one or more lens elements inserted between the first lens element 1010 and the sixth lens element 1060.

The first lens element 1010 with negative refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric. Furthermore, the object-side surface 1011 of the first lens element 1010 includes at least one convex shape in an off-axis region thereof.

The second lens element 1020 with positive refractive power has an object-side surface 1021 being convex in a paraxial region thereof and an image-side surface 1022 being convex in a paraxial region thereof. The second lens element 1020 is made of a glass material, and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric. Furthermore, the object-side surface 1031 of the third lens element 1030 includes at least one concave critical point in an off-axis region thereof.

The fourth lens element 1040 with negative refractive power has an object-side surface 1041 being planar in a paraxial region thereof and an image-side surface 1042 being concave in a paraxial region thereof. The fourth lens element 1040 is made of a plastic material, and has the object-side surface 1041 and the image-side surface 1042 being both aspheric. Furthermore, the image-side surface 1042 of the fourth lens element 1040 includes at least one convex critical point in an off-axis region thereof.

The fifth lens element 1050 with positive refractive power has an object-side surface 1051 being convex in a paraxial region thereof and an image-side surface 1052 being convex in a paraxial region thereof. The fifth lens element 1050 is made of a plastic material, and has the object-side surface 1051 and the image-side surface 1052 being both aspheric. Furthermore, the object-side surface 1051 of the fifth lens element 1050 includes at least one concave critical point in an off-axis region thereof.

The sixth lens element 1060 with negative refractive power has an object-side surface 1061 being convex in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, the image-side surface 1062 of the sixth lens element 1060 includes at least one convex critical point in an off-axis region thereof, The IR-cut filter 1070 is made of a glass material and located between the sixth lens element 1060 and the image surface 1080, and will not affect the focal length of the imaging optical lens assembly.

The detailed optical data of the 10th embodiment are shown in TABLE 19 and the aspheric surface data are shown in TABLE 20 below.

TABLE 19

10th Embodiment
f = 2.44 mm, Fno = 2.07, HFOV = 65.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.941 | ASP | 0.230 | Plastic | 1.544 | 56.0 | −3.25 |
| 2 | | 1.594 | ASP | 0.550 | | | | |
| 3 | Lens 2 | 1.957 | ASP | 0.691 | Glass | 1.507 | 70.5 | 2.58 |
| 4 | | −3.480 | ASP | −0.085 | | | | |
| 5 | Ape. Stop | Plano | | 0.436 | | | | |
| 6 | Lens 3 | 2.785 | ASP | 0.230 | Plastic | 1.650 | 21.5 | −24.16 |
| 7 | | 2.288 | ASP | 0.166 | | | | |
| 8 | Lens 4 | ∞ | ASP | 0.670 | Plastic | 1.515 | 56.4 | −4.46 |
| 9 | | 2.301 | ASP | 0.062 | | | | |
| 10 | Lens 5 | 1.521 | ASP | 1.085 | Plastic | 1.544 | 56.0 | 1.58 |
| 11 | | −1.488 | ASP | 0.136 | | | | |
| 12 | Lens 6 | 2.636 | ASP | 0.559 | Plastic | 1.688 | 18.7 | −2.75 |
| 13 | | 1.007 | ASP | 0.600 | | | | |
| 14 | IR-cut filter | Plano | | 0.210 | Glass | 1.517 | 64.2 | — |
| 15 | | Plano | | 0.432 | | | | |
| 16 | Image | Plano | | — | | | | |

Reference wavelength is 587.6 nm (d-line).
Effective radius of Surface 1 is 1.310 mm.

TABLE 20

Aspheric Coefficients

| Surface # | | | | | |
|---|---|---|---|---|---|
| 1 | 2 | 3 | 4 | 6 | 7 |

| | 1 | 2 | 3 | 4 | 6 | 7 |
|---|---|---|---|---|---|---|
| k = | 1.0000E+00 | −7.5245E+00 | 2.5392E+00 | 1.6262E+01 | −4.2483E+01 | 1.6084E−01 |
| A4 = | 2.5372E−01 | 6.0937E−01 | 3.1082E−03 | −5.6436E−02 | −3.6773E−02 | −2.4783E−01 |
| A6 = | −4.2356E−01 | −6.9400E−01 | −1.1934E−01 | 5.3622E−01 | −2.4019E−01 | 3.7871E−01 |
| A8 = | 5.4906E−01 | 1.0263E+00 | 7.9039E−01 | −4.6725E+00 | −5.0551E−01 | −1.3189E+00 |
| A10 = | −5.9061E−01 | −1.2205E+00 | −3.7165E+00 | 2.9051E+01 | 4.0844E+00 | 2.9937E+00 |
| A12 = | 4.6295E−01 | 1.0353E+00 | 1.0598E+01 | −1.0991E+02 | −1.2221E+01 | −4.2776E+00 |
| A14 = | −2.4715E−01 | −5.2842E−01 | −1.8868E+01 | 2.5898E+02 | 2.1477E+01 | 3.9278E+00 |
| A16 = | 8.4217E−02 | 7.8801E−02 | 2.0519E+01 | −3.6845E+02 | −2.3271E+01 | −2.2135E+00 |
| A18 = | −1.6406E−02 | 9.4495E−02 | −1.2510E+01 | 2.8920E+02 | 1.4482E+01 | 6.8718E−01 |
| A20 = | 1.3768E−03 | −3.8720E−02 | 3.3153E+00 | −9.5241E+01 | −3.9993E+00 | −8.9471E−02 |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | 0.0000E+00 | −2.3497E+01 | −7.0541E+00 | −4.4329E−01 | −2.7037E+00 | −1.0906E+00 |
| A4 = | −1.1303E−01 | −2.5187E−01 | −2.6338E−02 | 3.7993E−01 | −2.4525E−02 | −3.5910E−01 |
| A6 = | 3.5216E−01 | −2.7768E−02 | −6.0590E−02 | −4.6712E−01 | −3.2306E−01 | 1.9380E−01 |
| A8 = | −6.4520E−01 | 2.5826E−01 | 8.8779E−02 | 5.7640E−01 | 3.5575E−01 | −7.8001E−02 |
| A10 = | 5.7423E−01 | −5.2115E−01 | −1.2712E−01 | −5.3978E−01 | −2.0228E−01 | 2.2814E−02 |
| A12 = | −1.4877E−01 | 5.8938E−01 | 9.6915E−02 | 3.3335E−01 | 6.6545E−02 | −4.7793E−03 |
| A14 = | −1.1212E−01 | −3.9086E−01 | −4.4346E−02 | −1.3265E−01 | −1.2858E−02 | 6.9494E−04 |
| A16 = | 9.5603E−02 | 1.5183E−01 | 1.3842E−02 | 3.2851E−02 | 1.4240E−03 | −6.6275E−05 |
| A18 = | −2.6694E−02 | −3.1394E−02 | −2.7285E−03 | −4.5824E−03 | −8.3072E−05 | 3.7123E−06 |
| A20 = | 2.6215E−03 | 2.6182E−03 | 2.3774E−04 | 2.7340E−04 | 1.9672E−06 | −9.2286E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again. It is noted that the image-side surface 1062 of the sixth lens element 1060 includes two critical points in an off-axial region thereof, thereby two values of parameter Yc62/f from left to right in the following table respectively refer to the corresponding values from an optical axis to a maximum effective radius position.

Moreover, these parameters can be calculated from TABLE 19 and TABLE 20 as the following values and satisfy the following conditions:

| 10th Embodiment | | | |
|---|---|---|---|
| f (mm) | 2.44 | ΣAT/T12 | 2.30 |
| Fno | 2.07 | Y11/Y62 | 0.49 |
| HFOV (deg.) | 65.3 | f/R1 | 0.14 |
| V3 + V6 | 40.2 | |f1/f4| | 0.73 |
| TL/ImgH | 1.77 | |f2/f3| + |f2/f4| | 0.69 |
| ImgH/f | 1.39 | |f2/f4| | 0.58 |
| (R3 + R4)/(R3 − R4) | −0.28 | |f3/f4| | 5.41 |
| (R9 + R10)/(R9 − R10) | 0.01 | f5/f2 | 0.61 |
| |R10/R9| | 0.98 | |f5/f4| | 0.35 |
| CT4/CT3 | 2.91 | |f6/f4| | 0.62 |
| CT4/T34 | 4.04 | |f/f5| + |f/f6| | 2.42 |
| T12/T23 | 1.57 | Yc61/f | 0.32 |

11th Embodiment

Figure 21:
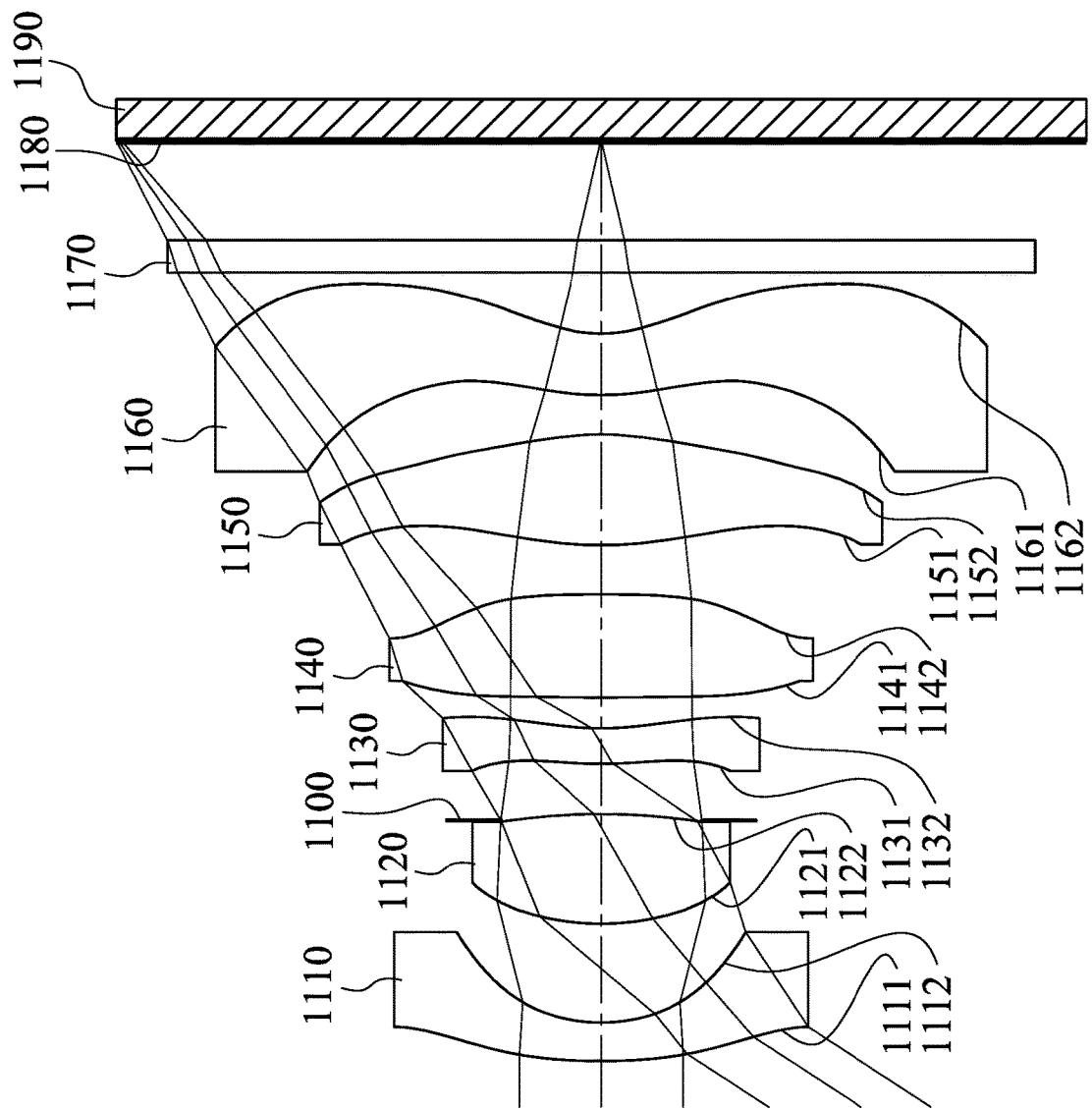
FIG. 21 is a schematic view of an image capturing apparatus according to the 11th embodiment of the present disclosure.
Figure 22:
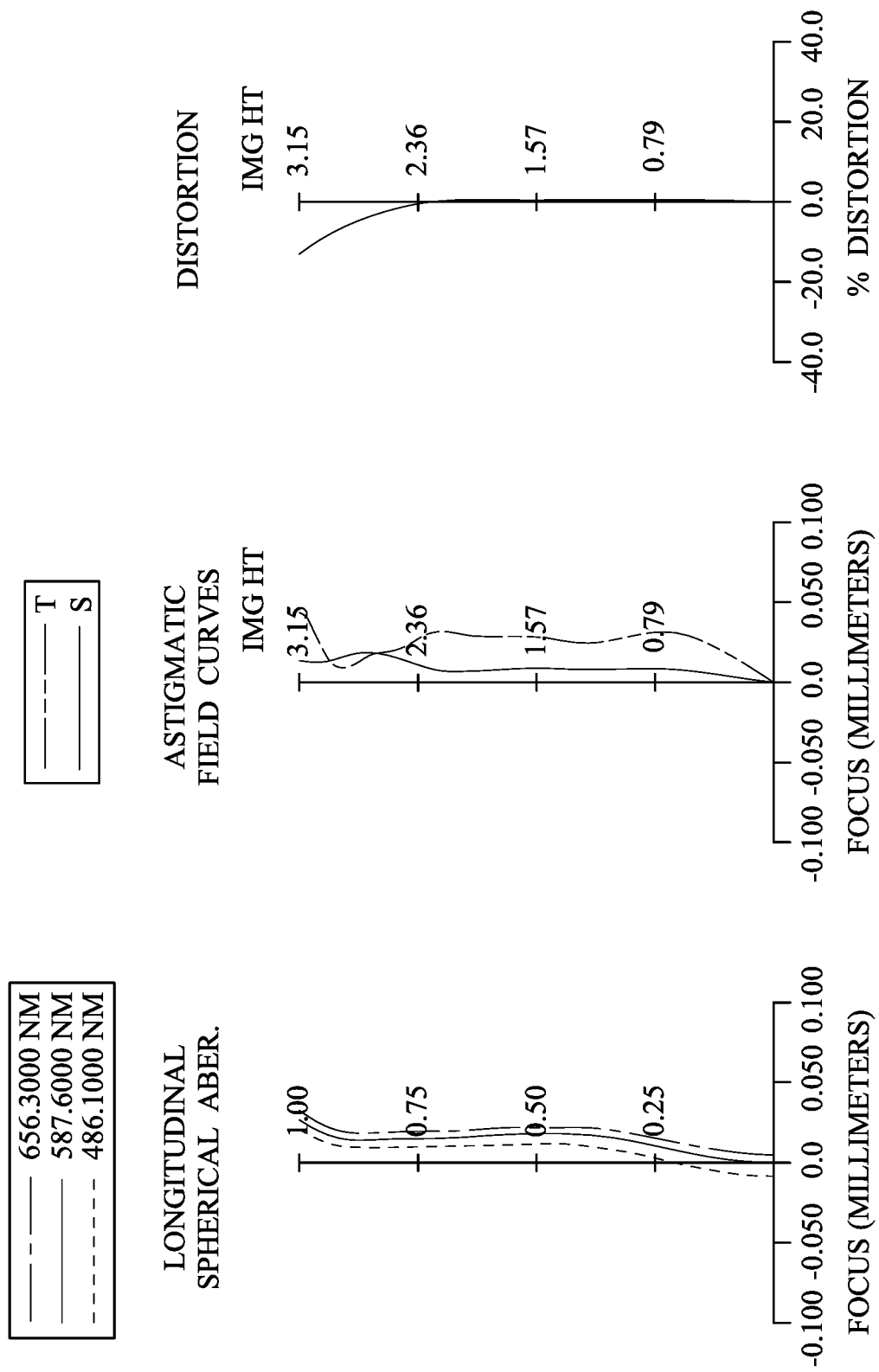
FIG. 22 shows spherical aberration curves, astigmatic field curves and a distortion curve of the image capturing apparatus according to the 11th embodiment.

FIG. 21 is a schematic view of an imaging apparatus according to the 11th embodiment of the present disclosure. FIG. 22 shows spherical aberration curves, astigmatic field curves and a distortion curve of the imaging apparatus according to the 11th embodiment. In FIG. 21, the imaging apparatus includes an imaging optical lens assembly (its reference numeral is omitted) and an image sensor 1190. The imaging optical lens assembly includes, in order from an object side to an image side, a first lens element 1110, a second lens element 1120, an aperture stop 1100, a third lens element 1130, a fourth lens element 1140, a fifth lens element 1150, a sixth lens element 1160, an IR-cut filter 1170 and an image surface 1180. The image sensor 1190 is disposed on the image surface 1180 of the imaging optical lens assembly. The imaging optical lens assembly includes six lens elements (1110, 1120, 1130, 1140, 1150 and 1160) without additional one or more lens elements inserted between the first lens element 1110 and the sixth lens element 1160.

The first lens element 1110 with negative refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric. Furthermore, the object-side surface 1111 of the first lens element 1110 includes at least one convex shape in an off-axis region thereof.

The second lens element 1120 with positive refractive power has an object-side surface 1121 being convex in a paraxial region thereof and an image-side surface 1122 being convex in a paraxial region thereof. The second lens element 1120 is made of a plastic material, and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of a plastic material, and has the object-side surface 1131 and the image-side surface 1132 being both aspheric. Furthermore, the object-side surface 1131 of the third lens element 1130 includes at least one concave critical point in an off-axis region thereof.

The fourth lens element 1140 with positive refractive power has an object-side surface 1141 being convex in a paraxial region thereof and an image-side surface 1142 being convex in a paraxial region thereof. The fourth lens element 1140 is made of a plastic material, and has the abject-side surface 1141 and the image-side surface 1142 being both aspheric.

The fifth lens element 1150 with positive refractive power has an object-side surface 1151 being convex in a paraxial region thereof and an image-side surface 1152 being convex in a paraxial region thereof. The fifth lens element 1150 is made of a plastic material, and has the object-side surface 1151 and the image-side surface 1152 being both aspheric. Furthermore, the object-side surface 1151 of the fifth lens element 1150 includes at least one concave critical point in an off-axis region thereof.

The sixth lens element 1160 with negative refractive power has an object-side surface 1161 being convex in a paraxial region thereof and an image-side surface 1162 being concave in a paraxial region thereof. The sixth lens element 1160 is made of a plastic material, and has the object-side surface 1161 and the image-side surface 1162 being both aspheric. Furthermore, the image-side surface 1162 of the sixth lens element 1160 includes at least one convex critical point in an off-axis region thereof.

The IR-cut filter 1170 is made of a glass material and located between the sixth lens element 1160 and the image surface 1180, and will not affect the focal length of the imaging optical lens assembly.

The detailed optical data of the 11th embodiment are shown in TABLE 21 and the aspheric surface data are shown in TABLE 22 below.

TABLE 21

11th Embodiment
f = 2.35 mm, Fno = 2.20, HFOV = 57.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.689 | ASP | 0.250 | Plastic | 1.544 | 56.0 | −3.07 |
| 2 | | 1.207 | ASP | 0.643 | | | | |
| 3 | Lens 2 | 1.841 | ASP | 0.718 | Plastic | 1.544 | 56.0 | 2.49 |
| 4 | | −4.447 | ASP | −0.042 | | | | |
| 5 | Ape. Stop | Plano | | 0.371 | | | | |
| 6 | Lens 3 | 3.180 | ASP | 0.230 | Plastic | 1.669 | 19.5 | −9.66 |
| 7 | | 2.069 | ASP | 0.200 | | | | |
| 8 | Lens 4 | 13.893 | ASP | 0.671 | Plastic | 1.544 | 56.0 | 17.47 |
| 9 | | −29.566 | ASP | 0.325 | | | | |
| 10 | Lens 5 | 2.930 | ASP | 0.721 | Plastic | 1.544 | 56.0 | 2.13 |
| 11 | | −1.746 | ASP | 0.256 | | | | |

TABLE 21-continued

11th Embodiment
f = 2.35 mm, Fno = 2.20, HFOV = 57.0 deg.

| Surface # | | Curvature Radius | Thickness | Material | Index | Abbe # | Focal Length |
|---|---|---|---|---|---|---|---|
| 12 | Lens 6 | 2.022 ASP | 0.400 | Plastic | 1.669 | 19.5 | −2.95 |
| 13 | | 0.920 ASP | 0.400 | | | | |
| 14 | IR-cut filter | Plano | 0.210 | Glass | 1.517 | 64.2 | — |
| 15 | | Plano | 0.648 | | | | |
| 16 | Image | Plano | — | | | | |

Reference wavelength is 587.6 nm (d-line).
Effective radius of Surface 3 is 0.840 mm.

TABLE 22

Aspheric Coefficients

| Surface # | | | | | | |
|---|---|---|---|---|---|---|
| | 1 | 2 | 3 | 4 | 6 | 7 |
| k = | −1.0000E+00 | −5.9730E+00 | 2.5741E+00 | 2.7237E+01 | −5.7042E+01 | −1.0000E+00 |
| A4 = | 1.6235E−01 | 6.8555E−01 | 1.2318E−02 | −3.1476E−02 | −1.5738E−01 | −3.0076E−01 |
| A6 = | −1.6666E−01 | −5.6355E−01 | 5.1574E−02 | 2.0593E−01 | −1.3447E−01 | 3.3167E−01 |
| A8 = | 7.8614E−02 | 6.0750E−01 | −2.4555E−01 | −5.4873E−01 | −1.4984E−01 | −5.4244E−01 |
| A10 = | −2.8160E−02 | −5.2768E−01 | 6.7213E−01 | 2.2949E+00 | 7.0668E−01 | 6.5874E−01 |
| A12 = | 6.7618E−03 | 2.7992E−01 | −8.9908E−01 | −4.2178E+00 | −9.6252E−01 | −4.4816E−01 |
| A14 = | −7.7590E−04 | −5.8720E−02 | 5.0453E−01 | 3.5374E+00 | 4.5494E−01 | 1.2638E−01 |

| Surface # | | | | | | |
|---|---|---|---|---|---|---|
| | 8 | 9 | 10 | 11 | 12 | 13 |
| k = | 3.0000E+01 | −9.0000E+01 | −3.1670E+01 | −3.1935E−01 | −1.7269E+00 | −1.0704E+00 |
| A4 = | −1.0570E−01 | −2.0158E−01 | 1.6471E−01 | 3.8566E−01 | −6.2371E−02 | −4.2751E−01 |
| A6 = | 1.9402E−01 | −5.0759E−02 | −2.7946E−01 | −3.6703E−01 | −2.8116E−01 | 2.3835E−01 |
| A8 = | −1.3165E−01 | 2.3022E−01 | 1.5264E−01 | 1.3690E−01 | 2.9353E−01 | −9.6936E−02 |
| A10 = | 4.2733E−02 | −2.3022E−01 | −1.9563E−02 | 3.6714E−02 | −1.3761E−01 | 3.0075E−02 |
| A12 = | −1.0727E−03 | 1.3429E−01 | −1.2994E−02 | −4.8704E−02 | 3.5727E−02 | −6.9794E−03 |
| A14 = | −2.6302E−03 | −3.9274E−02 | 5.1288E−03 | 1.6440E−02 | −5.4527E−03 | 1.1226E−03 |
| A16 = | 3.3116E−04 | 4.1942E−03 | −5.3876E−04 | −2.3909E−03 | 4.8817E−04 | −1.1445E−04 |
| A18 = | | | | 1.0966E−04 | −2.3756E−05 | 6.5365E−06 |
| A20 = | | | | 3.7543E−06 | 4.8425E−07 | −1.5761E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from TABLE 21 and TABLE 22 as the following values and satisfy the following conditions:

| 11th Embodiment | | | |
|---|---|---|---|
| f (mm) | 2.35 | ΣAT/T12 | 2.73 |
| Fno | 2.20 | Y11/Y62 | 0.54 |
| HFOV (deg.) | 57.0 | f/R1 | 0.50 |
| V3 + V6 | 38.9 | |f1/f4| | 0.18 |
| TL/ImgH | 1.91 | |f2/f3| + |f2/f4| | 0.40 |
| ImgH/f | 1.34 | |f2/f4| | 0.14 |
| (R3 + R4)/(R3 − R4) | −0.41 | |f3/f4| | 0.55 |
| (R9 + R10)/(R9 − R10) | 0.25 | f5/f2 | 0.85 |
| |R10/R9| | 0.60 | |f5/f4| | 0.12 |
| CT4/CT3 | 2.92 | |f6/f4| | 0.17 |
| CT4/T34 | 3.36 | |f/f5| + |f/f6| | 1.90 |
| T12/T23 | 1.95 | Yc61/f | 0.36 |

12th Embodiment

Figure 23:
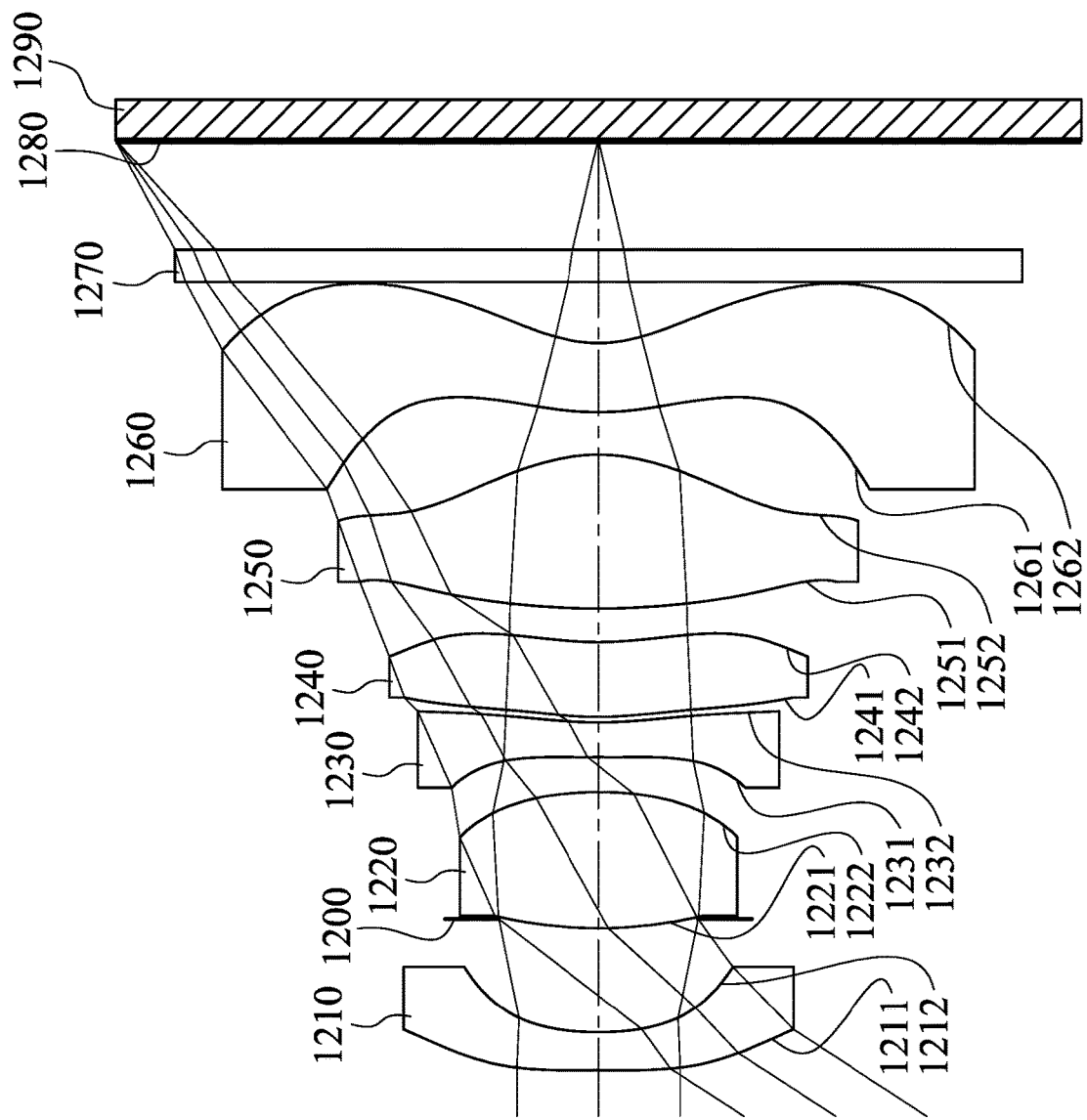
FIG. 23 is a schematic view of an image capturing apparatus according to the 12th embodiment of the present disclosure.
Figure 24:
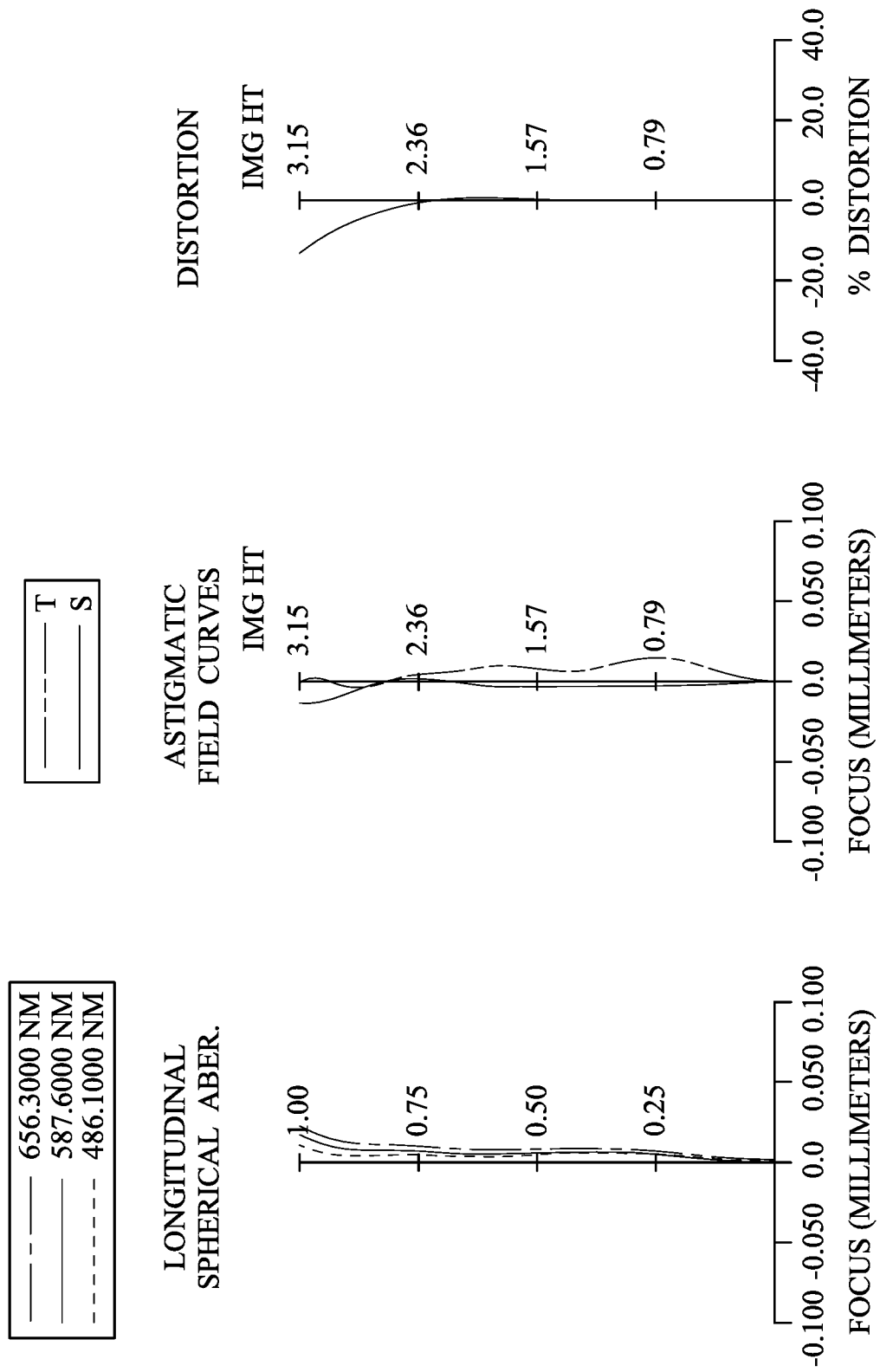
FIG. 24 shows spherical aberration curves, astigmatic field curves and a distortion curve of the image capturing apparatus according to the 12th embodiment.

FIG. 23 is a schematic view of an imaging apparatus according to the 12th embodiment of the present disclosure. FIG. 24 shows spherical aberration curves, astigmatic field curves and a distortion curve of the imaging apparatus according to the 12th embodiment. In FIG. 23, the imaging apparatus includes an imaging optical lens assembly (its reference numeral is omitted) and an image sensor 1290. The imaging optical lens assembly includes, in order from an object side to an image side, a first lens element 1210, an aperture stop 1200, a second lens element 1220, a third lens element 1230, a fourth lens element 1240, a fifth lens element 1250, a sixth lens element 1260, an IR-cut filter 1270 and an image surface 1280. The image sensor 1290 is disposed on the image surface 1280 of the imaging optical lens assembly. The imaging optical lens assembly includes six lens elements (1210, 1220, 1230, 1240, 1250 and 1260)

without additional one or more lens elements inserted between the first lens element 1210 and the sixth lens element 1260.

The first lens element 1210 with negative refractive power has an object-side surface 1211 being concave in a paraxial region thereof and an image-side surface 1212 being concave in a paraxial region thereof. The first lens element 1210 is made of a plastic material, and has the object-side surface 1211 and the image-side surface 1212 being both aspheric. Furthermore, the object-side surface 1211 of the first lens element 1210 includes at least one convex shape in an off-axis region thereof.

The second lens element 1220 with positive refractive power has an object-side surface 1221 being convex in a paraxial region thereof and an image-side surface 1222 being convex in a paraxial region thereof. The second lens element 1220 is made of a plastic material, and has the object-side surface 1221 and the image-side surface 1222 being both aspheric.

The third lens element 1230 with negative refractive power has an object-side surface 1231 being convex in a paraxial region thereof and an image-side surface 1232 being concave in a paraxial region thereof. The third lens element 1230 is made of a plastic material, and has the object-side surface 1231 and the image-side surface 1232 being both aspheric. Furthermore, the object-side surface 1231 of the third lens element 1230 includes at least one concave critical point in an off-axis region thereof.

The fourth lens element 1240 with positive refractive power has an object-side surface 1241 being convex in a paraxial region thereof and an image-side surface 1242 being concave in a paraxial region thereof. The fourth lens element 1240 is made of a plastic material, and has the object-side surface 1241 and the image-side surface 1242 being both aspheric. Furthermore, the image-side surface 1242 of the fourth lens element 1240 includes at least one convex critical point in an off-axis region thereof.

The fifth lens element 1250 with positive refractive power has an object-side surface 1251 being convex in a paraxial region thereof and an image-side surface 1252 being convex in a paraxial region thereof. The fifth lens element 1250 is made of a plastic material, and has the object-side surface 1251 and the image-side surface 1252 being both aspheric. Furthermore, the object-side surface 1251 of the fifth lens element 1250 includes at least one concave critical point in an off-axis region thereof.

The sixth lens element 1260 with negative refractive power has an object-side surface 1261 being convex in a paraxial region thereof and an image-side surface 1262 being concave in a paraxial region thereof. The sixth lens element 1260 is made of a plastic material, and has the object-side surface 1261 and the image-side surface 1262 being both aspheric. Furthermore, the image-side surface 1262 of the sixth lens element 1260 includes at least one convex critical point in an off-axis region thereof.

The IR-cut filter 1270 is made of a glass material and located between the sixth lens element 1260 and the image surface 1280, and will not affect the focal length of the imaging optical lens assembly.

The detailed optical data of the 12th embodiment are shown in TABLE 23 and the aspheric surface data are shown in TABLE 24 below.

TABLE 23

12th Embodiment
$f = 2.35$ mm, Fno = 2.20, HFOV = 57.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −50.000 | ASP | 0.250 | Plastic | 1.545 | 56.1 | −3.80 |
| 2 | | 2.165 | ASP | 0.741 | | | | |
| 3 | Ape. Stop | Plano | | −0.061 | | | | |
| 4 | Lens 2 | 2.810 | ASP | 0.890 | Plastic | 1.545 | 56.1 | 2.54 |
| 5 | | −2.420 | ASP | 0.229 | | | | |
| 6 | Lens 3 | 29.944 | ASP | 0.230 | Plastic | 1.634 | 23.8 | −5.01 |
| 7 | | 2.864 | ASP | 0.035 | | | | |
| 8 | Lens 4 | 2.235 | ASP | 0.489 | Plastic | 1.544 | 56.0 | 40.64 |
| 9 | | 2.295 | ASP | 0.219 | | | | |
| 10 | Lens 5 | 5.140 | ASP | 1.004 | Plastic | 1.544 | 56.0 | 1.86 |
| 11 | | −1.173 | ASP | 0.282 | | | | |
| 12 | Lens 6 | 2.043 | ASP | 0.450 | Plastic | 1.660 | 20.4 | −2.86 |
| 13 | | 0.895 | ASP | 0.400 | | | | |
| 14 | IR-cut filter | Plano | | 0.210 | Glass | 1.517 | 64.2 | — |
| 15 | | Plano | | 0.714 | | | | |
| 16 | Image | Plano | | — | | | | |

Reference wavelength is 587.6 nm (d-line).

TABLE 24

Aspheric Coefficients

| | Surface # | | | | |
|---|---|---|---|---|---|
| 1 | 2 | 4 | 5 | 6 | 7 |
| k = −1.0000E+00 | −2.9465E+01 | 3.6034E+00 | 3.7742E+00 | −9.0000E+01 | −1.0000E+00 |
| A4 = 3.3564E−01 | 8.2319E−01 | −1.6662E−02 | −1.2795E−01 | −1.7370E−01 | −2.1177E−01 |
| A6 = −3.7458E−01 | −1.0835E+00 | 5.6632E−02 | −1.5162E−02 | −3.1636E−01 | 9.3957E−02 |
| A8 = 3.7389E−01 | 1.8470E+00 | −4/322E−01 | 3.2169E−01 | 8.2504E−01 | 1.4571E−01 |
| A10 = −2.7199E−01 | −1.7942E+00 | 1.0215E+00 | −8.1212E−01 | −1.1501E+00 | −2.5380E−01 |

TABLE 24-continued

| Aspheric Coefficients | | | | | |
|---|---|---|---|---|---|
| A12 = 1.1971E−01 | 9.5837E−01 | −1.1188E+00 | 8.7790E−01 | 7.1906E−01 | 1.4673E−01 |
| A14 = −2.9104E−02 | −2.0887E−01 | 2.3467E−01 | −3.9033E−01 | −1.6244E−01 | −2.9796E−02 |
| A16 = 3.0227E−03 | | | | | |

| | Surface # | | | | |
|---|---|---|---|---|---|
| 8 | 9 | 10 | 11 | 12 | 13 |
| k = −3.0536E+01 | −2.5357E+01 | 3.1052E+00 | −1.6032E+00 | −7.6974E−01 | −1.0514E+00 |
| A4 = −1.1612E−01 | −9.5114E−02 | −1.5847E−02 | 1.7033E−01 | −1.0668E−01 | −4.1604E−01 |
| A6 = 5.4472E−02 | 6.1131E−03 | 2.1380E−02 | −2.4877E−01 | −1.8800E−01 | 2.4857E−01 |
| A8 = 1.2380E−01 | 7.7565E−03 | 3.8166E−04 | 2.9301E−01 | 2.6222E−01 | −1.0922E−01 |
| A10 = −1.7879E−01 | −3.3913E−02 | −1.6864E−02 | −1.8349E−01 | −1.7126E−01 | 3.3310E−02 |
| A12 = 9.9215E−02 | 2.6838E−02 | 1.1981E−02 | 6.8581E−02 | 6.1568E−02 | −6.9969E−03 |
| A14 = −2.4394E−02 | −6.7981E−03 | −3.7236E−03 | −1.6296E−02 | −1.2668E−02 | 9.8953E−04 |
| A16 = 1.9720E−03 | 5.0334E−04 | 4.1716E−04 | 2.3212E−03 | 1.4704E−03 | −8.9571E−05 |
| A18 = | | | −1.5231E−04 | −8.8911E−05 | 4.6562E−06 |
| A20 = | | | 3.0865E−07 | 2.1651E−06 | −1.0481E−07 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from TABLE 23 and TABLE 24 as the following values and satisfy the following conditions:

| 12th Embodiment | | | |
|---|---|---|---|
| f (mm) | 2.35 | ΣAT/T12 | 2.13 |
| Fno | 2.20 | Y11/Y62 | 0.52 |
| HFOV (deg.) | 57.0 | f/R1 | −0.05 |
| V3 + V6 | 44.2 | \|f1/f4\| | 0.09 |
| TL/ImgH | 1.93 | \|f2/f3\| + \|f2/f4\| | 0.57 |
| ImgH/f | 1.34 | \|f2/f4\| | 0.06 |
| (R3 + R4)/(R3 − R4) | 0.07 | \|f3/f4\| | 0.12 |
| (R9 + R10)/(R9 − R10) | 0.63 | f5/f2 | 0.73 |
| \|R10/R9\| | 0.23 | \|f5/f4\| | 0.05 |
| CT4/CT3 | 2.13 | \|f6/f4\| | 0.07 |
| CT4/T34 | 13.97 | \|f/f5\| + \|f/f6\| | 2.09 |
| T12/T23 | 2.97 | Yc61/f | 0.39 |

13th Embodiment

Figure 28:
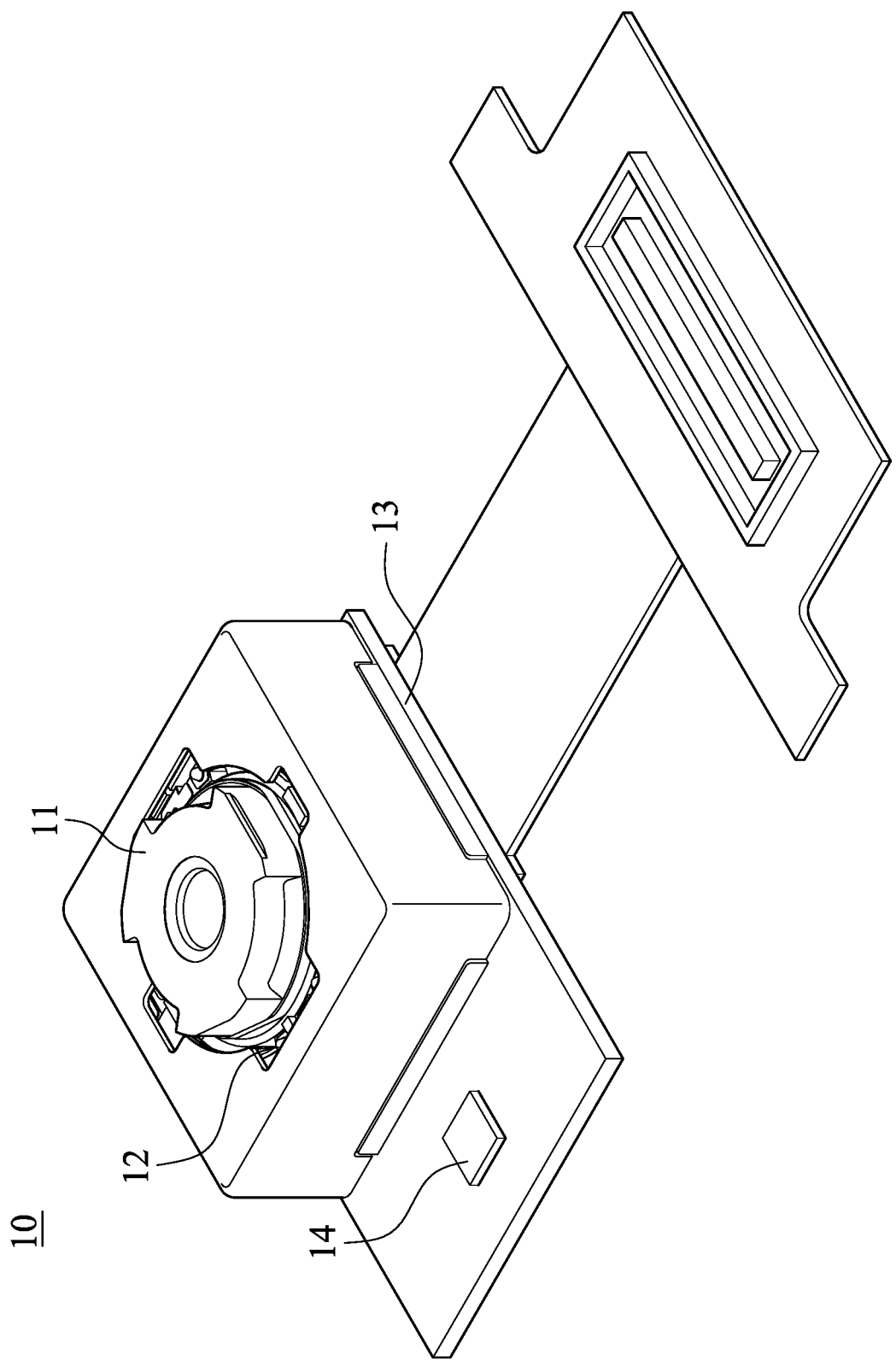
FIG. 28 is a three-dimensional schematic view of an imaging apparatus according to the 13th embodiment of the present disclosure.

FIG. 28 is a three-dimensional view of an imaging apparatus 10 according to the 13th embodiment of the present disclosure. In FIG. 28, the imaging apparatus 10 according to the 13th embodiment is a camera module. The imaging apparatus 10 includes an imaging lens module 11, a driving apparatus 12 and an image sensor 13, wherein the imaging lens module 11 includes an imaging optical lens assembly according to the present disclosure and a barrel (its reference numeral is omitted) for carrying the imaging optical lens assembly. An image of an imaged object can be captured by the imaging apparatus 10 via the imaging lens module 11, the driving apparatus 12 is used to bring the image into focus so that the image can be clearly formed on the image sensor 13, and then the image data is generated.

The driving apparatus 12 can have an auto-focus functionality, and a driving method thereof can use a voice coil motor (VCM), a micro electro-mechanical system (MEMS), a piezoelectric system or a shape memory alloy system. The driving apparatus 12 enables the imaging optical lens assembly to obtain a preferable imaging position, so that clear images of the imaged object at different object distances can be obtained.

The image sensor 13 of the imaging apparatus 10 can have the properties of high photosensitivity and low noise (such as CMOS and CCD) and is disposed on the image surface of the imaging optical lens assembly, so that high image quality of the imaging optical lens assembly can be obtained.

Moreover, the imaging apparatus 10 can further include an image stabilizing module 14. The image stabilizing module 14 can exemplarily include an accelerator, a gyro sensor or a Hall Effect sensor. In the 13th embodiment, the image stabilizing module 14 is a gyro sensor. However, it is only exemplary and the image stabilizing module 14 is not limited thereto. By adjusting to movements in different axial directions of the imaging optical lens assembly, the image blur due to motion during exposure can be compensated, so that the image quality of dynamic or low-light scenes can be enhanced. Moreover, advanced image compensation functions, such as optical image stabilization (OIS) or electronic image stabilization (EIS), can be provided.

14th Embodiment

Figure 29A:
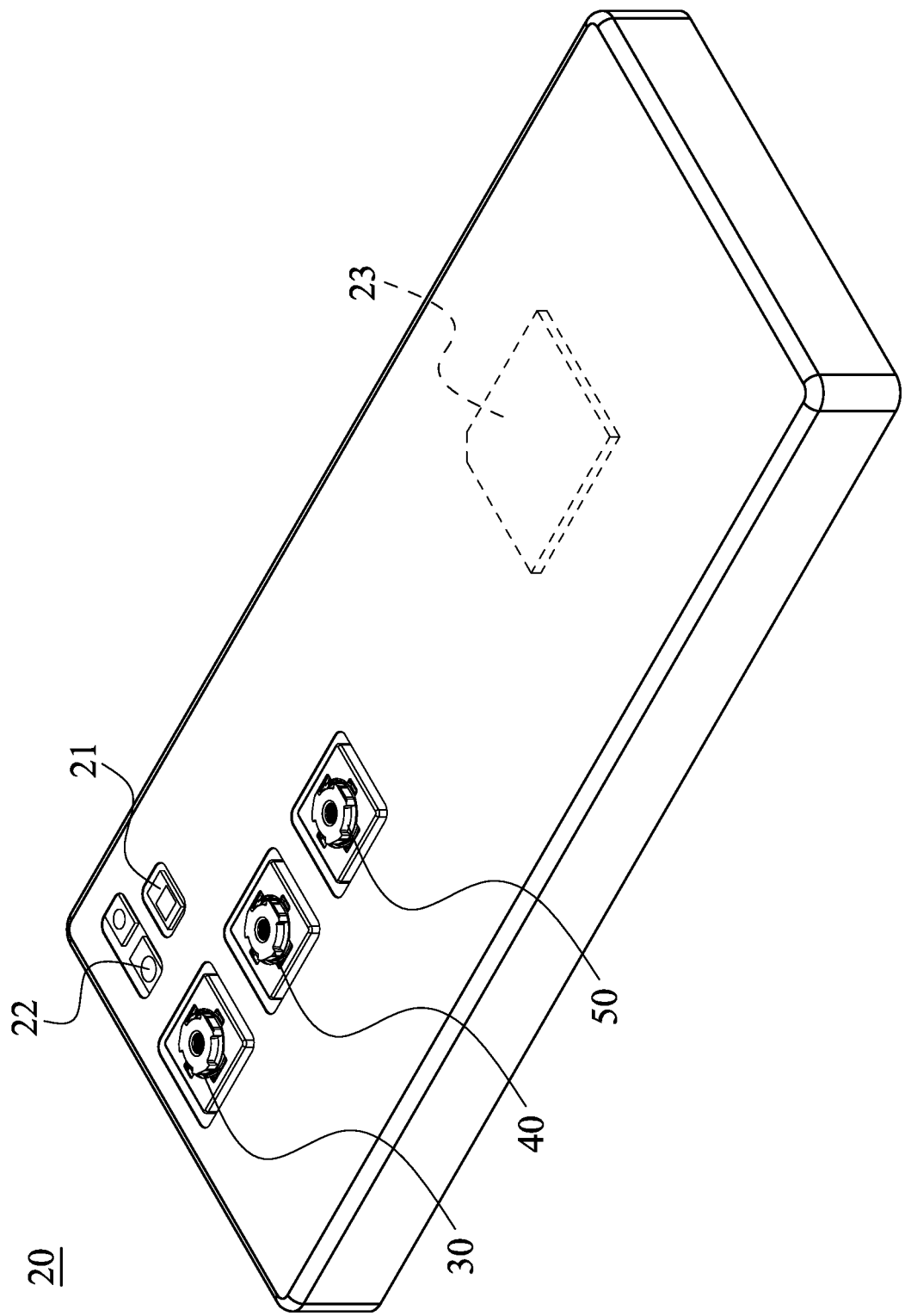
FIG. 29A is a schematic view of one side of an electronic device according to the 14th embodiment of the present disclosure.
Figure 29B:
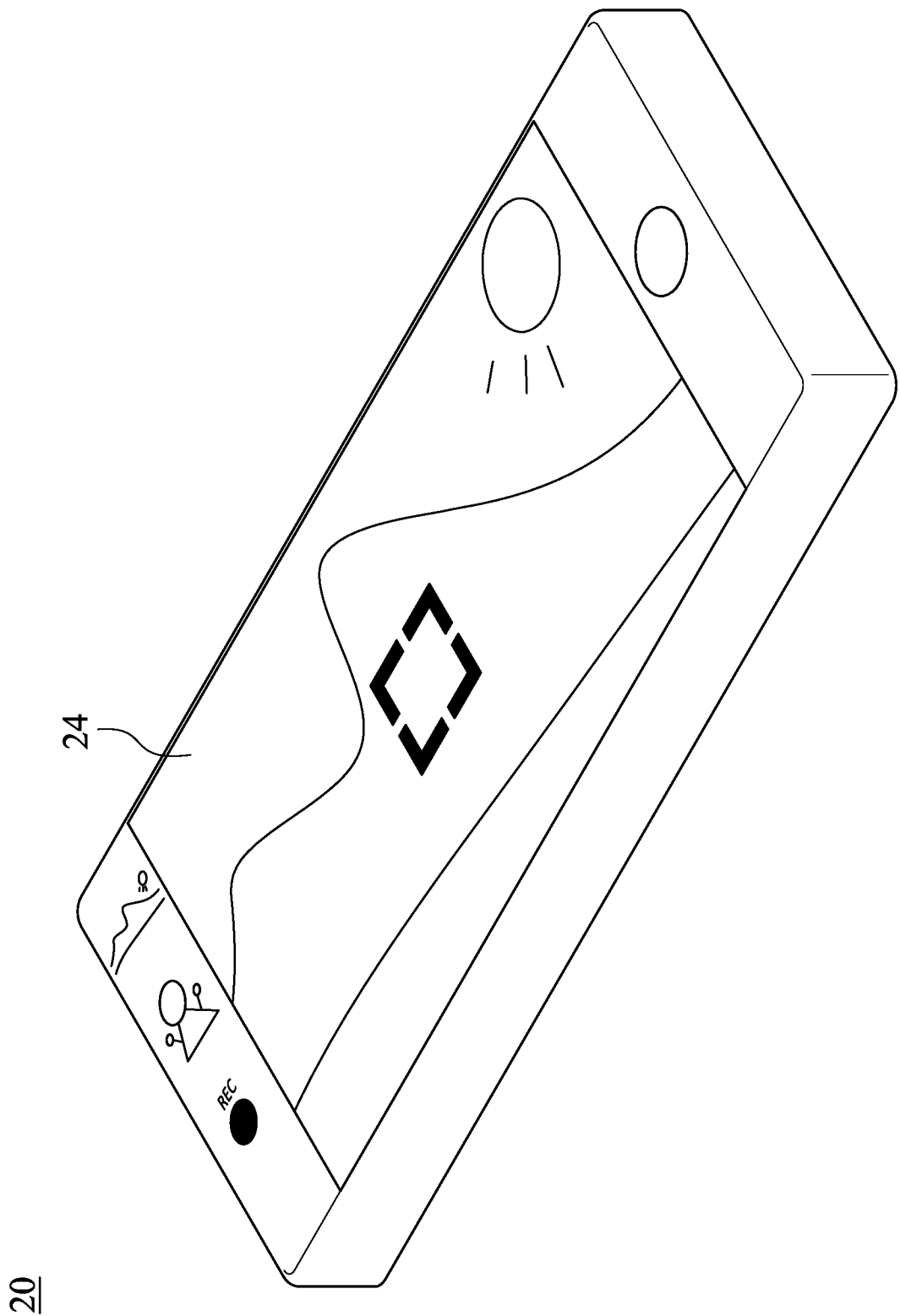
FIG. 29B is a schematic view of another side of the electronic device of FIG. 29A.

FIG. 29A is a schematic view of one side of an electronic device 20 according to the 14th embodiment of the present disclosure. FIG. 29B is a schematic view of another side of the electronic device 20 of FIG. 29A. FIG. 29C is a system schematic view of the electronic device 20 of FIG. 29A. In FIGS. 29A, 29B and 29C, the electronic device 20 according to the 14th embodiment is a smartphone, wherein the electronic device 20 includes imaging apparatuses 30, 40, 50, a flash module 21, a focusing assisting module 22, an image signal processor 23, a user interface 24 and an image software processor 25. The imaging apparatus 30 includes an imaging lens module 31, a driving apparatus 32, an image sensor 33 and an image stabilization module 34, The imaging apparatus 40 includes an imaging lens module 41, a driving apparatus 42, an image sensor 43 and an image stabilization module 44. The imaging apparatus 50 includes an imaging lens module 51, a driving apparatus 52, an image sensor 53 and an image stabilization module 54. At least one of the imaging apparatuses 30, 40 and 50 includes an imaging optical lens assembly according to the present disclosure.

Imaging properties of the imaging apparatuses 30, 40 and 50 may be not the same. For example, the imaging apparatus 30 may be a camera module of a wide field of view, the imaging apparatus 40 may be a camera module of a general field of view (that is, a maximum field of view of the imaging apparatus 40 is smaller than a maximum field of view of the imaging apparatus 30), and the imaging apparatus 50 may be a telephoto camera module, wherein the arrangements and the imaging properties of the imaging apparatuses 30, 40 and 50 are not limited thereto.

When the user captures images of an imaged object 26 via the user interface 24, the electronic device 20 focuses and generates images via at least one of the imaging apparatuses 30, 40 and 50 (that is, a single or a plurality of images are captured by the imaging apparatuses 30, 40 and 50) while compensating for low illumination via the flash module 21 when necessary. Then, the electronic device 20 quickly focuses on the imaged object according to its object distance information provided by the focusing assisting module 22, and optimizes the image via the image signal processor 23 (ISP) and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

At least one of the imaging apparatuses 30, 40 and 50 according to the 14th embodiment is the same as the imaging apparatus 10 according to the 13th embodiment, and will not describe again herein.

The foregoing description, for purpose of explanation, has been described with reference to specific embodiments. It is to be noted that Tables 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising six lens elements, the six lens elements being, in order from an object side to an image side: a first lens element, a second lens element, a third lens element, a fourth lens element, a fifth lens element and a sixth lens element;

wherein the first lens element with negative refractive power has an image-side surface being concave in a paraxial region thereof, the second lens element has positive refractive power, the fourth lens element has an image-side surface being concave in a paraxial region thereof; the sixth lens element has an object-side surface being convex in a paraxial region thereof and an image-side surface being concave in a paraxial region thereof and comprising at least one convex critical point in an off-axis region thereof;

wherein a curvature radius of an object-side surface of the first lens element is R1, a curvature radius of an object-side surface of the fifth lens element is R9, a curvature radius of an image-side surface of the fifth lens element is R10, a focal length of the imaging optical lens assembly is f, a focal length of the second lens element is f2, a focal length of the third lens element is f3, a focal length of the fourth lens element is f4, a sum of axial distances between every adjacent lens elements of the imaging optical lens assembly is ΣAT, an axial distance between the first lens element and the second lens element is T12, a maximum image height of the imaging optical lens assembly is ImgH, and the following conditions are satisfied:

$-0.50 < (R9+R10)/(R9-R10)$;

$|f2/f3|+|f2/f4| < 1.75$;

$f/R1 < 0.55$;

$1.25 < \Sigma AT/T12 < 4.80$; and $1.15 < ImgH/f$.

2. The imaging optical lens assembly of claim 1, wherein the focal length of the second lens element is f2, the focal length of the third lens element is f3, the focal length of the fourth lens element is f4, and the following condition is satisfied:

$|f2/f3|+|f2/f4| < 1.0$.

3. The imaging optical lens assembly of claim 1, wherein the curvature radius of the object-side surface of the fifth lens element is R9, the curvature radius of the image-side surface of the fifth lens element is R10, and the following condition is satisfied:

$0 \le (R9+R10)/(R9-R10) < 2.0$.

4. The imaging optical lens assembly of claim 1, wherein an Abbe number of the third lens element is V3, an Abbe number of the sixth lens element is V6, and the following condition is satisfied:

$V3+V6 < 60$.

5. The imaging optical lens assembly of claim 1, wherein the image-side surface of the fourth lens element comprises at least one convex critical point in an off-axis region thereof.

6. The imaging optical lens assembly of claim 1, wherein the sum of axial distances between every adjacent lens elements of the imaging optical lens assembly is ΣAT, the axial distance between the first lens element and the second lens element is T12, and the following condition is satisfied:

$1.50 < \Sigma AT/T12 < 3.60$.

7. The imaging optical lens assembly of claim 1, wherein the third lens element has an image-side surface being concave in a paraxial region thereof, a central thickness of the fourth lens element is CT4, an axial distance between the third lens element and the fourth lens element is T34, and the following condition is satisfied:

$1.5 < CT4/T34$.

8. The imaging optical lens assembly of claim 1, wherein the axial distance between the first lens element and the second lens element is T12, an axial distance between the second lens element and the third lens element is T23, and the following condition is satisfied:

$T12/T23 < 6.0$.

9. The imaging optical lens assembly of claim 1, wherein an axial distance between the object-side surface of the first lens element and an image surface is TL, the maximum image height of the imaging optical lens assembly is ImgH, an f-number of the imaging optical lens assembly is Fno, a vertical distance between a maximum effective diameter position of the object-side surface of the first lens element and an optical axis is Y11, a vertical distance between a maximum effective diameter position of the image-side surface of the sixth lens element and the optical axis is Y62, and the following conditions are satisfied:

$TL/ImgH<2.40;$ $1.0<Fno<2.6;$ and $Y11/Y62<1.0.$

10. The imaging optical lens assembly of claim 1, wherein the focal length of the imaging optical lens assembly is f, the curvature radius of the object-side surface of the first lens element is R1, and the following condition is satisfied:

$-0.60<f/R1<0.40.$

11. The imaging optical lens assembly of claim 1, wherein the object-side surface of the fifth lens element is convex in a paraxial region thereof and comprises at least one concave critical point in an off-axis region thereof.

12. The imaging optical lens assembly of claim 1, wherein the third lens element has an object-side surface being convex in a paraxial region thereof and comprising at least one concave critical point in an off-axis region thereof.

13. The imaging optical lens assembly of claim 1, wherein a focal length of the first lens element is f1, the focal length of the second lens element is f2, the focal length of the third lens element is f3, the focal length of the fourth lens element is f4, a focal length of the fifth lens element is f5, a focal length of the sixth lens element is f6, and the following conditions are satisfied:

$|f1/f4|<1.0;$ $|f2/f4|<1.0;$ $|f3/f4|<1.0;$ $|f5/f4|<1.0;$ and $|f6/f4|<1.0.$

14. The imaging optical lens assembly of claim 1, wherein a curvature radius of an object-side surface of the second lens element is R3, a curvature radius of an image-side surface of the second lens element is R4, and the following condition is satisfied:

$(R3+R4)/(R3-R4)<0.30.$

15. The imaging optical lens assembly of claim 1, wherein the focal length of the imaging optical lens assembly is f, a focal length of the fifth lens element is f5, a focal length of the sixth lens element is f6, and the following condition is satisfied:

$1.70<|f/f5|+|f/f6|.$

16. The imaging optical lens assembly of claim 1, wherein the object-side surface of the first lens element comprises at least one convex shape in an off-axis region thereof.

17. The imaging optical lens assembly of claim 1, wherein a central thickness of the third lens element is CT3, a central thickness of the fourth lens element is CT4, and the following condition is satisfied:

$1.75<CT4/CT3<6.0.$

18. The imaging optical lens assembly of claim 1, wherein a vertical distance between a critical point in an off-axis region on the object-side surface of the sixth lens element and an optical axis is Yc61, the focal length of the imaging optical lens assembly is f, and the following condition is satisfied:

$0.1<Yc61/f<0.9.$

19. The imaging optical lens assembly of claim 1, wherein the focal length of the second lens element is f2, a focal length of the fifth lens element is f5, and the following condition is satisfied:

$f5/f2<1.0.$

20. The imaging optical lens assembly of claim 1, wherein the curvature radius of the object-side surface of the fifth lens element is R9, the curvature radius of the image-side surface of the fifth lens element is R10, and the following condition is satisfied:

$|R10/R9|<1.0.$

21. An imaging apparatus, comprising:
the imaging optical lens assembly of claim 1; and
an image sensor, wherein the image sensor is disposed on an image surface of the imaging optical lens assembly.

22. An electronic device, comprising:
the imaging apparatus of claim 21.

* * * * *